US007093231B2

(12) United States Patent
Nuss

(10) Patent No.: US 7,093,231 B2
(45) Date of Patent: Aug. 15, 2006

(54) GRAMMER FOR REGULAR EXPRESSIONS

(75) Inventor: Andrew Nuss, San Antonio, TX (US)

(73) Assignee: David H. Alderson, New York, NY (US)

(*) Notice: Subject to any disclaimer, the term of this patent is extended or adjusted under 35 U.S.C. 154(b) by 150 days.

(21) Appl. No.: 10/691,414

(22) Filed: Oct. 22, 2003

(65) Prior Publication Data
US 2004/0225999 A1 Nov. 11, 2004

Related U.S. Application Data

(60) Provisional application No. 60/469,036, filed on May 6, 2003.

(51) Int. Cl.
*G06F 9/44* (2006.01)
(52) U.S. Cl. .......................... 717/114; 707/6
(58) Field of Classification Search ........ 717/114–119; 706/934; 707/6
See application file for complete search history.

(56) References Cited

U.S. PATENT DOCUMENTS

| | | | | |
|---|---|---|---|---|
| 5,946,490 | A * | 8/1999 | Lieberherr et al. | 717/157 |
| 6,425,119 | B1 * | 7/2002 | Jones et al. | 717/100 |
| 6,748,585 | B1 * | 6/2004 | Proebsting et al. | 717/136 |
| 2002/0138819 | A1 * | 9/2002 | Hills | 717/114 |
| 2003/0145308 | A1 * | 7/2003 | Geisinger | 717/114 |

OTHER PUBLICATIONS

Jeffrey Friedl, Mastering Regular Expressions, Jul. 2002, O'Reilly, 2nd Edition, pp. 1-56.*
Noord, et al., An Extendible Regular Expression Compiler for Finite-state Approaches in Natural Language Processing, 1999, Workshop on Implementing Automata; WIA99 Pre-Proceedings, Potsdam Germany, pp. 1-18.*

* cited by examiner

Primary Examiner—Tuan Dam
Assistant Examiner—Andre R. Fowlkes
(74) Attorney, Agent, or Firm—Charles L. Thoeming

(57) ABSTRACT

The grammar of this invention is an approach to regular expressions which introduces advantages to programmers who use regular expressions for scanning, searching, and tokenizing text:
  Allowing composition of regular expressions (patterns) through the standard C/C++ operators (using C/C++ precedence and associativity), thus appealing to a huge audience of programmers already familiar with that style of grammar.
  Generalizing the negated character-class (so familiar to Perl programmers) in a way that quite dramatically allows ANY pattern composition to be used for searching (the "subjunctive" binary composition).
  Integrating into an elegantly simple grammar form ("do-pattern") the ability to create arbitrary side-effects of tokenization, accomplished in prior art through a cumbersome combination of tokenizing expressions and parse trees, such as in the grammar style of Lex-Yacc.
  Generalizing the capture-to-variable feature (as seen in Perl), allowing the capture of portions of the stream (match sub-expressions) into any variable current in the scope of the regular-expression.
  Allowing the parameterization of production rules, as templates, which allow similar (in form) regular expressions to be written as multiple instantiations of the same production rule template (accomplished via in params).
  Further allowing parameterization of production rule templates to extend to the capture output of the expressions (accomplished via a combination of "do-patterns", "capture-patterns", and out or in/out params).
  Creating novel support algorithms (to accomplish the above) not seen in any texts on finite automata.

26 Claims, 8 Drawing Sheets

Architecture and Dataflow

Architecture and Dataflow

*Figure 2*

| Name | Description |
|---|---|
| VM Interpreter | Converts FORTH words (Strings) to FORTH tokens and literals |
| VM Engine | Executes FORTH tokens and literals |
| Script Translator | Converts scripts written in "the grammar of this invention" to FORTH words |
| Automata Composition Engine | Composes modeling NFAs from FORTH regular expressions and converts NFAs to executable NFAs via subset-construction |
| Automata Execution Engine | Executes an NFA against the input stream, and returns side-effects as compiled FORTH tokens |

*Figure 3*

| VM Interpreter | VM Engine | Script Translator | Automata Composition Engine | Automata Execution Engine |
|---|---|---|---|---|
| EParser.java | Engine.java | Parser.java | AnyGrammar.java | AcceptState.java |
| Interpreter.java | EArray.java | Script.java | Arc.java | Automata.java |
| Console.java | EArrayRef.java | ScriptParser.java | ArcList.java | FastArc.java |
| Parser.java | EAtom.java | Stream.java | ArcNums.java | FastGraph.java |
| | EDict.java | Token.java | ButGrammar.java | FastNode.java |
| | EFrame.java | TokenStream.java | ButNotGrammar.java | IntQueueHeap.java |
| | EInstr.java | SUnit.java | CharClass.java | SimpleCharMap.java |
| | ELiteral.java | SUnit_BlockStmt.java | CharClassGrammar.java | |
| | EObjects.java | SUnit_BreakStmt.java | CharGrammar.java | |
| | EStack.java | SUnit_ContinueStmt.java | ConcatGrammar.java | |
| | EStream.java | SUnit_DeclStmt.java | ContainsGrammar.java | |
| | EType.java | SUnit_DoStmt.java | DoGrammar.java | |
| | OutStream.java | SUnit_EmptyStmt.java | Grammar.java | |
| | Stream.java | SUnit_Expr.java | Graph.java | |
| | Range.java | SUnit_ExprStmt.java | InhibitGrammar.java | |
| | | SUnit_ForStmt.java | Instrs.java | |
| | | SUnit_Frameable.java | IterateGrammar.java | |
| | | SUnit_FuncDecl.java | Node.java | |
| | | SUnit_IfStmt.java | NodeSet.java | |
| | | SUnit_PrintStmt.java | NullGrammar.java | |
| | | SUnit_ReturnStmt.java | OptionalGrammar.java | |
| | | SUnit_RuleDecl2.java | RejectGrammar.java | |
| | | SUnit_Stmt.java | RepeatGrammar.java | |
| | | SUnit_StmtList.java | Segment.java | |
| | | SUnit_TokenizeStmt.java | StringGrammar.java | |
| | | SUnit_WhileStmt.java | SubsetNode.java | |
| | | TypeDecl.java | TmplGrammar.java | |
| | | VarDecl.java | Transition.java | |
| | | VarDeclScope.java | TransitionArray.java | |
| | | VarDeclStack.java | TransitionGroup.java | |
| | | | UnionGrammar.java | |
| | | | UpCount.java | |

*Figure 4*

| Operators | Purpose | Associativity |
|---|---|---|
| * | iterate and repeat | left-to-right |
| +   >+   <+ | left-to-right and right-to-left concatenation | left-to-right |
| \| | union | left-to-right |
| ? : | conditional | right-to-left |
| but   butnot | subjunctive expressions | left-to-right |

*Figure 5*

| FORTH word | Stack operand(s) | Stack result(s) | Description |
|---|---|---|---|
| {xx | - | - | begins compilation of an executable instr-array for do-patterns |
| xx} | - | - | ends compilation of an executable instr-array for do-patterns |
| nop | - | - | the "nop" instruction |
| pdo | x-array-obj   pat-obj   x-array-obj | pat-obj | the low-level "do-pattern" |
| "AB" | - | "AB" | pushes the literal "AB" onto the FORTH stack |
| String.Pattern | str-obj | pat-obj | converts a FORTH string to a FORTH pattern object |

*Figure 6*

| FORTH word | Stack operand(s) | Stack result(s) | Description |
|---|---|---|---|
| swap | obj1  obj2 | obj2  obj1 | swaps top elements on FORTH stack |
| char.Pattern | char-obj | pat-obj | converts top element of FORTH stack from character object to Pattern object |
| CharClass.Pattern | charclass-obj | pat-obj | converts top element of FORTH stack from char-class to pattern |
| char.String | char-obj | str-obj | converts top element of FORTH stack from char to string |
| p? | pat-obj | pat-obj | modifies top Pattern on FORTH stack via unary "optional" operator |
| p\| | pat-obj1  pat-obj2 | pat-obj | creates a new pat-obj which is a union of the 2 patterns at top of stack |
| s+ | str-obj1  str-obj2 | str-obj | creates a new str-obj which is a concatenation of 2 strings at top of stack |

Figure 7

| FORTH word | Before stack | After stack | Action(s) |
|---|---|---|---|
| -> $0 | - | var0-ref | Push reference to $0 local variable |
| -> '[AB]' CharClass.Pattern | - | pat-obj | Construct/push '[AB]' as CharClassGrammar object |
| -> assign | var0-ref pat-obj | - | Assign '[AB]' object to $0 local variable |
| -> $1 | - | var1-ref | Push reference to $1 local variable |
| -> $0 valueof | - | var0-pat-obj | Push value of $0 local variable -> '[AB]' |
| -> assign | var1-ref var0-pat-obj | - | Assign '[AB]' object to $1 local variable |
| -> $0 | - | var0-ref | Push reference to $0 local variable |
| -> $0 valueof | - | var0-pat-obj | Push value of $0 local variable -> '[AB]' |
| -> p? | pat-obj | pat-obj | Construct/push an OptionalGrammar object -> ?'[AB]' |
| -> $0 valueof | - | var0-pat-obj | Push value of $0 local variable -> '[AB]' |
| -> p? | pat-obj | pat-obj | Construct/push an OptionalGrammar object -> ?'[AB]' |
| -> p<+ | pat-obj1 pat-obj2 | pat-obj | Pop 2 grammar objects, construct a new ConcatGrammar object, and push -> ?'[AB]' <+ ?'[AB]' |
| -> swap | var0-ref pat-obj | pat-obj var0-ref | Swap the reference and grammar objects on stack |
| -> 1 get | pat-obj var0-ref | pat-obj var0-ref pat-obj | Push another reference to grammar object |
| -> assign | var0-ref pat-obj | - | Assign $0 to grammar obj -> ?'[AB]' <+ ?'[AB]' |
| -> drop | pat-obj | - | Drop top element |
| -> $2 | - | var2-ref | Push a reference to $2 local variable |
| -> $0 valueof | - | var0-pat-obj | Get value of $0 variable -> ?'[AB]' <+ ?'[AB]' |
| -> $1 valueof | - | var1-pat-obj | Get value of $1 variable -> '[AB]' |
| -> p+ | pat-obj1 pat-obj2 | pat-obj | Pop top 2 grammar objs, construct new obj -> (?'[AB]' <+ ?'[AB]') + '[AB]' |
| -> assign | var2-ref pat-obj | | Assign above grammar object to variable $2 |

*Figure 8*

| Contemplated | Evolved to | Reason |
|---|---|---|
| ['a', 'b', '0'..'9'] | '[ab0-9]' | Given in section 8.3.5.1 |
| anyother | butwithout<br>butnot<br>butalso | anyother cannot be modeled effectively as an NFA. The subjunctive form properly generalizes the negated character-class. |
| butwithout<br>butnot<br>butalso | but<br>butnot | but and butnot are more accurately converses of each other; butwithout is just a design pattern based on butnot |
| righttoleft<br>lefttoright | <+<br>>+ | The <+ and >+ variations of the default + concatenation operator are more compatible with a C-style interpreter and C-style precedence/associativity rules. |
| P * N1* N2 | P * N1..N2 | Better to introduce a range type (and a binary range .. operator) and to overload a binary * operator that already exists in the C operator-list, than to introduce a new tertiary operator form. |
| reject<br>accept | reject | accept cannot be modeled as an NFA (its meaning is context dependent); there are 2 possible interpretations to the meaning of accept; no use cases that demonstrate the ability to solve an otherwise unsolvable problem. |
| "unary after" | "unary before" | * ? + as unary operators must come before to be C expression syntax compatible |
| P1 otherwise P2 otherwise P3 | - | This grammar has value but not in this form – will be part of a continuation patent. |
| choice<index>(Pattern[]) | - | The "dynamic switch" can be modeled by line-by-line composition, leveraging a feature of instantiated production rules – see example tmpl6.tok of section 8.4.2.4 |
| concat<Pattern> (Pattern) | - | postponed |
| ignorecase<boolean> (Pattern) | - | not novel, postponed |
| "back-referencing" feature | | postponed |
| "recursion" support | | Postponed because of complications surrounding the subjunctive, which is implemented through subset construction. |

GRAMMER FOR REGULAR EXPRESSIONS

2 CROSS-REFERENCES TO RELATED APPLICATIONS

This United States non-provisional patent application is based upon and claims the filing date of U.S. Provisional patent application Ser. No. 60/469,036, filed May 6, 2003.

3 STATEMENT REGARDING FEDERALLY SPONSORED RESEARCH OR DEVELOPMENT

None.

4 REFERENCE TO SEQUENCE LISTING ON CD-ROM

The source code and example scripts of the present invention are provided on CD-ROM disks marked Copy 1 and Copy 2 in conformity with 37 C.F.R. § 1.52, identical to the CD-ROM copies filed in conjunction with U.S. Provisional patent application Ser. No. 60/469,036.

5 BACKGROUND OF THE INVENTION 5.1 Field of the Invention

There are many styles of programming language grammars in use today. Two of these styles are brought together into the programming language grammar of the present invention. The first style encompasses all languages which derive from the C programming language, introduced some 20 years ago, including Java, C++, and JavaScript, and now, the grammar described herein. The second style includes a large group of languages which derive their usefulness by offering the programmer the ability to create "regular expressions" for searching, recognizing, and tokenizing text. The grammar of the present invention combines these two styles by making regular-expressions a primitive data type of a C-style language.

The grammar of the present invention introduces several new forms of regular-expressions, not seen in the art, including theoretical textbooks on regular-expressions. The virtual machine language of the present invention is a variant of FORTH designed expressly for the purpose of building the engine for its interpreter. The interpreter for this language has the normal components of an entry-level C interpreter known in the art.

5.2 Description of Related Art

The related art falls into two general categories: (1) those programming language grammars including or similar to C or C++ and (2) those programming languages including or similar to Perl.

References in this document such as "similar to C/C++", indicate a general style for statement blocks, function declarations, loop-constructs, if-statements, and most importantly, the exact C-style grammar for expressions, including the C-operators, and the C-rules of associativity and precedence for binding sub-expressions. This is particularly important, because regular expressions are indeed expressions, and the grammar of the present invention is the first to "overload" the C-expression as a way to encapsulate regular-expressions.

References such as "similar to Perl/Tcl" encompass those languages which allow programmers to create powerful constructs, called regular-expressions, that are used to help solve problems involving searching, recognizing, and tokenizing text. At the core of these languages, are implementation engines based on two varieties of finite automata, NFAs and DFAs. Likewise, the engine, upon which the present grammar is implemented, is also based on the principles of NFAs and DFAs. In addition, the present invention introduces several regular expression grammar forms that are, practically speaking, not reducible to Perl regular expressions.

The present invention overlaps a little in functionality with Lex-Yacc—which is a compiler-building language. Lex-Yacc is a language (actually a combination of 2 grammars) which combines the concepts of tokenizing via regular-expressions and using production rules to associate side-effects with recognized tokens. Similarly, the grammar of the present invention also involves production rules, as well as the generation of instructional (statement-level) "side-effects", but the similarity is only on the surface. First of all, the engine for the grammar of the present invention (as described by examples and diagrams and as implemented in the source code) does not implement recursive production rules (modeled in theoretical texts via Pushdown Automata—PDA). Problems modeled by recursive production rules cannot be solved by Non-Deterministic Finite Automata (NFA), whereas, ultimately, all of the grammar forms of the present invention can be modeled by NFAs, so long as recursive production rules are disallowed. The second major difference between the engine of the present invention and that of Lex-Yacc, is in how statement-level side-effects are generated. The Lex-Yacc engine uses a tokenize phase (based on classical regular expressions) and a subsequent phase to determine side-effects based on production rules. In contrast, side-effects of the present invention are compiled directly into the NFA, a feat made more manageable by the creation of a variant of FORTH for use as the "virtual machine" language of the present invention.

The grammar of the present invention is fundamentally different from that of Lex-Yacc since the grammar integrates general statement-level (instructional) side-effects directly into the regular-expression grammar. Logically, the support diagrams (of this document) show that instructions are embedded directly into the NFAs, something not seen in the art of "finite automata". In contrast, Lex-Yacc separates the tokenizing phase and the production rule "analysis" phase in order to solve the problem of recursive production rules. Lex-Yacc was designed to solve the problem of recursive rules because it is a compiler-builder for compiling programming languages, and programming languages generally offer a syntax for recursively defined expressions. In contrast, the grammar of the present invention solves the same class of problems for which the Perl/Python grammars are normally chosen. Such grammars, including that of the present invention, make it easier for the programmer to solve problems of searching, recognizing, extracting in textual documents—not compiler-building. Therefore, solving the problems imposed by recursive production rules is not required to achieve the primary goal of the present invention. Further, as discussed in section 8.6, it was realized that the novel subjunctive grammar form—so important in allowing the present invention to extend the art—cannot be combined with recursive rules without additional support algorithms, not known in the art, that are best covered outside the scope of this patent. Thus the purpose of the production rules of the present invention, in contrast with the production rule feature of Lex-Yacc, is to enhance readability and re-usability of a regular expression by allowing it to have parameters.

Therefore, in terms of allowing a programmer to create regular expressions, the present invention matches the intent of languages such as Tcl/Perl/Python.

5.3 List of Prior Art

Languages:
Perl
Python
Tcl
C
Other Publications:
*Compilers: Principles, Techniques, and Tools*, by Aho, Sethi, Ullman, Addison-Wesley, 1986
*Introduction to Automata Theory, Languages, and Computation*, by Hopcroft, Motwani, Ullman, Addison-Wesley, 2001, $2^{nd}$ Edition

6 BRIEF SUMMARY OF INVENTION

The present invention is a C-like grammar that incorporates regular-expressions as a primitive and fundamental data type of the language. This is significant for a number of reasons.

The C-style of programming languages (as seen in C, C++, JavaScript, etc.) are used and understood by a large audience of programmers, all of whom will find it quite easy to learn this new grammar, both because its basic grammar for statements, functions, and expressions adheres quite closely to the C-style, but also because its regular-expression syntax adopts (that is, overloads) the expression syntax of the C language, including C's operators and C's rules for precedence/associativity. In some cases, the grammar of the present invention introduces new operators, but these also adhere to C's rules for precedence/associativity.

By introducing the Pattern data type as a primitive of the language, which is simply an instantiated regular expression, this invention allows the programmer to build regular expressions line-by-line.

Also implied by a Pattern data type (and seen by examples) is the fact that regular expressions can be built from variables as well as literals.

In addition to standard regular expression forms, the present invention introduces the following four regular expression grammar forms.

The "subjunctive binary expression", which allows a programmer to create a "primary" expression that is modified in meaning by the secondary "subjunctive" Pattern expression. Both subjunctive forms—butnot and but—have been named "subjunctive" as opposed to "conjunctive" because the primary Pattern expression is used to match/extract against the input stream, whereas the secondary (subjunctive) expression is used to restrict those matches. It turns out that the negated character-class so familiar to Perl programmers is a special case of the butnot subjunctive expression, and just as the negated character class is so useful for creating Perl expressions that match up to a simple "terminator", the butnot expression of the present invention is completely general in allowing a programmer to easily match the first (or even Nth) match to any regular expression definable in the grammar of this invention.

The "do-pattern" allows the programmer to embed "before" and "after" statements in his/her "do-pattern" sub-expression. The "before" and "after" statements are executed as "side-effects" of reaching an ACCEPT state for the corresponding automata, if and only if the sub-expression of the "do-pattern" is part of the ACCEPT path of the automata. The reader who studies the source code will see that the underlying (low-level) algorithms for implementing the "do-pattern" are quite useful for implementing other grammar forms, including the following two forms.

The "capture-pattern" (related to the ability of Perl to capture sub-expressions embedded in parenthesizes into implicit variables) is a syntax which allows the programmer to precisely specify any variable in the current scope into which he/she wishes to capture matches to a sub-expression (if and only if the "accept" path matches that sub-expression being "captured"). The capture-pattern is so general and complete that the programmer can even capture into a variable whose scope is the "do-pattern" itself—this allows "captured patterns" embedded in a "repeat" composition to be put into the proper elements of an array, all as side-effects of the automata's execution of that regular-expression.

The "templatization" of production rules allows a regular-expression to be parameterized with three types of params—in, out, and in out; the programmer can therefore create re-usable regular expression templates. This parameterization allows portions of the regular expression to be specified at the time of, and varying with, instantiation. It further allows the "capture into" variables to be specified at the time of, and varying with, instantiation. In short, one production rule template is used to define a "class" of regular-expressions sharing similar composition and/or capture characteristics.

6.1 Brief Descrfiption of Architecture

The invention is a grammar for regular expressions which could theoretically be "injected" into a variety of C-like languages. The viability of all grammar forms of this invention, and the conformability of regular expressions to the C language's expression syntax, are justified in the algorithms section, as well as by the working source-code that allows the full array of script examples in this document to function correctly.

The source code which represents the first "reduction to practice" of this regular expression grammar consists of the following "block" components of the flow diagram of FIG. 1 of section 7, which are groupings of source files by related functionality:

VM Interpreter
VM Engine
Script Translator
Automata Composition Engine
Automata Execution Engine The purpose of each of these 5 distinct software components is described in the table of FIG. 2 of section 7.

FIG. 1 of section 7 shows the flow of data through the program/implementation of the invented grammar. Each movement of data is numbered, showing the sequence of data flows for the execution of a single example script. The following list of flows is numbered in reference to the flow arcs (and their bold numbering) of FIG. 1, and is explained as follows:

1) The FORTH commands which "run" a particular example script (such as sim1.tok) are passed to the VM Interpreter, either by the startup script or from typed input (after the startup script has completed). The startup script is written in the FORTH mini-grammar of this invention.

2) The VM Interpreter converts the startup script FORTH commands into FORTH tokens which are sent to the VM Engine for execution.
3) The VM Engine processes the FORTH tokens from the startup script, which at this step, cause an example script file to be opened, read, and passed as a stream of text (written in the grammar of the invention) to the Script Translator.
4) The Script Translator, which is a normal C-style interpreter, translates the grammar script example (including regular expressions), into a textual stream of FORTH words, and sends this stream back to the VM Engine.
5) The VM Engine sends the translated FORTH stream to the VM Interpreter, which converts the stream to FORTH tokens/instructions and FORTH literals.
6) The VM Interpreter sends the FORTH tokens and FORTH literals (based on the prior script translation step) back to the VM Engine to be executed.
7) Many of the FORTH instructions manage normal statement semantics, such as looping, pushing and popping values, arithmetic expressions, reference evaluation, etc. This is internal to the VM Engine. However, some of the FORTH instructions, which were generated by the earlier translation, are sent outside of the VM Engine. These instructions relate to regular expressions. This step shows that the VM Engine is processing the FORTH instructions that "describe" the regular expression, and using the Automata Composition Engine to compose a data structure "representing" the regular expression.
8) In this step, the Automata Composition Engine uses the subset construction algorithms of this invention to produce an NFA suitable for execution, and returns that data structure to the VM Engine.
9) In this step, the VM Engine passes the executable NFA to the Automata Execution Engine, which executes a "fast" NFA against the input stream.
10) In this step, the Automata Execution simply accumulates side-effects from the thread data structures of the "winning/accept" thread, and passes these instructional side-effects (which are compiled FORTH tokens and literals) back to the VM Engine, for immediate execution.

The table of FIG. 3 of section 7 breaks down each of the above components into a list of actual source code Java files, which are provided on CD. A few source files of the invention are not listed in the table under any of the five components because they are simple utilities, such as growable arrays of chars, growable arrays of objects, and so forth.

Note that the above illustration describes all of the components of the invention, whether they are novel or not. Some aspects of the invention are "constants". This means that if the invention is ported to C++ for productization, or despite the application of various standard optimization techniques, these source files will largely remain unchanged. In this sense, certain sources, or portions thereof, are like "watermarks" of the invention. Most of those files fall within the Automata Composition Engine and Automata Execution Engine components. However, some sources of the Script Translator include "watermarks" critical to the viability of the invention—SUnit_RuleDecl2.java and SUnit_TokenizeStmt.java.

7 BRIEF DESCRIPTION OF THE SEVERAL VIEWS OF THE DRAWINGS

The following are the tables and figures which are referenced by various portions of the specification.

FIG. 2 is a table briefly describing the purpose of each software component identified and shown in FIG. 1 as a "block". This table is referenced by section 6.1.

Figure 1:
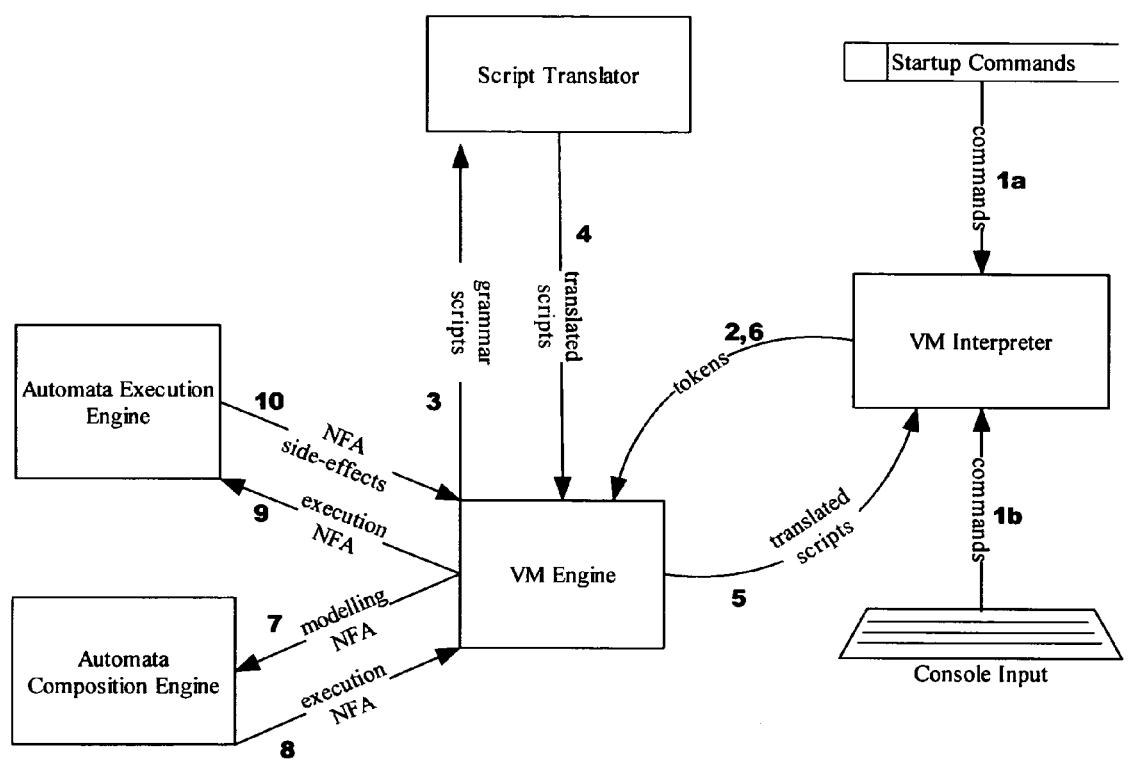
FIG. 1 shows a dataflow diagram describing the flows between the 5 identified software components of the invention. This table is referenced by section 6.1.

FIG. 3 lists all of the actual source files of the invention grouped according to each named software component of FIGS. 1 and 2. This table is referenced by section 6.1.

FIG. 4 is a table of the binary regular expression operators of the grammar, showing that associativity rules and precedence levels are upheld for those operators which have been over-loaded from the C-language. This table is referenced by section 8.3.5.3.

FIG. 5 is a table showing the translation of a simple DoPattern into FORTH atoms and the description of each atom and its stack effects. This table is referenced by section 8.3.5.4.1.

FIG. 6 is a table showing the descriptions of important FORTH atoms and their stack effects for a FORTH translation discussed in section 8.3.5.7.

FIG. 7 is a table showing the descriptions of the FORTH atoms and their stack effects for a FORTH translation discussed in section 8.5.1.2.2.

FIG. 8 is a table showing the language evolution of the grammar from earlier contemplated forms to the syntax of this invention, and is discussed in section 8.6.

8 DETAILED DESCRIPTION OF INVENTION 8.1 Glossary of Terms

Accept node—any node which is "marked" as accepting, meaning that if this node is reached by the execution thread, an "accept state" is saved for this thread in case this is the "winning" accept state.

Accept state—in this invention, records not only the position of the stream where an accept node was reached, but also records the accumulated instruction side-effects.

Arc—represents a valid transition from the source node (containing the arc) to a destination; each arc has a label, indicating the type of transition—null arc, "eating" arc, and instruction arc.

Arcnum sequences—unique to this invention, refers to an array/sequence of numbers given to every "eating" arc in the modeling NFA, in order to model the left-to-right and right-to-left modes of concatenation, the left-to-right priority of the elements of a union, and the inner-to-outer priority of repeating patterns.

Character-class—a set of characters, any of which can match the next character of the input stream; also, refers to a specific syntax of literal grammar that is known in the art as a convenient way to represent a union of character literals.

Character-eating arc—this type of arc (known in the art) is labeled either with a single character, or a set of characters (character-class), or a negated set of characters (negated character-class); a transition along this arc is possible if the next character in the stream (as tracked by the execution thread) matches the character or character-set of the arc-label.

DFA—or, deterministic finite-automata; from every node in the automata graph, there is at most one valid transition available for any possible character in the input stream; a DFA can always be executed by a single thread. This invention rarely produces DFAs.

Do-pattern—refers to a special regular expression of this invention which allows a programmer to embed compiled statements directly into the corresponding automata, such that the compiled statements get executed if, any only if, the sub-expression of the composition is traversed by the "winning" thread.

Entry node—every NFA and DFA has a single entry node; the initial automata thread that executes the automata starts at this node.

Execution thread—a data structure holding such characteristics as current position in the input stream, current node in the automata, and what instructional side-effects have been accumulated; the automata execution engine uses such threads to track all unique traversal paths through the automata that are valid given the number of characters "eaten" from the input stream at that stage of execution.

Exit node—in this invention, as a convenience to more readily allow nested subjunctive subset constructions, every subset constructed graph will be "adjusted", if necessary, to have only one accept node, which is called its exit node; thus the output of a subset construction can be used as the input for another composition.

Finite automata—a graph of nodes, connected by arcs that represent a transition from one node to another; in the art there are 2 kinds of arcs, those labeled with null, allowing a spontaneous transition to the destination node, and those labeled by character(s), which must match the next character of the stream, in order to allow a transition; when nodes marked as "accept" nodes are reached, a match against the stream has been found; in practice, finite automata are used to implement regular expressions.

FORTH token/instruction—represents either a FORTH "proc" (from the FORTH dictionary), a FORTH atom, or a literal; can be compiled into an integer.

FORTH word—in this invention, refers to the space-separated strings generated by the Script Translator; there is often, but not always a 1-1 correspondence between a FORTH word (string) generated by the Script Translator, and a FORTH token.

Graph—the collection of nodes and arcs which constitute an NFA or DFA.

Instruction—in this invention, a compiled FORTH token.

Instruction arc—this type of arc behaves like a spontaneous (null) transition, except that the execution thread accumulates (queues) the instruction(s) on this arc as side-effects.

Modeling—for the purposes of this document, modeling will refer to the creation of an NFA which is functionally equivalent to the regular-expression which it represents; that is, the NFA will "accept" the same input strings as the corresponding regular expression.

Negated character-class—also a set of characters, but negated, in the sense that the next character in the input stream is considered a "match" (allowing transition) if that character is not in the given set of characters; also, refers to a specific syntax of literal grammar (known in the art).

NFA—or, non-deterministic finite-automata; two conditions cause a finite automata to be non-deterministic—the existence of at least one arc labeled with null, called null or spontaneous transitions, or the existence of a node, from which there are two or more arcs labeled with the same character; the meaning of this designation is that the thread which is "executing" this automata relative to the input stream cannot "determine" a single valid transition, but must spawn a thread(s) to try all valid transitions.

Node—an element of a graph from which arc transitions are made; nodes may contain zero or more outbound arcs.

Null arc transition—this type of arc (known in the art) allows a spontaneous transition, without "eating" a character from the input stream.

Post-list—refers to the second list of statements in a do-pattern.

Pre-list—refers to the first list of statements in a do-pattern.

Regular expression—a class of programming language expression grammars consisting of literals and operators, used to compose "patterns" for matching against streams.

Short-circuit—in this invention, a regular expression has a short-circuit if it can match the stream without "eating" any characters; i.e. there is at least one path through the NFA without encountering any "eating" arcs.

Side-effects—refers to instructions accumulated during NFA execution; the side-effects instructions accumulated by the winning state will be immediately executed by the FORTH engine after the winning state is selected and returned to the engine.

Statement—a single statement in the C language, or in the grammar of this invention; statements are compiled by the Script Translator into instructions.

Subset construction—the technique known in the art of converting an NFA to a DFA, allowing more efficient execution; in this invention, subset construction is used to create more efficient NFAs, and to solve the convolution problem associated with subjunctive expressions.

Subset node—a node of the subset-constructed graph; in the art, generally shown as a set of nodes in the original NFA, by enclosing those node numbers in braces.

Virtual Machine (VM)—in this invention, refers to the FORTH engine, and the instruction language created for this variant of FORTH.

"Winning" accept state—in this invention, the "winning" accept state not only has "eaten" the greatest number of characters (greediest), but if there are multiple accept states satisfying the "greedy" condition, the one chosen will have the lowest/best sequence of arcnum sequences.

8.2 Coding Conventions and Standard Grammar Variations

The following list of documentation conventions, as well as variations relative to the standard C grammar, relate to the specification that follows.

To show a single statement or expression, . . . ; is sometimes used as a placeholder, along with a comment to indicate the purpose, rather than writing the code itself.

To show a group of two or more statements, . . . ; . . . ; is used as a placeholder, along with a comment, rather than writing the actual code for statements that would accomplish that purpose.

For both simplifying (expediting the development of) the C-style interpreter (which implements the grammar of this invention), and to make it easy to read example scripts, the C-style for function declarations has been slightly altered, requiring the additional keyword function.

The parameters for both functions and templatized production rules in the grammar follow the style of various IDLs—that is, there are three types of parameters, the in param, the out param, and the in out param; the in modifier is assumed if no modifier is given.

String literals, character literals, and integer literals are expressed as in Java; accordingly, the char datatype is a 2-byte Unicode character.

Character-class literals are like those of Perl, except embedded in single-quotes.

Arrays are defined and used as in Java, except that arrays are automatically growable; there is no such thing as an ArrayIndexOutOfBoundsException in the grammar of this invention.

length and equals are support keywords, such that the following expressions are seen in examples, to indicate that correct results are generated:
length(myArrayVar)
length(myStringVar)
equals(myArrayVar1, myArrayVar2)
equals(myStringVar1, myStringVar2)

Every variable type, even char and int and boolean, can be assigned to the null object; in fact, any variable not assigned when declared, is implicitly given an initial null value.

Casting from one type to another uses the syntax that looks like a function call, not the syntax adopted by Java.

Widening from a char or String to a Pattern is done implicitly where necessary.

Some literals can be cast from type to type as in the following simple lines of code that represent a carriage return and linefeed:
char CR=char::13;
char LF=char::10;

Static blocks of code look and behave exactly as in Java.

system::print(myString) and system::println(myString) print to standard out.

The grammar of this invention has greatly relaxed C's restrictions concerning the comma separated pre-list and post-list (statement lists) of the for-statement. In fact, any valid statement of the language (except tokenize and return) can be included in those comma-separated statements; not because it is necessary to extend the capability of the C-style for statement, but because the syntax (and therefore common coding portions) of the for-statement is the same as that of the "do-pattern", and because it is important that the pre-list and post-list of the "do-pattern" allow almost any type of statement that the programmer wishes to use (other than tokenize and return).

8.3 Grammar Specification

The grammar of this invention as it relates to regular expressions will be shown in this specification section. The invention is (1) a complete grammar for regular expressions, which (2) has been integrated within the framework of the standard expression operators and rules, statement grammar, basic data types, and keywords of the C programming language. The example scripts show that (2) has been done, as part of the invention. Meanwhile, the grammar "proper" of this invention is a complete grammar for regular expressions, including extensions specified as follows.

8.3.1 Pattern Primitive

The language of the present invention has created a primitive data type called Pattern that is used to represent every instantiation of a regular-expression. Thus, regular expressions can be assigned to scoped variables of type Pattern, allowing regular expressions to be built both dynamically and incrementally, as seen in examples. For a programmer using the grammar, Pattern is to be thought of as a primitive, not a structured object. Or, equivalently, the programmer may consider it as a complex structure, so long as he/she realizes that it is really a const structure, similar in this respect to the semantics of a Java String, as known in the art. Once a regular expression has been created and assigned to a variable of type Pattern, this variable (plus any other variables to which it is assigned) will always reference that "particular" regular expression object, semantically and in fact.

8.3.2 tokenize Statement

In the art, as in Perl/Python etc., searching, recognizing, tokenizing, and extracting is done by applying regular expressions to strings and documents, in a range of statement forms. Early in the design of the grammar of the present invention, the conscious decision was made to create one statement syntax, which in combination with regular expressions, could simultaneously accomplish any of the above purposes. Setting this as a goal was important, because it forced the design of a truly complete grammar for composing regular expressions. It was an objective of the present invention that the intent of the programmer be revealed primarily through regular expression compositions. It was discovered that a single tokenize-switch statement syntax could accomplish this purpose. Although the grammar will be augmented to include variations of this tokenize-switch statement as convenience forms for the programmer, the important point is well established in the examples—all forms of searching, recognizing, tokenizing, and extracting are accomplished with the tokenize statement.

If the programmer wishes to build his/her own search/match/extract utility (re-usable) functions, then he/she can do so by using the tokenize statement, in conjunction with appropriately designed regular expressions. Alternatively, the programmer can employ the production rule grammar of the present invention to create reusable (with parameters) regular expressions that encapsulate search, match, and/or extract semantics, and then use a properly instantiated rule (regular expression) with the tokenize statement.

The tokenize statement looks much like a classic C switch statement. The tokenize statement is "applied" to an input stream of characters, and includes one or more "cases", as well as an optional "default" case. In a C-switch statement, each "case" is an integer literal. In a tokenize statement, each case is an instantiated regular expression (Pattern). A single automata is created for the entire tokenize-switch statement by an internal union-composition of each case's regular expression. Triggering a particular "case", as a result of executing the tokenize statement, results in the statement block associated with that "case" being executed, just after the automata execution (relative to the input stream) has completed. The grammar for the tokenize statement is shown as follows:

```
Pattern p1 = ...;      // assign a regular expression value to var p1
Pattern p2 = ...;      // assign a regular expression value to var p2
Pattern p3 = ...;      // assign a regular expression value to var p3
Stream is = ...;       // we need an input stream
tokenize (is) {
    case p1:
        ...;...;       // statement block to execute if p1 is matched
                       // implied break-from-case here
```

```
-continued
    case p2:
        ...;...;      // statement block to execute if p2 is matched
                      // implied break-from-case here
    case p3:
        ...;...;      // statement block to execute if p3 is matched
                      // implied break-from-case here
    default:
        ...;...;      // statement block to execute if neither p1, p2,
                      // or p3 are matched
}
```

The present invention dispenses with the break statement, a requirement for the proper functioning of the C-switch statement, and often forgotten by the programmer. In the grammar of the present invention, the "break" is implicit. In fact, if the programmer were to insert a break at the end of a statement block for a particular "case", this break would indicate a break from a do-loop, while-loop, or for-loop surrounding the tokenize statement. In addition, variables declared locally to any case are automatically scoped separately from other cases, as there is no possibility of statement flow-through from one case to the next. This minor departure from C's model for the switch statement is seen as a convenience to the programmer, rather than being required in the implementation of the present invention.

Useful variations of the tokenize statement are possible, tailored to searching, tokenizing, or matching. They are not considered to be essential to the novelty of the invention, and they are left out of this document, because it is important to show in the examples that all manner of searching, recognizing, tokenizing, and extracting can be accomplished by the tokenize statement.

8.3.3 Stream Data Type

The Stream data type is a another built-in data-type of the grammar of the present invention, designed expressly for use with the tokenize statement. Objects of this type represent a stream of characters which can be "fed" to the tokenize statement. After the execution of the tokenize statement (through its underlying automata), an ACCEPT condition results (triggering the execution of the appropriate "case" block of that statement). The stream's cursor is advanced to correspond with the number of characters that were "eaten" by the automata in order to reach the ACCEPT condition.

To make it easy for programmers to create streams, the grammar includes a special literal syntax for constructing a Stream inline—to embed the characters of the stream inside {{ and }}. The examples throughout this document use this literal syntax, and embed example streams into the example source in-line, which helps to make the examples very readable, i.e. no example script has an external reference to code or text. Optionally, the String literal can be used to assign target streams, and then assigned (cast) to a Stream variable, but the Stream literal syntax has the advantage of allowing the easy insertion of linefeeds into the Stream literal, as well as unescaped double-quotes. Note that, in contrast to a String object, a Stream object is mutable, in that it has a cursor which advances as the Stream is being tokenized.

8.3.4 C-like Grammar

For the most part, the grammar of the present invention adheres closely to the syntax of C in the following— function declaration, syntax for various statements such as if-statements, while-statements, etc., variable scoping rules and variable declarations, and most especially, C-expressions, including the operators and rules for associativity and precedence of sub-expressions. Minor variations to the standard C-grammars were discussed above in section 8.2. The engine of this present invention does not implement the entire C-specification, nor the object-oriented grammar extensions of C++. It does, however, implement the core of the C-grammar (as mentioned above), to illustrate the claim that the regular expression grammar of the invention has adhered to the standard expression grammar of C, and to show that normal C-statements can indeed be embedded in the "do-pattern" construct. To this end, the working examples in this document show that all aspects of the regular expression grammar of this present invention can be successfully included in a C-style grammar. The specification for C-expressions, C-statements, C-variables, C-literals, C-functions, C-scoping rules is known in the art and not presented here.

8.3.5 Pattern Compositions

Throughout all of the following recipes for Pattern compositions—i.e. rules for composing regular expressions in the grammar—the syntax is shown textually first, as it would appear in a code-snippet, and then is shown as the NFA which models that grammar. Every NFA will have a single entry node and a single exit node. The exit node corresponds with the ACCEPT node for that NFA, such that if that NFA were actually being executed by the automata execution engine, an ACCEPT condition occurs if and only if the exit node is reached as the engine "consumes" characters from the stream.

In a sense, the entry node of the simple modeling NFAs corresponds to the LHS (left-hand-side) of the regular expression which is being representing by the NFA. The RHS (right-hand-side) of the regular expression corresponds with the exit node of the NFA.

Arcs of the modeling NFAs will be labeled in the following ways.

With the word null, indicating the null transition, known in the art; a transition along this arc can/must occur without "eating" any characters from the stream.

With a character literal, as is done in the art. These literals will include single-quotes, even in all of the diagrams. A transition along such an arc occurs when the next character in the stream matches the character on the label.

With a character-class or negated character-class, as is done in the art. These character-class literals will include single-quotes, even in all of the diagrams. A transition along such an arc occurs when the next character in the stream belongs to the set of characters described by the character-class (or negated character-class) literal.

With the any keyword, which indicates that any next character in the stream allows a transition across the arc.

With the eof keyword, which indicates that a transition along this arc occurs if the stream cursor is at the end of the stream.

As instruction arcs with labels such as $i_1$, $i_2$, $i_3$, and so on. Instruction arcs are like null transitions to the engine, except that when the engine makes a spontaneous transition across an instruction arc, it also "remembers" or "accumulates" the corresponding instruction array to the new execution "thread" being spawned by this spontaneous "instruction transition". These instruction arcs are are used primarily to model the "capture-patterns" and "do-patterns". Sections 8.5.1.2.3–8.5.1.2.5 & 8.5.1.3 show that the introduction of instruction arcs to the automata of this invention successfully models all of the regular expression grammars of this invention that include/imply side-effects.

As an expository short-hand, some NFAs shown in this section will include arcs labeled with the name of another Pattern (sub)composition. The actual automata composed by the engine does not have an such arc. But the composition technique shown immediately below is so simple that this notational shorthand is sufficient for describing the way regular expressions of the invention are modeled as NFAs.

Consider the following two expressions:

```
Pattern P1 = ('A' | '[AB]' | 'C') + (null | "AB");
Pattern P2 = any + (P1 | 'X') + any;
```

The first Pattern, P1, consists of binary expressions and literals (including the null Pattern literal). The corresponding, fully composed, NFA graph will therefore consist of an entry node and exit node, connected with arcs labeled by literals, and including two other nodes, as follows:

Pattern *P1*=('*A*'|'*[AB]*'|'*C*')+(null|"*AB*");

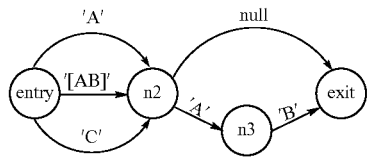

Notice that the String "AB" was effectively converted to 'A'+'B' by the engine. Now, the graph for the second Pattern must in some way include the graph of the first pattern. But before showing the fully composed NFA graph for Pattern P2, a convention is adopted whereby NFA figures are shown whose arcs have not been fully reduced to valid engine arc types. That is, some arcs may be labeled with a reducible Pattern variable, such as in the following diagram for P2, which has an arc from node n2 to node n3 labeled as P1:

Pattern *P2*=any+(*P1*|'*X*')+any;

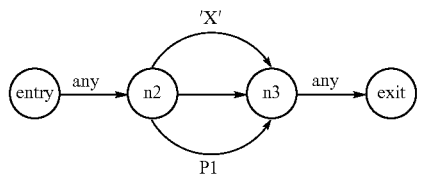

An examination of the source file ArcValue.java will show the engine of the present invention only supports three arc types, the null arc transition, the character-class arc, and the instruction-array arc. It is quite easy to represent the any wildcard as a negated character-class, and of course the character 'X' above can be represented as a character-class. But the arc labeled as P1 in the diagram has no representation in ArcValue.java.

Because P1 is really another graph, not an arc, the above diagram requires further reduction in order to produce a valid NFA. The reduction is so simple that a "pseudo-graph" like the above has great value, especially for showing diagrams for each of the binary and unary operator compositions of the invention (except the subjunctive form).

An important rule has been adopted (by the engine) for all of the NFAs (whether composed from expressions or produced by subset construction)—there is exactly one entry node and one exit node, and that the one entry node has only outbound arcs, and the one exit node has only inbound arcs.

Therefore, the transformation/reduction from a "pseudo-graph" to a valid NFA is made by inserting P1's entry node's outbound arcs into node n2 of P2, and by redirecting P1's exit node's inbound arcs to point to node n3 of P2, as follows:

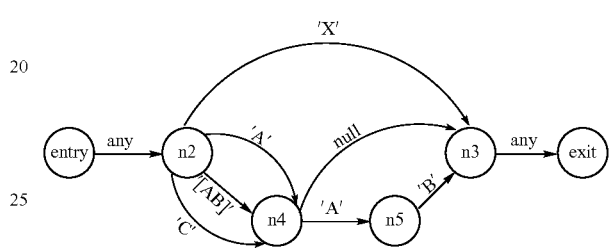

An equivalent means to accomplish the reduction to a "real" engine NFA is to "attach" the entry node of P1 to node n2 of P2 with a null arc, and to "attach" the exit node of P1 to node n3 of P2 with a null arc. The engine usually does this, although sometimes it also copies the outbound arcs of an entry node to another node. Here is this second approach to transformation/reduction:

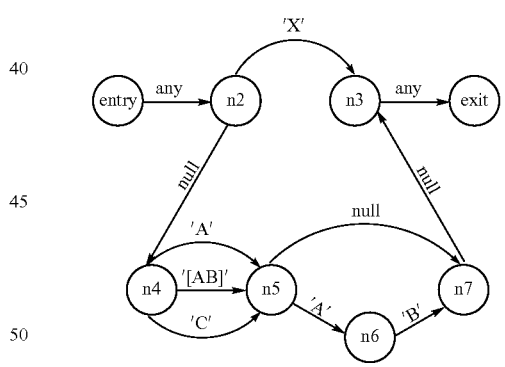

The following sub-sections will often use diagrams with arcs labeled as reducible patterns when showing how the engine composes binary and unary expressions into NFAs that model such expressions.

8.3.5.1 Irreducible (Primary) Expressions

The irreducible (primary) expressions of the present invention include character literals, character-class literals, the null literal, the eof literal, the any wildcard, and the reject literal. These primary expressions can be used anywhere that a Pattern is expected. In the code statements below, the primary expression is being used as the RHS of a declaration of the Pattern variable P1, P2, etc. (though of course these literals can be used anywhere a Pattern is expected):

```
Pattern P1 = reject;
Pattern P2 = null;
Pattern P3 = any;
Pattern P4 = eof;
Pattern P5 = 'A';
Pattern P6 = 'B';
Pattern P7 = '[AB]';      // character-class literal
Pattern P8 = '[0–9]';     // character-class literal w/ range
Pattern P9 = '[^a–z]';    // negated character-class literal
```

The first 4 declaration expressions are based on 4 special keywords of the grammar: reject, null, any, and eof. The reject literal is a special grammar form, represented by the following simple automata, having a single entry node, a single exit node (as always), but no connecting arc.

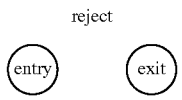

This grammar form has great value in line-by-line union-compositions (via for-loops) as well as in a particular design pattern for instantiated production rules, both of which are illustrated in examples of this document. An important footnote is that the original design document for this invention showed an accept literal as a proper complement to this reject literal. However, as is explained in section 8.6, no reasonable NFA was found to model the accept literal, nor does it have a clear meaning for the programmer, whereas the reject literal is a primary expression literal that does expand the ability of a programmer to create useful regular expressions.

The null keyword is used for a null arc transition (null is also used in the language for a null object value). When the Automata Execution Engine (of the present invention) encounters a null arc, it spawns a new thread (cloning the current execution thread's state), whose starting node is the destination node of the null arc. The current thread does not make the spontaneous/null transition; the spawned thread does. This type of arc transition is called "spontaneous" because it occurs without "eating" any characters from the stream. Some regular expression languages in the art do not have a null keyword, although almost all texts on finite automata and regular expressions do. Some of the examples of this document show line-by-line concatenation-compositions that require a null literal, though normally the unary ? operator suffices (and is more readable) for the purpose the programmer intends. Here is the NFA for a null literal:

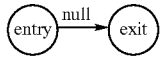

The any wildcard in the grammar is not the . (dot) character as in some grammars of the art. Instead, the . (dot) operator is reserved for accessing members of structs, normal in C-like languages. The any wildcard was chosen very early in the design for the language. Further, the any wildcard behaves exactly as in other languages, in that it matches/consumes any single next character in the stream. Because the Automata Execution Engine component, like other engines in the art, employs the "greedy" algorithm, programmers must beware that combining the any wildcard with the unary * (repeat 0 or more times) carries the risk of "eating" all the way to the end of the stream and then backtracking. At one point of the implementation of the engine for the present invention, the any wildcard was a special arc value (note the missing 1-constant in ArcValue.java). But because the language of the present invention includes an eof literal as a sentinel to match an imaginary character signaling the end-of-stream, it is more efficient to let the any wildcard match everything except the eof. In this sense, the any literal is reducible to a negated character-class—'[^\uFFFF]' since the imaginary eof character is represented by a Unicode 0xFFFF in the engine. But since this is an implementation artifact, the any literal is to be understood as irreducible, and to be represented by the following simple NFA:

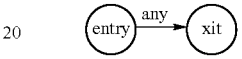

... although the following simple NFA describes what the engine is doing:

Other languages in the art provide various types of sentinel short-hands (such as for end-of-line). Additionally, the eof literal is discussed as an important sentinel for the programmer of regular expressions, on page 91 of Ullman's "dragon book"—"Compilers: Principles, Techniques, and Tools". Because the programmer can use a literal of choice—'\n' or '\r\n'—to represent an end-of-line, the language of this invention offers only the eof sentinel, which represents an imaginary character sitting just after the end of a stream. (Internally, it is represented as '\uFFFF' as mentioned above in the discussion on the any literal.) An especially important point concerning the eof literal is that although it "represents" an imaginary character, it nevertheless does not "eat" from the stream. Therefore, even if a "capture-pattern" sub-expression includes the eof literal, the "captured" substring will not be terminated with '\uFFFF'. In conclusion, the following eof literal is fundamental to the grammar, and is drawn as:

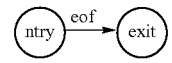

The next 3 types of literals actually have a single representation in the engine—that is, as a CharClass object (see CharClass.java and ArcValue.java). This is possible because the CharClass object is a set of characters, with a flag indicating whether or not the character-class is negated. A char literal would therefore be represented by a CharClass, normal, not negated, with just one character in its set. The Automata Composition Engine represents all character "eating" arcs as an instance of a CharClass object (attached to an ArcValue object), simplifying set-arithmetic for computing new arc values in the subset construction algorithm (see the Union, Diff, and Sect functions of CharClass.java and see Transition.java lines 203–207).

A character-class labeled arc, whether normal or negated, "eats" just one character from the input stream being tokenized—either from the list of characters in the set, or any character not in the given list. In the design document for the invention, created prior to "reduction to practice", the character class syntax was as follows:

```
Pattern p1 = ['a', 'c', 'u'..'z'];
Pattern p2 = [^ ' ', '\t', '\n', '\r'];   // not a space
```

But, implementation of the C-style interpreter revealed that this syntax was not suitable for the C-style interpreter, because of the meaning normally given to the [ and ] tokens. The alternative, to "borrow" array initializer syntax, was seen as undesirable because regular expression programmers are accustomed to opening and closing a character-class with the [ and ] meta-characters:

```
Pattern p1 ={'a', 'c', 'u'..'z'};
Pattern p2 = {^ ' ', '\t', '\n', '\r'};   // not a space
```

It was therefore decided that a character-class and a negated character-class should follow a syntax similar to that of Perl. However, this approach also suffered the disadvantage that the C-interpreter treats the [ and ] operator as special tokens. The solution settled upon was to introduce a new literal form to the language, the same character-class syntax that regular expression programmers are accustomed to in the art, but embedded inside single-quotes. The choice of single-quotes carries the connotation that the literal "eats" only one character from the stream. The grammar of this invention therefore represents character-classes as follows:

```
Pattern p1 = '[acu-z]';
Pattern p2 = '[^ \t\n\r]'   // not a space
```

Based on the above discussion, Patterns P5 through P9, shown at the beginning of this section, are all represented with a single arc connecting entry to exit node, labeled with either the single-quoted char literal or the single quoted character-class literal of the grammar. For example, the following graph represents a literal expression which "eats" the letter 'A':

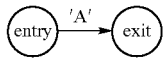

The next graph represents a literal expression that will "eat" either 'A' or 'B', but nothing else.

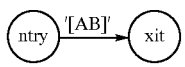

Finally, the following graph represents a literal expression which "eats" the next character, so long as it does not match a lower case ASCII letter (a–z).

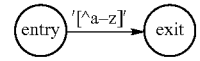

8.3.5.2 Unary Pattern Compositions

As with other regular expression grammars of the art, there are 3 unary operators in the grammar of this invention: ? is used to modify a given expression, making it optional; + is used to allow a given Pattern expression to repeat 1 or more times, and * is used to allow a given Pattern expression to repeat 0 or more times. It is true that each of these unary forms is reducible as shown in the following lines of code, but these forms are well established as a convenience to the programmer.

```
Pattern p   = ...;
Pattern p1  = ?p;
Pattern p1a = p | null;    // equivalent to p1
Pattern p2  = *p;
Pattern p2a = p*0;         // equivalent to p2
Pattern p3  = +p;
Pattern p3a = p*1;         // equivalent to p3
```

The original syntax for these unary operators was modeled after the syntax of the production rules of an online XML specification at the site http://www.xml.com (at the page /axml/testaxml.htm), used to explicate the grammar of XML:

```
Pattern p  = ...;
Pattern p1 = p?;    // correct in other grammars, wrong in this one
Pattern p2 = p*;    // correct in other grammars, wrong in this one
Pattern p3 = p+;    // correct in other grammars, wrong in this one
```

The difference is the question of whether the unary operator comes before or after the expression being modified. Development of the interpreter for this invention revealed that despite the fact that regular expression programmers are accustomed to the unary operator coming after the expression, the correct approach for a grammar adhering to the expression rules of C is to put the unary operator before the regular expression being modified.

The reason re-positioning is that * and + and ? are also binary operators in C. The appropriate way to avoid creating problems of backtracking and ambiguity in the interpreter is to require that programmers of the grammar of this invention alter their habit, and put the unary operators before the pattern expression being modified. The following expressions are written under the (undesirable) assumption that pattern unary operators come "after":

```
Pattern p = a+  +  b+  +  c;   // spacing shows correct precedence
int i = a  +  +b  +  +c;       // spacing shows correct precedence
```

It is apparent that the correct grouping precedence chosen by the C-interpreter would be different depending on the data-type of the sub-expressions. This is especially inappropriate for a C++ interpreter, which allows overloading of operators, with the presumption that the binding/precedence rules governing expressions are independent of data type.

With the * and ? operators, the problem is less severe, for the interpreter could be written to resolve the question of treating a * or ? as unary or binary by "looking ahead". However, since the C expression grammar was designed to generally not require a "look-ahead" interpreter, and because of the insurmountable obstacle associated with the + operator above (under the unary-after scenario), the grammar of this invention requires programmers of regular expressions to put the ? and * and + unary operators before the regular expression being modified.

8.3.5.2.1 Unary Optional ?

Consider the following snippets of code for the unary ? expression.

```
Pattern P1 = ...;      // set P1 to some Pattern expression
Pattern P2 = ?P1;      // P2 is the same as (P1 | null)
```

When reducing P2 to a graph, the engine first reduces P1 to a graph segment, and then inserts an additional null arc between the entry and exit. Graphically, this is represented as follows:

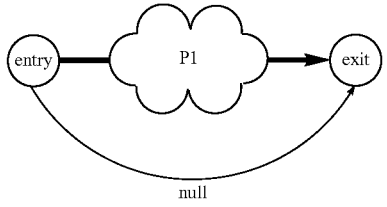

P1 is shown as a "cloud". There may in fact be one or more arcs emanating from the entry node into the cloud and there may be one or more arcs emanating from the cloud into the exit node. This is indicated in the diagram (and subsequent diagrams with "clouds") by triple thickness lines into and out of the "cloud". The composition of P2 has simply added a "short-circuit" null arc between the entry and exit nodes of the graph produced by P1, but only if P1 does not have a short-circuit.

An examination of the source code for OptionalGrammar.java, shows that this null arc is unnecessary and incorrect if there is already a "short-circuit" within the P1 "cloud". Additionally, a full understanding of UnionGrammar.java's algorithm, which uses the ButNotGrammar internally to "clean" multiple short-circuits, reveals that "short-circuit" ambiguity must be avoided. The full explanation, as given in section 8.5.2.2.7, involves possible side-effects of P1.

Thus, the following is the correct diagram for a unary ? operator expression when P1 is already short-circuited, showing in this case that the ? operator is effectively ignored during composition:

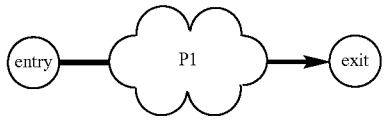

8.3.5.2.2 Unary Repeat *

As with other regular expression grammars, the * unary operator is used in the grammar of this invention to modify a sub-expression Pattern, so that it can recognize 0 or more occurrences of that Pattern. The number of "repeats" recognized for a sub-pattern depends on the entire automata composition, in consideration of the "greedy" algorithm of the art as well as the novel arc-numbering algorithm discussed in section 8.5.2.2.

Consider the following snippets of code for the unary * expression:

```
Pattern P1 = ...;      // set P1 to some Pattern expression
Pattern P2 = *P1;      // P1 is repeated 0 or more times
```

As discussed above in reference to the unary ? operator, the unary * operator also precedes the Pattern being modified. Note that white-space is optional between the * and P1 in the above line of code, a natural by-product of using a C-style interpreter and a C-style expression grammar.

The following diagram shows how this expression is modeled in the engine by an NFA:

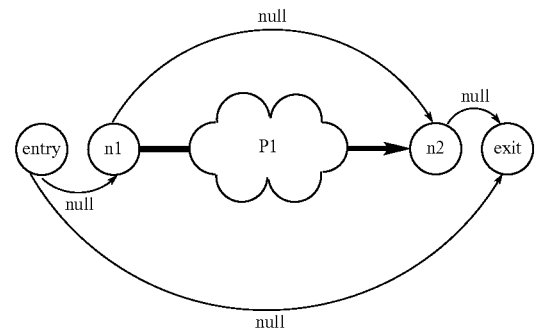

The fact that the engine does produce the graph shown above can be verified in RepeatGrammar.java, lines 105–108. However, the above diagram is correct only if P1 does not already have a short-circuit. If, however, P1 has a short-circuit, then, by the specification of the grammar, that short-circuit is removed internally (RepeatGrammar.java, lines 27–30) as if the programmer had written instead:

```
Pattern P1 = ...;            // set P1 to some pattern expression
Pattern P1a = P1 butnot null;  // remove short-circuit from P1
Pattern P2 = *P1a;           // P1a is repeated 0 or more times
```

In this case, the structure of the above NFA diagram is accurate, but P1 is replaced by P1a. It is important to remove a possible short-circuit from P1 before composing the above NFA, because this allows a more efficient subset construction algorithm to be written. An implication of this choice is that if P1 contains a short-circuit, and that the short-circuit in P1 includes instruction arcs, and that if P1 a matches 0 times for the "winning" ACCEPT thread, then the instruction arcs of the short-circuit in P1 are not part of the "side-effects" of the automata, per specification.

8.3.5.2.3 Unary Repeat +

The unary + operator, which modifies a given Pattern sub-expression so that it is "matched 1 or more times" against the input stream, has the following syntax:

| | |
|---|---|
| Pattern P1 = ...; | // set P1 to some Pattern expression |
| Pattern P2 = +P1; | // P1 is repeated 1 or more times | and has the following diagram:

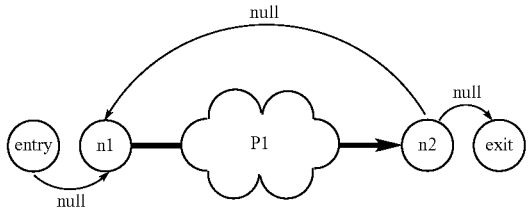

Note that this diagram is essentially the same as the diagram for the unary * operator, except that the null arc connecting the entry and exit has been removed. This forces the automata engine to make at least one "pass" through the P1 "cloud" in order to match P2.

But this diagram applies only if P1 does not have a short-circuit. In that case, the Automata Composition Engine behaves internally as if the programmer had written the following lines of code (see RepeatGrammar.java, lines 27–30):

| | |
|---|---|
| Pattern P1 = ...; | // set P1 to some pattern expression |
| Pattern P1a = P1 butnot null; | // remove short-circuit from P1 |
| Pattern P2 = P1 + *P1a; | // P1 once, then P1a, 0 or more times |

The diagram for this (short-circuit) case is:

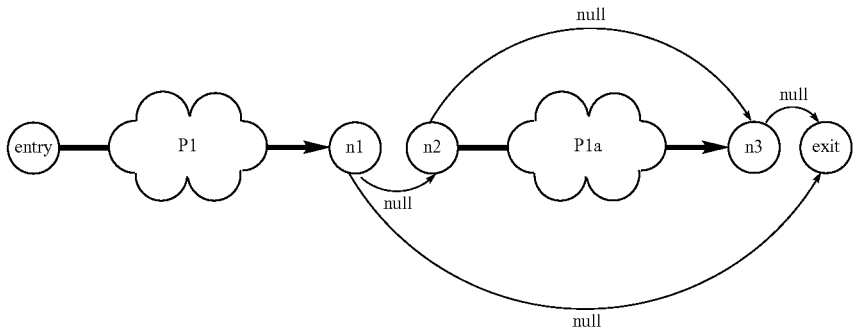

8.3.5.3 Binary Pattern Compositions

The binary regular expression operators of the grammar are as follows:

The + operator, which is adopted from C as the default concatenation operator.

The >+ operator, which is not part of the C language, but becomes the explicit left-to-right concatenation operator in the grammar.

The <+ operator, which is not part of the C language, but becomes the right-to-left concatenation operator in the grammar.

The | operator, which is adopted from C as the union operator.

The * operator, which is adopted from the C language for use as either the "repeat" operator (if the $2^{nd}$ operand is an integer) or as an "iterate" operator (if the $2^{nd}$ operand is a range).

The ? conditional operator, which applies the standard syntax and meaning of the C language conditional expression to Patterns.

The butnot and but operators.

With the exception of the >+ and <+ concatenation operators (which are given the same precedence level as the + operator) these operators, like all other operators of the grammar, follow the C hierarchy for operator precedence. FIG. 4 of section 7 shows the precedence table for all binary operators of the grammar which are applicable to Pattern expressions. As in the similar table for the standard C operators (which also applies to standard arithmetic and boolean expressions in the grammar of this invention) precedence moves from "tighter" binding to "looser" binding from top-to-bottom in the table of FIG. 4.

The associativity of overloaded operators is as in the C language. Relative to these binary operators, the unary operators discussed above have higher precedence, as would be expected.

The conditional expression (for regular expressions) in the grammar of this invention exactly follows the standard syntax of the C conditional expression:

| | |
|---|---|
| boolean b = ...; | // compute a boolean value |
| Pattern p1 = ...; | // create the $1^{st}$ pattern of the conditional |
| Pattern p2 = ...; | // create the $2^{nd}$ pattern of the conditional |
| Pattern p = b ? p1 : p2; | // p becomes p1 if b is true, otherwise p2 |

There is no NFA composition graph that represents this Pattern expression. Rather, the VM Engine uses the same code to handle this expression, as if p1 and p2 were some other data type, such as Strings. The resulting graph for this composition expression is therefore either the graph for p1 or else the graph for p2, depending on the value of the boolean.

8.3.5.3.1 Concatenation

Many regular expression grammars do not have a concatenation operator at all. In such grammars of the art, concatenation is assumed as sub-expressions read from left-to-right. However, in the grammar of this invention, which adopts the C-expression syntax for regular expressions, white-space is not acceptable as a way to separate terms of a concatenation, because white-space is not an operator of C. The primary concatenation operator is the + operator, chosen because this is also the operator used to express String concatenation, as with Java. There are two additional concatenation operators in the grammar, >+ and <+ signifying left-to-right concatenation and right-to-left concatenation respectively. The +operator, when used for concatenation of Patterns is referred to as the "default" concatenation operator, and always carries the "left-to-right" connotation. The syntax for the 3 binary concatenation expressions is as follows:

```
Pattern p1a = P1  + P2;    // default, left-to-right concatenation
Pattern p1b = P1 >+ P2;    // explicit left-to-right concatenation
Pattern p1c = P1 <+ P2;    // right-to-left concatenation
```

All three of these concatenation operators have a level of precedence that matches the standard precedence level of the standard + operator, as shown in the precedence table above. The structure of an NFA concatenation composition is not affected by whether the concatenator operator is for right-to-left concatenation or left-to-right concatenation. Rather, the arc numbering is potentially different for a right-to-left concatenation versus a left-to-right concatenation of the same LHS and RHS terms. (Arc numbering will not be different at all if neither the LHS nor RHS contain arc instructions.) Therefore, for all 3 of the above concatenations of P1 and P2, the NFA composition (when not showing arcnums) is as follows:

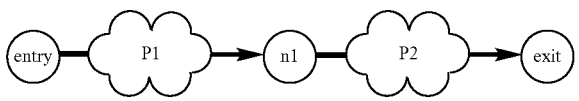

The ConcatGrammar.java class also detects consecutive concatenations of the same greedy "sense" (right-to-left or left-to-right) and groups all of the terms, such that the following line of code:

Pattern p=P1<+P2<+P3;

and is drawn as follows.

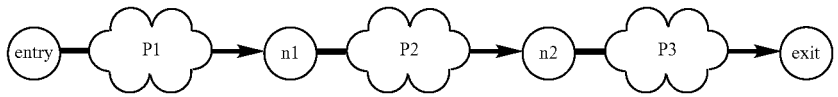

8.3.5.3.2 Union

The binary union operator of the grammar is used to create an expression which will "match either the first pattern of the expression or the second pattern of the expression". The union expression, and how it is modeled by an NFA, is well-known in the art. Consider the following union expression:

Pattern P=P1|P2;

An examination of UnionGrammar.java shows that this expression is modeled by the engine of this invention as the following NFA:

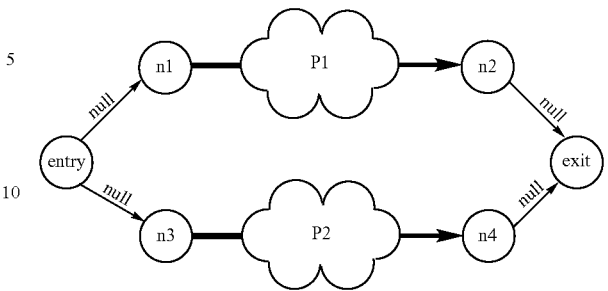

Likewise, the following union expression with 3 terms:

Pattern P=P1|P2|P3;

is modeled as:

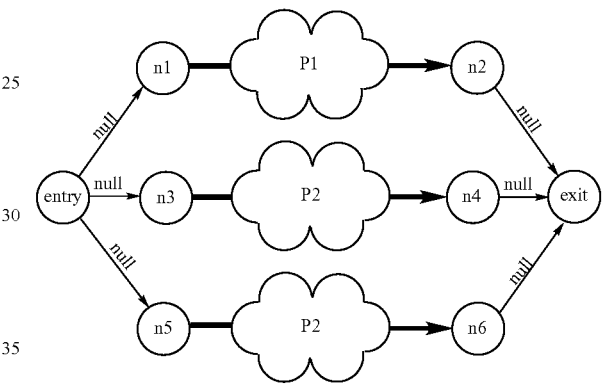

However, there is actually a variation that takes place (in UnionGrammar.java) if 2 or more patterns in the union have short-circuits. Consider the following expression, under the assumption that patterns P2 and P3 have "short-circuits", that is, there is a path from the entry to the exit of both P2 and P3 which encounters only null arcs and instruction arcs:

Pattern P=P1|P2|P3;

The Automata Composition Engine (as seen in UnionGrammar.java, lines 50–75) behaves internally as if the programmer had written the following code:

```
Pattern P3a = P3 butnot null;
Pattern P = P1 | P2 | P3a;
```

Then, the reduction to an NFA results in a graph similar to the one shown above except that P3 is replaced by P3a. The reason for this is that the grammar requires (per specification) that in a union of patterns, terms to the left have matching precedence to the terms to the right, assuming that each term would match the same number of characters. In a language without systematic side-effects, this requirement is irrelevant, but in the grammar of this invention, it is quite possible for 2 terms of the union to match the same characters, but generate different instruction arc side-effects. In that case, the specification requires that the term to the left be used for the match. This is normally handled automatically by the arc-numbering algorithm (of section 8.5.2.2.5), but with "short-circuit" paths, arc-numbering does not help (null arcs and instruction arcs are not part of the numbering, nor should they be, as explained in section 8.5.2.2.7). Therefore, in the case where there are 2 or more short-circuited terms in the union, and because these terms may include instruction arcs along the short-circuits, the engine must effectively remove the short-circuits of the $2^{nd}$ through $N^{th}$ short-circuitable terms, to assure proper results.

8.3.5.3.3 Repeat and Iterate

The "repeat" and "iterate" binary expressions both use the * operator. The "repeat" operator has the programming semantics of "match N or more instances of a sub-expression" and is showing in the following rule:

```
int N = ...;          // assign integer N to some repeat value
Pattern P = ...;      // assign Pattern P to some regular expr
Pattern rP = P * N;   // Pattern rP matches N or more instances of P
```

The "iterate" pattern expression follows the same syntax, except that the value which modifies the pattern is a range, not an integer. A range in the grammar of the invention is therefore a primitive data type not found in C, which is formed by a simple binary expression using the (dot-dot) .. operator of this invention to bind the from-point of the range to the to-point of the range, inclusive. The following code-snippet shows the expression rules for creating an "iterate" pattern:

```
range R = 3 .. 5;     // a range from 3 to 5, inclusive
Pattern P = ...;      // assign Pattern P to some regular expr
Pattern iP = P * R;   // iP matches from 3 to 5 occurrences of P
```

The C-style interpreter of the invention has a table-driven scheme (technique known in the art) to map all valid operator types for each operator (seen in SUnit_Expr.java). This table of valid operator type/operator tuples ensures that the Script Translator will correctly produce the correct FORTH tokens for "iterate" versus "repeat" expression, even though both use the binary * operator.

The algorithm that converts a general "repeat" expression to an NFA actually uses "irreducible" compositions already seen above. There are 3 reductions employed. The first reduction case applies to a binary "repeat" expression where the count is 0:

```
Pattern P = ...;      // assign P to some Pattern expression
Pattern rP = P * 0;   // binary * operator to repeat N+ times, N=0
``` and the engine treats this code as if it were written:

```
Pattern P = ...;      // assign P to some Pattern expression
Pattern rp = *P;      // unary * operator to repeat 0 or more times
```

The conversion of the Pattern rp=*p to an NFA was seen above in the discussion of the unary * operator.

The second reduction case applies to a binary "repeat" expression where the count is 1:

```
Pattern P = ...;      // assign P to some Pattern expression
Pattern rP = P * 1;   // binary * operator to repeat N+ times, N=1
```

The engine treats this code internally as if it were written:

```
Pattern P = ...;      // assign P to some Pattern expression
Pattern rp = +P;      // unary + operator to repeat 1 or more times
```

The conversion of this Pattern rp=+p to an NFA was also seen above, in the discussion of the unary + operator.

Finally, cases where the repeat count is at least 2 follow an approach, illustrated here with a repeat count of 3:

```
Pattern P = ...;      // assign P to some Pattern expression
Pattern rp = P * 3;   // recognize 3 or more instances of P
``` which is internally reduced by the engine (RepeatGrammar.java, lines 27–30) as if the following code had been written:

```
Pattern P = ...;      // assign P to some Pattern expression
Pattern P1 = P;       // P1 -> "recognize 1 instance of P"
Pattern P2 = P;       // P2 -> "recognize 1 instance of P"
Pattern P3 = +P;      // P3 -> "recognize 1 or more instances of P"
Pattern rp = P1 + P2 + P3;
```

The NFA for this expression is composed first by applying the NFA for the unary + operator to produce P3, and then using the NFA composition already shown for a concatenation of 3 elements. For the general case of repeat count of N, the last term of the concatenation is always "1 or more instances of P", and the first N−1 terms are cloned sub-graphs produced by P.

The "iterate" grammar, as was seen above, uses the same binary * operator as the "repeat" expression, but the value after the operator is a "range" rather than an integer. The code which constructs the NFAs for an "iterate" expression also employs various reductions. The first case occurs when either N1 or N2 of the range are negative, or when N1>N2, such as in the following expressions:

```
Pattern P = ...; // set P to some expression
Pattern iP1 = P * -1..2; // iterate at least -1 times, at most 2
Pattern iP2 = P * 2..-1; // iterate at least 2 times, at most -1
Pattern iP3 = P * 2..1;  // iterate at least 2 times, at most 1 times
```

By specification of the grammar, expressions iP1, iP2, and iP3 "accept" nothing at all, and so the above lines of code could have been equivalently written:

```
Pattern P = ...;          // set P to some expression
Pattern iP1 = reject;
Pattern iP2 = reject;
Pattern iP3 = reject;
```

This is seen in IterateGrammar.java, lines 18–22. The second special case occurs when both N1 and N2 of the range are zero:

```
Pattern P = ...;
Pattern iP = P * 0..0;
```

In this case, per specification, iP is reduced to the null expression, as if the following lines of code had been written:

```
Pattern P = ...;
Pattern iP = null;
```

The next case to consider is any range not covered above, but assuming that the Pattern P does not have a short-circuit. The code here is:

```
Pattern P = ...;     // P:= some Pattern not having a short-circuit
Pattern iP = P * N1..N2;   // N1 <= N2 and N1 >= 0 and N2 > 0
```

This of course means that P is "repeated from N1 to N2 times". Consider the case where N1 is 3 and N2 is 5. The engine first creates 5 cloned NFA graphs from the pattern P. Then it connects them from end-to-end as if concatenated. Then it short-circuits the last (N2–N1=2) sub-segments. In other words, assuming N1 and N2 are 3 and 5 respectively, the engine behaves as if the following code were written:

```
Pattern P = ...;   // P is any pattern without a short-circuit
Pattern iP = P + P + P + ?P + ?P;   // recognize at least 3, at most 5
```

Per specification, if N1 were 0, then all terms of the concatenation are short-circuited. Graphically, consider the case where N1 is 2 and N2 is 4. The following shows that the replicated instances of NFAs generated by P are concatenated, and that the last 2 segments are short-circuited:

Finally, the case for general values of N1 and N2, but on condition that the Pattern P is already-short-circuited is handled differently. In fact, per specification, IterateGrammar.java performs the following reduction (lines 35–45):

```
Pattern P = ...;      // assign P to some Pattern with a short-circuit
Pattern P1 = P but null;
Pattern P2 = P butnot null;
Pattern iP = (P1 * N1..N1) + (P2 * N1..N2);
```

The motivation for this reduction is that a clear choice must be made for how many times to repeat the short-circuit portion of the graph, since if the short-circuit portion of P is what matches (i.e. no characters of P match at all against the input stream), the stream is of no help in determining how many times it matches. Therefore, per specification, the short-circuit portion of P matches N1 times, so that if there are embedded instructions in P, those instructions are replicated Ni times. Of course, if N1 is 0, then the first term for iP, in the last line of the above snippet, disappears.

8.3.5.4 Pattern Compositions Based on Do-Patterns

The "do-pattern" of the grammar of this invention represents a new approach to handling "side-effects" of regular expressions and finite automata. The "do-pattern" causes instructions to be embedded directly in the automata. The grammar of this invention includes 3 grammar forms which can be modeled most effectively by creating automata with instruction arcs. In order for the resulting NFA with instruction arcs to be of value in modeling, the engine for the grammar of this invention must be capable of executing these NFAs, and doing so efficiently. This requirement is answered by working examples, by the source code, and in the algorithms section. The 3 regular expression grammars which rely on embedding instruction arcs into the NFAs are:
  the "do-pattern"
  the "capture-pattern"; and
  the parameterized production rule.

This embedding of instruction-arcs into the automata is accomplished with a low-level "do-pattern". That low-level "do-pattern" is represented and rendered to an appropriate NFA in the source file DoGrammar.java. All 3 of the above regular expression grammars resolve to low-level "do-patterns".

8.3.5.4.1 Do-Pattern

The grammar of the "do-pattern" is shown as follows:

```
Pattern P = ...;    // assign any pattern expression to the var P
Pattern dP = do (...,...;
                 P;
                 ...,...);
```

That is, the "do-pattern" begins with the keyword do, is followed by a left-parenthesis, is then separated by the

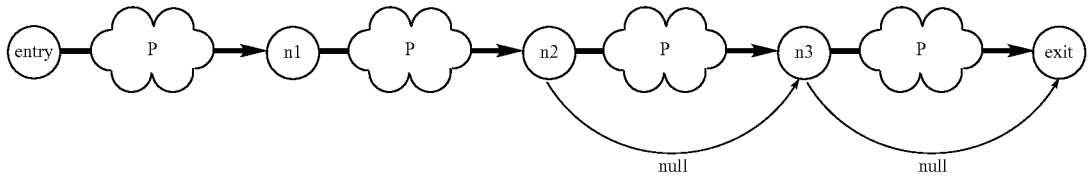

comma-separated "pre-list" of statements, is followed by a semi-colon, is followed by the sub-expression being recognized, is then followed by a semi-colon, followed by the comma-separated "post-list" of statements, and finally the right-paren. The 2 embedded statement lists of the "do-pattern" consist of comma-separated statements written in the same syntax as the statement lists of the C language's for-statement.

The meaning of this "do-pattern" for the programmer is as follows: attempt to match the embedded sub-expression (P in the above code-snippet); and, if the embedded sub-expression is matched as part of the corresponding automata's execution, accumulate the instructions compiled for the "pre-list" as well as the instructions compiled for the "post-list". Consider the following nested "do-pattern":

```
Pattern dP = do (...,...;         // instruction list i1
             do (...,...;         // instruction list i3
                 P;               // recognize P
                 ...,...;         // instruction list i4
             ...,...);            // instruction list i2)
```

The "pre-list" for the outer "do-pattern" is called i1 and its "post-list" is i2. The "pre-list" for the inner "do-pattern" is called i3 and its "post list" is i4. Further, assume that in a particular match against an input stream, the match to P results itself in a sequence of instructions, which is a function of both the input stream and the structure of P. Let this be called instrs(P, stream).

The resulting array of instructions generated as side-effects, if there is a match to dP above, is therefore a concatenation of the following sub-arrays of instructions:

{i1, i3, instrs(P,stream), i4, i2}

At this point, it is instructive to see how closely the low-level "do-pattern" grammar models the actual "do-pattern" grammar. Here is an actual code snippet with a "do-pattern":

```
1    static {
2        Pattern dP = do  (,,,;         // 2 empty stmts
3                         "AB";
4                         ,,,,);        // 4 empty stmts
5    }
```

And here is that snippet as compiled to and represented by FORTH words:

```
1    key $static2
2    {x
3        $0
4        {xx
5                      nop
6                      nop
7        xx}
8                      "AB" String.Pattern
9        {xx
10                     nop
11                     nop
12                     nop
13                     nop
14       xx}           pdo
15       assign
16    x} defineproc
```

The key FORTH words relating to this regular expression assigned to "dP" are explained in the table of FIG. 5 of section 7.

In the following NFA diagram that models this "do-pattern" composition, it refers to the sequence of 2 nops (lines 4–7), i2 refers to the sequence of 4 nops (lines 9–14), and P refers to the sub-expression "AB":

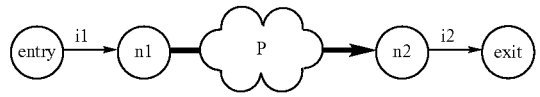

This simple NFA diagram successfully models the "do-pattern", the "capture-pattern", and the "instantiated production rule", because all of these 3 grammar forms of the grammar of this invention are translated to low-level "do-patterns", and a low-level "do-pattern" is modeled as an NFA as shown above. This NFA introduces a special type of arc, namely, the instruction arc. An instruction arc behaves like a null arc transition in that it "eats" no characters from the input stream and requires the spawning of a new automata execution thread when encountered by the automata execution engine. However, it also serves as a signal to the execution thread to accumulate the corresponding instruction array to the list of side-effects associated with that thread, which will be executed as side-effects for the entire automata if and only if the thread which traversed through that instruction arc is ultimately the "winning" thread.

8.3.5.4.2 Capture-Pattern

The grammar for the "capture-pattern" is as follows:

```
Pattern P = ...;          // assign P to any regular expression
String s;                 // declare a String variable to capture into
Pattern cP = &s (P);      // recognize P, while capturing into s
```

The only requirement for the variable being captured into, which is s in the above snippet, is that it must be current in scope relative to the capture-expression. It is important to know that the capture variable can even be declared in a "do-pattern" in which the "capture-pattern" is a sub-expression, as in the following code-snippet:

```
1    static {
2        String s;
3        Pattern P = do  (String temp;      // declare temp
                                            in do-pattern scope
4                        &temp ("AB");
5                        s = temp);
6    }
```

This code snippet translates as the following sequence of FORTH words (asmcap.tok):

```
1    $0 null assign
2    $1
3    {xx
4                 $2 null assign
5    xx}
6                 {xx $2 $$0 valueof capture xx}
7                 "AB" String.Pattern
8                 {xx capture streamstring assign xx} pdo
9    {xx
10                $0 $2 valueof swap 1 get assign drop
```

-continued

| 11 | xx} | pdo |
| 12 | assign | |

The declaration of the String variable "s" resolves to line 1. The "do-pattern" declaration of String variable "temp" resolves to lines 3–5. The "capture-pattern" itself resolves to lines 6–8. The assignment of "temp" to "s" in the post-list of the "do-pattern" resolves to lines 9–11. As would be expected from the discussion above, the translated FORTH code exhibits 2 nested low-level "do-patterns", the outer low-level "do-pattern" models the actual "do-pattern" of this example, and the inner low-level "do-pattern" models the "capture-pattern" of this example.

8.3.5.4.3 Production-Rule Grammar

The grammar for the production rule consists of 2 parts: the declaration of the parameterized production rule; and, the instantiation of a declared production rule. The instantiation of a production rule produces an actual pattern (regular) expression object. A rule declaration is made in function declaration scope (that is, wherever functions are declared, which in the grammar of the present invention, is at the declaration level of the script) and consists of the following parts in order:

1) the keyword production to initiate a rule declaration;
2) an identifier which gives the rule a name, analogous to the identifier for a function name;
3) a left-angle-bracket operator to begin the parameter list; this is required even if there are no parameters;
4) a list of parameters, comma separated; each parameter begins with an optional modifier—in, out, in out—which indicates whether the parameter is a "value" param or a "reference" param (usages explained in the examples section); after the optional modifier (in is the default), comes the type of the parameter followed by the name of the parameter;
5) after the list of the parameters is a right-angle-bracket;
6) next is the -> operator, which is an appropriate choice relative to the art, to signal the following definition of the rule;
7) next is the body of the production rule, which is simply any regular expression of type Pattern; this (single) regular expression may:
8) consist of any of the regular expression forms of the grammar of this invention, including another instantiated production rule, so long as all of the forms are bound through operators into a single regular expression;
9) the portion of the regular expression (body of rule) which specifies what the expression "eats" may either be literal values or in params; out params and in out params may not be used to specify "recognition" structure ("eating" characteristics) because this would require "back-referencing" functionality, which, per specification, is not supported (nor may variables of do-pattern scope ever be used to specify recognition-structure);
10) in parameters can also be used within statements of "do-patterns" that are part of the expression body;
11) out params and in out params can be used either in the "pre-list" or "post-list" statements of a "do-pattern" or as the variable to capture into in a "capture-pattern";
12) if other rules are instantiated within the body/definition of this production rule, any in parameters passed to the inner instantiation must either be literals or else come from the list of in parameters passed to this rule; similarly, any out or in out parameters passed to the inner instantiation must either be variables declared within a "do-pattern", or must be an in or in out parameter, of the rule being defined; and
13) the production rule definition closes with a semicolon.

The following example illustrates the syntax for defining a production rule.

```
production MyRule <in Pattern p, out String s, in out int count> ->
    (            &s ("AB" + p)
                 |
                 do (count++; '\n'; ) ) * 1
;
```

The above rule can be instantiated as in the following example:

```
int i = 0;
String temp;
Pattern P = MyRule<+' ', temp, i>;
```

The data-type of the instantiated rule is always Pattern—therefore, an instantiated rule can be used anywhere a Pattern variable or literal can be used. This includes: (1) in the body of another production rule; (2) for assignment to a variable of type Pattern; (3) in a declaration/assignment statement for a variable of type Pattern; (4) as any of the cases of a tokenize statement and; (5) as a sub-expression element of any of the pattern compositions given in this specification. The syntax for this instantiation is shown above. The name of the rule is followed by a left-angle-bracket, followed by the comma-separated value or reference expressions being passed as parameters, followed by the right-angle-bracket. This is much like a function call in the grammar, except that angle-brackets replace parentheses.

The ultimate reduction of an instantiated production rule to an NFA is accomplished first by transforming the rule to VM-level expressions already seen, including the "do-pattern". Therefore, the instantiated production rule is really a composition of forms already seen above. Details on how this composition is accomplished are discussed in section 8.5.1.3.

8.3.5.5 Subjunctive Compositions

The subjunctive binary expression of the grammar of this invention is new to the art. Its purpose is to "convolute" a primary expression with the secondary (subjunctive) expression to produce a new expression. There are 2 forms of the subjunctive expression and therefore 2 subjunctive keyword operators: butnot and but. These keywords are treated in the C-style interpreter as operators, whose precedence is just above the assignment expression operators and just below the conditional operators. This means that the but and butnot keyword operators bind more "loosely" (in the absence of parentheses) than any other regular expression operators of the grammar discussed above. The syntax of these operators is shown as follows:

```
Pattern primary = ...;      // create some primary expression
Pattern secondary = ...;    // create a secondary (subjunctive) expr
Pattern P1 = primary but secondary;
Pattern P2 = primary butnot secondary;
```

In the above illustration of the subjunctive syntax, primary and secondary can be any expressions that the programmer wishes to create. This implies that the primary and/or secondary expressions could themselves contain subjunctive expressions. Such a convolution of convolutions is of course allowed in the grammar. Moreover, nested convolutions can be written in-line, without parentheses, as follows:

```
Pattern P1 = ...;           // create a regular expression
Pattern P2 = ...;           // create a regular expression
Pattern P3 = ...;           // create a regular expression
Pattern P = P1 but P2 butnot P3;
```

The associativity of both the but and butnot keyword operators is "left-to-right", and because the precedence of both operators is at the same level, the meaning of the above expression is "form the convolution of P1 but P2" first, and then "form a convolution (of that convolution) with P3, using the butnot operator".

What these 2 grammars mean for the programmer is explained as follows:
  The programmer starts with his/her primary regular expression, which may or may not have side-effects, and which may have been produced by a previous convolution expression.
  Then the programmer decides that he/she wishes to modify its meaning with the "secondary" (or subjunctive expression) as follows:
    if the "secondary" is being convoluted with the but operator, all possible matches to the primary are conditioned on the secondary—any matches which the secondary does not also "accept" are discarded;
    if the "secondary" is being convoluted with the butnot operator, all possible matches to the primary are conditioned on the secondary—any matches which the secondary also "accepts" are discarded;
    all instructional side-effects (instruction arcs of corresponding NFA) of the secondary are ignored, that is, effectively removed; i.e. only the "eating"/"matching" characteristics of the primary are considered in the convolution; and
    all instructional side-effects of the primary are preserved in the following way—any of the candidate matches of the primary, which could include instructional side-effects, are checked against the secondary for possible "discarding"; if the secondary does not cause the candidate match of the primary to be discarded, then all of the instructional side-effects of the primary must be preserved, in exactly the order in which they would appear if there were no secondary.
  There is no "direct" NFA composition appropriate for either the but or butnot convolution expressions. In other words, all of the previously discussed binary and unary expressions of the grammar of this invention were given with their corresponding NFA compositions. In each case, the input graphs (P1 and possibly P2) are included "intact" in the NFA composition shown for that expression. "Intact" means that the graph for P1 and/or P2 is generated, and then additional null connecting arcs are added to create the final composition NFA for that expression (such as in the union of P1 and P2).

But with the 2 convolution operators this cannot be done. The "intact" structures of P1 and P2 are not evident in the NFA which accurately models the "convolution". Therefore, no corresponding composition NFA is shown in this section for the expressions:

```
P1 but P2
P1 butnot P2
```

However, section 8.5.4 does show that these 2 convolution expressions can always be resolved to an NFA by a special subset construction algorithm which performs the convolution. This is important in the following case:

```
Pattern Pbut = P1 but P2;   // subjunctive convolution expression
Pattern P = Pbut | P3;      // union expression
```

Since section 8.5.4 shows that there is a subset construction technique which results in an NFA that correctly models "Pbut" (with single entry and single exit nodes), then it is possible to use the simple "union-composition" NFA graph shown previously to create the NFA for P from the NFAs of Pbut and P3.

8.3.5.6 Other Compositions 8.3.5.6.1 String Grammar

The String grammar composition is quite simple. A String literal of this grammar (whose syntax matches that of a Java String literal), or alternatively a declared variable of type String, when used in a composition, is automatically widened to a Pattern, and can be used in any Pattern composition. As such, the widened String-Pattern is treated exactly as a concatenation of its individual characters (as seen in StringGrammar.java). Here the "right-to-left" or "left-to-right" sense does not matter because there are no instruction arcs implied within a String. Therefore, the following line of code:

Pattern P="ABC";

is treated internally as if the programmer had written instead:

Pattern P='A'+'B'+'C';

and its corresponding NFA is:

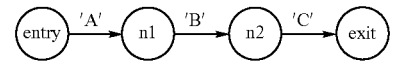

Note that an empty String is treated as if it were a null arc.

8.3.5.6.2 Inhibit Grammar

The last regular expression grammar form of this invention to consider is a special form. It is called the "inhibit-pattern", which modifies any regular expression in such a way that any of the instruction arcs are effectively removed when constructing the corresponding NFA. The grammar is as follows:

```
Pattern P = ...;              // create some regular expression
Pattern inhP = inhibit (P);   // same as P, but without any instr-arcs
```

Therefore, per specification, the following two regular expressions, P1 and P2, are identical in effect:

```
Pattern P1 = "AB";
String s;
Pattern P2a = &s ("AB");
Pattern P2 = inhibit (P2a);
```

In other words, if and when P2 is tokenized, no "capture" into the String s will ever take place, even if P2 "matches" a portion of the input stream in the "winning" thread. Therefore, the NFA constructed for P2 is functionally the same as the NFA constructed for P2a.

8.3.5.7 Binding and Representing Expressions

As stated earlier, the regular expression grammar of the grammar of this invention uses the same C-style expression parser for Pattern expressions as for standard arithmetic expressions. Therefore, consider three of the rules stated above, namely the unary conditional operator, the default concatenator operator, and the union operator:

```
Pattern Pa = ?P1;         // unary "optional" operator
Pattern Pb = P1 + P2;     // concatenation rule
Pattern Pc = P1 | P2;     // union rule
```

By the C rules of operator precedence and associativity, the following expression:

Pattern p = ?'A'+'B'|'[AB]'|'A'+'B'+'C';

will be parsed as if it were written (using parentheses to control grouping) as follows:

```
Pattern p = (((?'A') + 'B')    | ('[AB]'))
                               | (('A' + 'B') + 'C');
```

This is handled during "pass1" of the Script Translator component, in the source file SUnit_Expr.java. Then in "pass2" of the Script Translator, the expression objects created by SUnit_Expr.java are called upon to "compile themselves" into VM FORTH words, which results in the following stream of FORTH words (shown by the output of bind.tok):

```
$0        'A' char.Pattern p? 'B' char.Pattern p+
          '[AB]' CharClass.Pattern p|
          'A' 'B' char.String swap char.String swap s+
          'C' char.String s+
          String.Pattern p|
assign
```

The FORTH words model the expression to be eventually used in a tokenize statement, without any need for parentheses—the operators themselves become the FORTH words p? and p| and s+. The description of the important FORTH atoms (in the above FORTH translation) and their stack effects is found in the table of FIG. 6 of section 7.

The low-level FORTH object which models a pattern-object is defined by Grammar.java, and all of its subclasses (XXXGrammar.java). Although the syntax rules given above for each of the types of expressions (whether unary or binary or primary) show the corresponding NFA that models this expression, the NFA is not generated as a result of the expression. Rather, a Grammar object, or "pat-obj" in the table above, is generated as seen by the FORTH snippet above. This Grammar object may be used in subsequent expressions—which accounts for the claim that expressions can easily be built line-by-line. Only the tokenize statement (translated to FORTH by SUnit_TokenizeStmt.java) generates the FORTH words which forces the NFA to be built.

8.4 Language Examples

This section starts with simple examples which show that the grammar covers all of the regular expression forms expected by a regular expression programmer. The section then moves to increasingly more complicated expressions, showing the novelty of the grammar of the present invention. Because the grammar of the present invention adheres so closely to the form of C and to a certain extent Java, such a programmer will easily read and understand the example scripts.

The following examples do not include all of the standard grammar forms offered by the C, C++, and Java programming languages. This is not an implied limitation of the grammar of this invention, nor its engine, for standard grammar forms not shown (or implemented)—such as an include statement, an extern keyword, global/static variables, packages, class and member function definition—can be implemented in the interpreter and VM of this invention through techniques known in the art. The examples will show that the grammar of this invention has: (1) introduced novel forms of regular expressions which are not easily or not at all reducible to grammar forms already seen in the art; (2) adopted the C-style of expressions (such as for arithmetic expressions), including C's precedence and associativity rules, and has applied this expression syntax to the regular expressions of this invention.

In each of the example scripts, certain self-imposed conventions are adhered to, serving to keep the code-snippets as simple as possible:

each example script is an independent and complete script that runs on its own, without reference to, or including, any other scripts;

each script declares zero or more production rules (with or without parameters), according to the syntax of the grammar;

each script declares zero or more functions to be used. by its static body, or to be used within functions or within production rules that are also declared;

each script declares one static body, which is run when the script is loaded and compiled by the interpreter, and which is like a simple "main" function for that script;

all of the streams tokenized by a script are included "in-line" in the example script, using the stream literal syntax of the present invention (based on double braces);

the result of all of the example scripts is to write the "success" or "failure" to standard out, after comparing the output of the tokenization against the expected output; and an "equals" function is built into the language, at least for the purpose of this application, primarily to make it easy to verify the results of the tokenization of the examples.

8.4.1 Basic Examples

In this section, simple code snippets showing each of the basic pattern compositions are presented.

8.4.1.1 Literals and Primary Expressions

The script for this example is called sim1.tok on the CD. It consists of a do loop that "eats" one token at a time. Important aspects of this example are as follows:

- the Stream-literal syntax of the grammar, shown on line 2;
- the new keyword is used to create an empty array;
- the String variable AB has been assigned to "AB" (line 7), and therefore works within the tokenize statement as if the literal "AB" had been used instead;
- the order of case statements is very important:
  - even though the second case (line 12) matches '[A–Z]', that case will never fire in match of 'A', because the first case (line 10) also matches 'A', and therefore has precedence;
- the any case (line 14) comes before the eof case (line 20) in the tokenize-switch statement, but any matches everything except the invisible eof char, so eof will still match the end-of-stream properly;
- the any case (line 14) will never match an uppercase ASCII character, because the '[A–Z]' case (line 12) comes first;
- the substring cases "AB" (line 16) and "CD" (line 18) come after the three preceding cases all of which would match a single 'A', 'B', 'C', or 'D', but because of the greedy principle, a longer match is preferred when available, so that the "AB" and "CD" cases do fire; and
- the break statement (line 22) applies to the do-loop, not the tokenize-switch statement, because break (in the grammar as opposed to C) never applies to a tokenize-switch.

```
1       static {
2           Stream is = {{xABxACDxCCDxFGx}};
3           int[ ] tokens = new;
4           int pos = 0;
5
6           do {
7               String AB = "AB";
8
9               tokenize (is) {
10                  case 'A':
11                      tokens[pos++] = 1;
12                  case '[A–Z]':
13                      tokens[pos++] = 2;
14                  case any:
15                      tokens[pos++] = 3;
16                  case AB:
17                      tokens[pos++] = 4;
18                  case "CD":
19                      tokens[pos++] = 5;
20                  case eof:
21                      tokens[pos++] = 6;
22                      break;
23              }
24          } while (true);
25
26          int[ ] temp = {3,4,3,1,5,3,2,5,3,2,2,3,6};
27          if (equals(temp, tokens))
28              system::println("test sim1 ok");
29          else
30              system::println("test sim1 failed");
31      }
```

As presented in section 8.5.1.2.4 on algorithms, and as seen from examination of the source code for the tokenize statement (SUnit_TokenizeStmt), the tokenize statement uses the low-level "do-pattern" to "trigger" the statements associated with each particular case. Examples using the other "primary" (or literal) expressions such as null and reject are presented later in this section.

8.4.1.2 Unary Operators

The next example (sim2.tok) illustrates each of the three unary operators in action. This example consists of a single static block, with a do-loop containing a tokenize statement. Note the following:

- the ? unary operator is shown in the line 8 "case" of the tokenize statement;
  - this "case" matches "AB", or "CD", or "ABCD", as would be expected since ? is used twice, to make both "AB" and "CD" optional;
  - this "case" could theoretically match null, but this does not happen in this example because of the any case (line 14) which ensures that something gets "eaten" on each iteration;
- the + unary operator is shown in the line 10 "case" of the tokenize statement;
  - this "case" matches 1 or more repeated instances of "AB", as many as it can;
  - the substring "ABABCDCDCD" is matched in 2 consecutive iterations: first by line 10, then by line 12, and not at all by line 8;
- the * unary operator (line 12), which matches 0 or more repeated instances of "CD", actually behaves as if it were a + operator; i.e. it cannot match 0 instances because of the any case (line 14) which ensures that something gets "eaten" on each iteration;
- the last substring of interest, "ABCDCDCD" is matched by line 8 on one iteration of the loop (against the "ABCD"), and then on the next iteration is matched by line 12 ("CDCD"); line 10 is not involved in matching this substring because the ? case on line 8 matches more greedily against "ABCD" than does the + case, which would only match "AB";
- note that for the substring "ABCDCDCD", we know by the output that line 8 matches on one iteration, and line 12 on the next, but the output does not show whether line 8 matches just "AB" or "ABCD"; it does indeed match "ABCD" but this is shown in later examples; and
- note that individual cases of a tokenize statement are greedy and have precedence from top to bottom.

```
1       static {
2           Stream is =
                {{xABxCDxABCDxABABCDCDCDxABCDCDCDx}};
3           int[ ] tokens = new;
4           int pos = 0;
5
6           do {
7               tokenize (is) {
8                   case ?"AB" + ?"CD":
9                       tokens[pos++] = 1;
10                  case +"AB":
11                      tokens[pos++] = 2;
12                  case *"CD":
13                      tokens[pos++] = 3;
14                  case any:
15                      tokens[pos++] = 4;
16                  case eof:
17                      break;
```

-continued

```
18          }
19      } while (true);
20
21      int[ ] temp = {4,1,4,1,4,1,4,2,3,4,1,3,4};
22      if (equals(temp, tokens))
23          system::println("test sim2 ok");
24      else
25          system::println("test sim2 failed");
26  }
```

8.4.1.3 Binary Operators

The next example (sim3.tok) shows the binary concatenation + operator and the binary union | operator in action. Note the following:

- the assumed grouping of union and concatenation (line 8), adheres to C's rules for the relative precedence of the + operator and the | operator (the interpreter for the grammar uses the same operator-precedence table for the Pattern type as for any other type);
- on line 11 we see the importance of having the + unary operator come before the pattern being modified (in this case '[0–9]'), i.e. two consecutive + operators are easily and properly interpreted as a binary-concatenator followed by a unary-1-repeat; and
- here we use the "default" case to break from the loop, which fires when no other case matches the input stream.

```
1   static {
2       Stream is = {{Acx12xAAC03AAx}};
3       int[ ] tokens = new;
4       int pos = 0;
5
6       do {
7           tokenize (is) {
8               case '[AB]' + '[CD]' | '[01]' + '[23]':
                    //matches AC, 12 not AA
9                   tokens[pos++] = 1;
10
11              case +'[A–Z]' + +'[0–9]':
12                  tokens[pos++] = 2;
13
14              case 'x':
15                  ;
16
17              default:
18                  break;
19          }
20      } while (true);
21
22      int[ ] temp = {1,1,2};
23      if (equals(temp, tokens))
24          system::println("test sim3 ok");
25      else
26          system::println("test sim3 failed");
27  }
```

The next example (sim4.tok), illustrates line-by-line composition of a pattern, using the reject Pattern literal and the binary union operator. The reject literal is crucial. If we were to use null for example, we would not get the intended result, as will be seen below. The way this line-by-line composition works is as follows: (1) begin with the base case, which accepts nothing (reject); (2) union the first pattern of the "choice" array with the base case—a union of reject with any pattern P will "fire/match" if and only if P "fires/matches"; (3) continue by adding each element of the Pattern array to the union. This is an important example to show how the reject literal completes the claim of line-by-line composition. Other advantages of the reject literal will be described (shown) later. Note additionally from this example:

- one can return a Pattern as the result of a function (which composes that Pattern)—this is possible because a regular expression is a primitive data type of the language, which, as such, can be assigned to variables and function results and so forth;
- the Strings "AA" and "BB" are cast to the Pattern type on line 10 for inclusion in the array initializer; and
- the substring "DD" matches nothing in the tokenize-switch and thus forces the default case, allowing us to break from the loop.

```
1   function Pattern Choose (Pattern[ ] array)
2   {
3       Pattern pat = reject;
4       for (int i = 0; i < length(array); i++)
5           pat = pat | array[i];
6       return pat;
7   }
8
9   static {
10      Pattern[ ] pArray = {Pattern("AA"), Pattern("BB"), +'C'};
11      Pattern choose = Choose (pArray);
12
13      Stream is = {{AAxBBAACCCxDD}};
14      int[ ] tokens = new;
15      int pos = 0;
16
17      do {
18          tokenize (is) {
19              case choose:
20                  tokens[pos++] = 1;
21              case 'x':
22                  tokens[pos++] = 2;
23              default:
24                  break;
25          }
26      } while (true);
27
28      int[ ] temp = {1,2,1,1,1,2};
29      if (equals(temp, tokens))
30          system::println("test sim4 ok");
31      else
32          system::println("test sim4 failed");
33  }
```

The next example (sim5.tok) is almost identical to the previous example, except that line 3 is modified, to show what happens if null is used in place of reject.

```
1   function Pattern Choose (Pattern[ ] array)
2   {
3       Pattern pat = null;
4       for (int i = 0; i < length(array); i++)
5           pat = pat | array[i];
6       return pat;
7   }
8
9   static {
10      Pattern[ ] pArray = {Pattern("AA"), Pattern("BB"), +'C'};
11      Pattern choose = Choose (pArray);
12
13      Stream is = {{AAxBBAACCCxDD}};
14      int[ ] tokens = new;
15      int pos = 0;
16
17      for (int i = 0; i < 16; i++) {
18          tokenize (is) {
19              case choose:
```

-continued

```
20              tokens[pos++] = 1;
21          case 'x':
22              tokens[pos++] = 2;
23          default:
24              break;
25          }
26      }
27
28      int[ ] temp = {1,2,1,1,1,2,1,1,1,1,1,1,1,1,1,1};
29      if (equals(temp, tokens))
30          system::println("test sim5 ok");
31      else
32          system::println("test sim5 failed");
33  }
```

In the first example, the token output of {1,2,1,1,1,2} corresponds with the recognized strings {"AA", "x", "BB", "AA", "CCC", "x"}. The for-loop terminates at this point via the default condition because neither case matches. However, in the second example the default case is never triggered, because when the loop reaches the final "DD" substring, the line 19 "choose" Pattern does match, via the null on line 3. In fact, not only is a match occurring, but nothing at all is "eaten", and each subsequent iteration of the loop continues to match against "DD" in the same way. The problem is the initialization of the line-by-line composition to null on line 3. This simple (line 3) alteration of the previous example would create a non-terminating loop, which is why the loop was also changed to a for-loop from a do-loop. This example shows why a programmer must normally use the reject literal rather than the null literal to initialize line-by-line union-compositions.

The next example shows the binary repeat operator * in action. There are actually two forms of the binary repeat expression to which a programmer is accustomed. The first form is an expression which means to match N or more instances of a pattern P. The second form of expression (termed "iterate" in the specification section) means to match between N1 and N2 instances of a pattern P. The * operator is used to accomplish both types of "repeat". The following example (sim6.tok on the CD) shows both use cases of the * operator. Note in particular that:

The interpreter applies the meaning of "N or more instances of" to the * operator when it is followed by an integer (first term of line 11, and line 20);

The interpreter applies the meaning of "between N1 and N2 (inclusive) instances of" to the * operator when it is followed by a "range" type ($2^{nd}$ terms of lines 11 and 14, and line 17);

The range data type is another primitive type of the language;

The .. binary operator is used to compose a "range" of 2 integers;

The binary * operator has been given the standard precedence (of the C-style languages), meaning that for patterns, it has "tighter" binding than the + (concatenation) operator;

Here the break occurs when the default case is triggered for the eof condition, since every character in the stream matches one of the other 4 cases; and Note that the line 17 case matches the first 5 instances of 'N' in the "NNNNNN" substring, and then, on the next iteration, matches 1 instance of 'N'; this happens because line 17 puts an upper limit of 5 on the number of uppercase ASCII characters that can be matched.

```
1   static {
2       Stream is = {{ABC23A7Z4567NNNNNN}};
3       int[ ] tokens = new;
4       int pos = 0;
5
6       do {
7           range r1 = 1..2;
8           range r2 = 3..4;
9
10          tokenize (is) {
11              case '[A–Z]'*2 + '[0–9]' * r1:
12                  tokens[pos++] = 1;
13
14              case +'[A–Z]' + '[0–9]' * r2:
15                  tokens[pos++] = 2;
16
17              case '[A–Z]' * 1..5:
18                  tokens[pos++] = 3;
19
20              case '[0–9]' * 1:
21                  tokens[pos++] = 4;
22
23              default:
24                  break;
25              }
26          } while (true);
27
28          int[ ] temp = {1,3,4,2,3,3};
29          if (equals(temp, tokens))
30              system::println("test sim6 ok");
31          else
32              system::println("test sim6 failed");
33      }
```

Note that in the above example, the last 2 tokens generated by the for-loop are 3 and 3, which match the substring "NNNNNN". Because of the "greedy" algorithm, and the fact that line 17 specifies "between 1 to 5 matches of an uppercase ASCII char", we know that the matches are "NNNNN" followed by "N", as opposed to "NNN" and "NNN" or "NN" and "NNNN". In later examples that use the "capture-pattern", we will be able to see output that verifies what the engine is actually matching.

8.4.2 Special Regular Expressions

This section demonstrates the 4 most unique grammar forms of the present invention. These 4 grammars are: (1) the "capture-pattern", (2) the "do-pattern", (3) the subjunctive expressions, (4) the production rule template.

8.4.2.1 Capture-pattern

Perl does have a capture-syntax. However, one feature is lacking in Perl's capture-syntax, the ability to capture into named variables, available anywhere in the current scope. This aspect of "capture" is accomplished in the grammar of the present invention with relative ease by the same underlying engine algorithms that accomplish the "do-pattern", as discussed in the algorithms' section, 8.5.1.2.5. In this first example (capt1.tok) of the "capture-pattern", note in particular:

Lines 7 and 10 show that it is possible to return from a function within the tokenize statement. This feature shows how well the engine of the present invention has leveraged the low-level "do-pattern" to allow any statement of the language to be executed as a side-effect of the automata's reaching an ACCEPT state (see section 8.5.1.2.4 which explains how the tokenize statement is resolved into low-level "do-patterns").

Note the capture syntax in action on line 5, which specifies the direct capture of the sub-expression on line 5 into the out parameter "s" of the function (allowed simply because the param-variable "s" is current in scope on line 5).

Note line 6, which recognizes a sequence of 'x' characters. This case, if triggered, results in the execution of the same return (line 7) that is associated with the line 5 case, except that if the line 6 case is triggered, the capture variable "s" is not affected.

The loop termination condition is triggered when the function returns false (line 10), which happens if the default case of the tokenize statement is "fired"; in the example this occurs as a result of the 'z' embedded in the Stream.

Note that the type of the capture variable must always be a String.

```
1    function boolean FooBar (Stream is, out String s)
2    {
3        tokenize (is)
4        {
5            case &s("foo" | "bar" | "foobar"):
6            case +'x':
7                return true;
8
9            default:
10               return false;
11       }
12   }
13
14   static {
15       Stream is = {{xfooxxxxxbarxxxfoobarxxxxbarfooxzzfooxxfooxxxbarxxxx}};
16
17       int pos = 0;
18       String[ ] a1 = { };
19       String[ ] a2 = {"x", "foo", "x",
             "bar", "x", "foobar", "x", "bar", "foo",
         "x"};
20
21       do {
22           String cap;
23           if (!FooBar(is, cap))
24               break;
25           a1[pos++] = (cap = = null) ? "x" : cap;
26       } while (true);
27
28       if (equals (a1, a2))
29           system::println("test capt1 ok");
30       else
31           system::println("test capt1 failed");
32   }
```

It is useful to show the foregoing example in another form (capt1a.tok). This reformulation removes the FooBar function, and captures directly into the array on line 10. Failure to allow capture into any reference-type expression (such as an array reference) would place an unnatural restriction on the programmer. This reformulation shows that the engine and interpreter of the present invention are capable of capturing into any reference to a String. In this case the String reference is not a single variable, but a String-array indexing expression.

```
1    static {
2        Stream is = {{xfooxxxxxbarxxxfoobarxxxxbarfooxzzfooxxfooxxxbarxxxx}};
3
4        int pos = 0;
5        String[ ] a1 = { };
6        String[ ] a2 = {"x", "foo", "x",
```

-continued
```
         "bar", "x", "foobar", "x", "bar", "foo",
     "x"};
7
8        do {
9            tokenize (is) {
10               case &a1[pos++] ("foo" | "bar" | "foobar"):
11                   ;
12               case + 'x':
13                   a1[pos++] = "x";
14               default:
15                   break;
16           }
17       } while (true);
18
19       if (equals (a1, a2))
20           system::println("test capt1a ok");
21       else
22           system::println("test capt1a failed");
23   }
```

Next, various examples from section 8.4.1 are re-cast to use the "capture-pattern", further demonstrating that the engine is producing correct results. First, example sim1.tok is re-cast as capt2.tok. Note in particular:

On line 33, the actual substrings captured in each call to the tokenize statement are listed, and then verified on line 35 as being the capture output of the tokenization.

Each of the "cases" from the original example are modified to capture into an array ("values") of strings.

On line 26, the substring matching the imaginary eof character is captured into the "values" array—note that what gets captured is the empty String, shown as the last string in the array of strings on line 33. Consider the case where a programmer has a complex Pattern composition that "eats" a lot of characters, and he/she wants to recognize this Pattern only if it is immediately followed by the eof condition. Assume also that the programmer wishes to capture whatever String matches that composition—he/she will use something such as &s(complex_pat+eof). Clearly an eof sentinel, though it matches the imaginary Unicode 0xFFFF character placed at the end of every stream, should count the same as a null from the standpoint of capturing substrings from the stream.

```
1    static {
2        Stream is = {{xABxACDxCCDxFGx}};
3        int[ ] tokens = new;
4        String[ ] values = new;
5        int pos = 0;
6
7        do {
8            String AB = "AB";
9
10           tokenize (is) {
11               case &values[pos]('A'):
12                   tokens[pos++] = 1;
13
14               case &values[pos]('[A–Z]'):
15                   tokens[pos++] = 2;
16
17               case &values[pos](any):
18                   tokens[pos++] = 3;
19
20               case &values[pos](AB):
21                   tokens[pos++] = 4;
22
23               case &values[pos]("CD"):
```

-continued
```
24                   tokens[pos++] = 5;
25
26               case &values[pos](eof):
27                   tokens[pos++] = 6;
28                   break;
29           }
30       } while (true);
31
32       int[ ] temp1 = {3,4,3,1,5,3,2,5,3,2,2,3,6};
33       String[ ] temp2 =
     {"x", "AB", "x", "A", "CD", "x", "C",
     "CD", "x", "F", "G", "x", ""};
34
35       if (equals(temp1, tokens) && equals(temp2, values))
36           system::println("test capt2 ok");
37       else
38           system::println("test capt2 failed");
39   }
```

In the following script example, sim2.tok is re-cast as capt3.tok. This example shows (via the target output of lines 27–28 verified on line 30) that the automata engine is correctly splitting the substring "ABCDCDCD" (near the end of the stream) as "ABCD" followed by "CDCD", which it must do to make line 9 match as greedily as it can—i.e. line 9 matches "ABCD" rather than just "AB".

```
1    static {
2        Stream is =
     {{xABxCDxABCDxABABCDCDCDxABCDCDCDx}};
3        int[ ] tokens = new;
4        String[ ] values = new;
5        int pos = 0;
6
7        do {
8            tokenize (is) {
9                case &values[pos](?"AB" + ?"CD"):
10                   tokens[pos++] = 1;
11
12               case &values[pos](+"AB"):
13                   tokens[pos++] = 2;
14
15               case &values[pos](*"CD"):
16                   tokens[pos++] = 3;
17
18               case &values[pos](any):
19                   tokens[pos++] =4;
20
```

-continued

```
21              case eof:
22                  break;
23              }
24          } while (true);
25
26          int[ ] temp1 = {4,1,4,1,4,1,4,2,3,4,1,3,4};
27          String[ ] temp2 = {"x", "AB", "x", "CD", "x", "ABCD", "x",
28                             "ABAB", "CDCDCD", "x",
                               "ABCD", "CDCD", "x"};
29
30          if (equals(temp1, tokens) && equals(temp2, values))
31              system::println("test capt3 ok");
32          else
33              system::println("test capt3 failed");
34      }
```

Finally, example sim6.tok is re-cast as capt4.tok. The target output array of Strings (line 29), which is verified on line 31, shows that the "NNNNNN" at the end of the stream is correctly split as "NNNNN" and "N" on the final 2 iterations of the loop.

```
1   static {
1       Stream is = {{ABC23A7Z4567NNNNNN}};
2       int[ ] tokens = new;
3       String[ ] values = new;
4       int pos = 0;
5
6       do {
7           range r1 = 1..2;
8           range r2 = 3..4;
9
10          tokenize (is) {
11              case &values[pos]('[A–Z]'*2 + '[0–9]' * r1):
12                  tokens[pos++] = 1;
13
14              case &values[pos](+'[A–Z]'  + '[0–9]' * r2):
15                  tokens[pos++] = 2;
16
17              case &values[pos]('[A–Z]' * 1..5):
18                  tokens[pos++] = 3;
19
20              case &values[pos]('[0–9]' * 1):
21                  tokens[pos++] = 4;
22
23              default:
24                  break;
25              }
26          } while (true);
27
28          int[ ] temp1 = {1,3,4,2,3,3};
29          String[ ] temp2 = {"ABC23","A","7","Z4567",
                               "NNNNN","N"};
30
31          if (equals(temp1, tokens) && equals(temp2, values))
32              system::println("test capt4 ok");
33          else
34              system::println("test capt4 failed");
35      }
```

8.4.2.2 Do-Pattern Examples

The "do-pattern" is syntactically modeled after the C language's for statement, such that the "pre-list" of statements and the "post-list" of statements within the "do-pattern" are interpreted by the same internal function employed for processing the "pre-list" and "post-list" of the standard "for" statement. The middle term of the "do-pattern" is a "recognition-pattern" expression, whereas in the "for-statement" the middle term is a boolean (loop termination) expression. The semantic meaning of the "do-pattern" is to recognize a given Pattern sub-expression, and if that pattern is recognized, to execute the "pre-list" and "post-list" statements.

The "pre-list" and "post-list" are comma-separated statement lists, as required also by the standard "for-statement" grammar. However, because these lists serve as the only way to embed statements into the "do-pattern", most restrictions regarding the usage of statements within these lists have been relaxed, relative to the standard restrictions enforced by C, Java, and C++ compilers. The grammar of the present invention specifies that any statement can be used within these statement lists except the tokenize statement and a function return statement. Multiple variables of different types can even be declared, but these declarations cannot combine multiple variables into the same statement (because comma is already being used as a statement separator).

The "do-pattern" therefore integrates directly into the regular expression, and therefore, directly into the corresponding automata graph, normal statements of the language. These statements must not be executed during automata execution, because NFAs, especially those with embedded statements, often require multiple automata execution threads. Were the compiled instruction arcs (corresponding to "do-pattern" statements) to be executed by each automata execution thread as encountered, many statement-instructions belonging to eventual "losing" threads would be incorrectly executed. Therefore, the compiled statements are executed as instruction side-effects of the automata's execution, but only after the "winning" execution thread has been selected. This means that "pre-lists" and "post-lists" of "do-patterns" are executed "if and only if" the recognition-pattern of the "do-pattern" is part of the automata traversal of the "winning" thread.

Further, the instruction side-effects associated with the "pre-lists" and "post-lists" are queued in the proper order, so that "do-patterns" embedded inside other "do-patterns" work as would be expected.

The following example (do1.tok) addresses the problem of capturing each individual match of a repeated sub-expression (into the appropriate array element). The grammar of the present invention permits a simple design pattern to accomplish this goal. Note the following:

The use of the negated-character class to represent a non-space (line 9 and line 14); example tmpl3.tok in section 8.4.2.4 will show that this negated-character class can also be represented with a subjunctive expression.

The do-pattern, which is repeated 0 or more times (via the unary * on line 8 that immediately precedes the do keyword), "eats" one or more non-spaces (line 9) followed by one or more spaces (line 11) for each repeated match.

For each repeated match of the do-pattern, the non-spaces are captured into a temp variable (line 9).

For each repeated match of the do-pattern, the result of the capture is stuffed into the array by the single statement of the "post-list" of the "do-pattern" expression (line 12).

All boundary conditions being tested (lines 40–49).

The entire stream was tokenized with a single call (line 5) to the tokenize statement—this is possible only because of the do-pattern of this invention which allows captures of a repeat pattern to be directed into the elements of an array.

```
1    function String[ ] Tokenize (Stream is)
2    {
3        String[ ] tokens = new;
4        int pos = 0;
5        tokenize (is) {
6            case *'[ \n\r\t]' +                    // possible
7                                                    leading spaces
8                        * do (String temp;
9                            &temp (+'[^ \n\r\t]')  // capt seq of
                                                    1+ non-spaces
10                          +
11                          +'[ \n\r\t]';           // sequence of
                                                    1+ spaces
12                      tokens[pos++] = temp) +
13
14                  ? (&tokens[pos++](+'[^ \n\r\t]')) +
15
16                  *'[ \n\r\t]' +                  // possible
                                                    trailing spaces
17
18                  eof:
19                      ;  //do nothing, already handled in do-pattern above
20          }
21          return tokens;
22     }
23
24     static {
25         Stream is1 = {{ A short sentence. }};
26         Stream is2 = {{A short sentence. }};
27         Stream is3 = {{ A short sentence.}};
28         Stream is4 = {{A short sentence.}};
29         Stream is5 = {{One}};
30         Stream is6 = {{One }};
31         Stream is7 = {{ One}};
32         Stream is8 = {{ One }};
33         Stream is9 = {{ }};
34         Stream is10 = {{ }};
35
36         String[ ] ar1 = {"A", "short", "sentence."};
37         String[ ] ar2 = {"One"};
38         String[ ] ar3 = { };
39
40         String[ ] temp1 = Tokenize (is1);
41         String[ ] temp2 = Tokenize (is2);
42         String[ ] temp3 = Tokenize (is3);
43         String[ ] temp4 = Tokenize (is4);
44         String[ ] temp5 = Tokenize (is5);
45         String[ ] temp6 = Tokenize (is6);
46         String[ ] temp7 = Tokenize (is7);
47         String[ ] temp8 = Tokenize (is8);
48         String[ ] temp9 = Tokenize (is9);
49         String[ ] temp10 = Tokenize (is10);
50
51         if (equals(temp1, ar1) && equals(temp2, ar1)
                && equals(temp3, ar1) &&
            equals(temp4, ar1) &&
52              equals(temp5, ar2) && equals(temp6, ar2)
                    && equals(temp7, ar2) &&
            equals(temp8, ar2) &&
53              equals(temp9, ar3) && equals(temp10, ar3))
54              system::println("test do1 ok");
55         else
56              system::println("test do1 failed");
57     }
```

An example (do2.tok) using a do-statement to count the number of lines in a stream is now presented. Note the following:

The negated character-class on line 8 is used to "eat" until the linefeed sentinel character—it will be shown how this is generalized with the subjunctive.

Note that line 8 is "greedy" relative to line 9 (separated by default left-to-right concatenation); this means that even though the line 9 term (+any) could theoretically match/"eat" the entire input stream (given that the unary * operator on line 8 allows it to match 0 times), we can be confident that the engine will select as the "winning" thread that thread which allows line 8 to match as many linefeed terminated lines as possible, before allowing the +any on line 9 to match the remainder of the input stream.

Line 9 is required to handle the case where the last line of the input stream is not be terminated with a linefeed.

The line-counting task is accomplished (for the entire stream) with a single tokenize statement.

```
1    static {
2        Stream is = {{      line1
3                            line2....
4                            3. line3 }};
5        int count = 0;
6
7        tokenize (is) {
8            case        * do (; *'[^\n]' + '\n'; count++) +
9                        ? do (; +any; count++) +
10                       eof:
11                           ;
12       }
13       if (count == 3)
14           system::println("test do2 ok");
15       else
16           system::println("test do2 failed");
17   }
```

The following example (do3.tok) recasts the very first example (sim1.tok), doing the same work in a single tokenize statement (no do loop necessary). Note:

The use of embedded do-patterns here. The outer do pattern is repeated with the unary * operator (line 9) and its purpose is to stuff (line 18) the selector obtained on each repeated match. Within this do-pattern are 6 inner, unioned, do-patterns, each of which sets the appropriate selector for the corresponding pattern being recognized.

That the use of eof as a sentinel is unnecessary, because the tokenize statement will stop when the stream is exhausted; however, the eof is used here to set the appropriate selector (line 16), indicating the eof as was done in the earlier example.

The 2-char substrings (lines 14 and 15) still come after the line 13 that eats any. However, the repeat is "greedy" term-by-term, ensuring that on any iteration, the 2-character terms will have precedence over the 1-character terms, so long as the same total number of characters can be "eaten" by the repeat (in this case the entire stream). What this means is that "greediness" of terms is more important than left-to-right priority of terms within a union which is being repeated. In other words, left-to-right priority of terms in a union is only used for tie-breaking between any two terms which "eat" the same number of characters.

```
1    static {
2        Stream is = {{xABxACDxCCDxFGx}};
3        int[ ] tokens = new;
4        int pos = 0;
5
6        String AB = "AB";
7
8        tokenize (is) {
9            case * do (int select;
10
```

-continued

```
11              do (; 'A';          select = 1) |
12              do (; '[A–Z]';      select = 2) |
13              do (; any;          select = 3) |
14              do (; AB;           select = 4) |
15              do (; "CD";         select = 5) |
16              do (; eof;          select = 6);
17
18              tokens[pos++] = select):
19          ;
20      }
21
22      int[ ] temp = {3,4,3,1,5,3,2,5,3,2,2,3,6};
23      if (equals(temp, tokens))
24          system::println("test do3 ok");
25      else
26          system:: println("test do3 failed");
27  }
```

8.4.2.3 Subjunctive Expressions

A novel aspect of the grammar of the present invention is the subjunctive binary expression. A subjunctive expression combines its two sub-expressions in a very special way. Unlike the other binary expressions, for which simple composition formulas (for the NFA automata) exist as seen previously in section 8.3.5, the subjunctive form requires a unique subset construction which "convolutes" the two automata (for each sub-expression). The resulting convolution is also a valid NFA of the grammar, which can then be used in further compositions or convolutions, or alternatively for execution. In view of this convolution step, the engine of this invention does not require a graphical (NFA) model for the subjunctive expression.

From the standpoint of the programmer, the semantics of the subjunctive regular expression are defined based on the following hypothetical (but very slow) engine and test case:

Assume that the regular expression being "executed" is itself a subjunctive of a primary and a secondary expression, each of which has a corresponding NFA composition (or construction).

Let the engine first execute the NFA corresponding to the primary expression against the input "string" and save all unique "accept" states encountered for that input "string", labeled as PrimarySolutionSet—the engine must remember (for each saved state in this set) not only the number of characters "eaten", but must also remember the sequence of instruction-arcs encountered and the sequence of arc-numbers traversed, for any thread which reached the "accept" state.

Next, let the engine execute the NFA corresponding to the subjunctive expression against the same input "string", but ignoring all instruction arcs and arc-numbers—here the engine simply saves all unique accept states where an accept state is defined solely by number of characters "eaten"—this set is labeled SecondarySolutionSet.

Next, the engine considers each "accept" state of PrimarySolutionSet and looks for a "match" in the SecondarySolutionSet—a match is found if and only if at least one "accept" state in the SecondarySolutionSet has "eaten" the same number of characters.

The set of candidate "accept" states discovered for the primary are now pruned as follows:

if the grammar form is but, then any "accept" state found in PrimarySolutionSet which does not have a "match" from the SecondarySolutionSet is eliminated;

if the grammar form is butnot, then any "accept" state found in PrimarySolutionSet which does have a "match" from SecondarySolutionSet is eliminated.

In simple terms, a regular expression is an expression which "accepts" some subset of all possible Strings. A subjunctive expression allows the secondary expression to prune that subset produced by the primary according to the simple rules above, which correspond well with the actual keywords—but and butnot—chosen as the keyword operators.

The main usefulness of the butnot form of the subjunctive is in precisely specifying searches for a match to any regular expression. The main usefulness of the but form of the subjunctive is in allowing any regular expression to serve as a "sentinel". Examples of both are presented in this section.

In this first example (subj1.tok), the problem of searching for the first match to a given regular expression is illustrated. In this example, the search expression is formulated without the use of a subjunctive. Note the following:

The target pattern (line 3) attempts to "eat" everything up to the first "AB".

The result (as verified on line 13) shows that what was "eaten" by this pattern was everything up to the last instance of "AB". The reason for this is well known in the art: the *any sub-expression (line 3) is "greedy", and causes the automata to eat all the way to the end of the stream for some threads (which do not in fact "accept"); one of the threads will "stop" when it recognizes the last instance of "AB" and this will be the thread that "wins"; this is exactly the right way to search for the last instance of "AB" but has no value in finding the first.

```
1   static {
2       Stream is = {{xxBAxBBAAxBAxxABxAAABxxx}};
3       Pattern p = *any + "AB";
4       String s;
5
6       tokenize (is) {
7           case &s (p):
8               ;
9           default:
10              system::println("test subj1 failed: target not found");
11      }
12
13      if (equals(s, "xxBAxBBAAxBAxxABxAAAB"))
14          system::println("test subj1 ok");
15      else
16          system::println("test subj1 failed");
17  }
```

The following example (subj2.tok) fixes this problem using a negated character-class, but again without using the subjunctive butnot operator. Observe the following:

on line 4, an expression which means "eat" anything but an 'A' is created;

on line 5, an expression which "eats" an 'A' followed by anything except a 'B' is formulated;

on line 6, an expression is formulated which says: "repeatedly eat either NOT-'A' or else if we eat an 'A', then the next character must not be a 'B'; and, when this stops, then we can eat our "AB" (which should be our first instance); and on line 17, it is verified that the expression pFirstAB (line 6) correctly finds the first instance of "AB".

```
1    static {
2        Stream is = {{xxBAxBBAAxBAxxABxAAABxxx}};
3
4        Pattern pNotA = '[^A]';
5        Pattern pANotB = 'A' + '[^B]';
6        Pattern pFirstAB = (pNotA | pANotB) * 0   +   "AB";
7
8        String s;
9
10       tokenize (is) {
11           case &s (pFirstAB):
12               ;
13           default:
14               system::println("test subj2 failed: target not found");
15       }
16
17       if (equals(s, "xxBAxBBAAxBAxxAB"))
18           system::println("test subj2 ok");
19       else
20           system::println("test subj2 failed");
21   }
```

In order to create a sub-expression to find the first instance of a very simple substring "AB" (as part of a larger expression), the programmer must often craft a relatively complicated search expression using negated character-classes. This fundamental usefulness of the negated-character class can actually be completely generalized (in the present invention) using the butnot operator, as shown in the following example (subj3.tok). Note that:

the primary expression of the subjunctive (in line 6) is simply: *any; it basically means "eat" as much as possible;

the subjunctive (secondary) expression (also in line 6) is: *any+"AB"+*any; it basically qualifies the primary so that it may "eat" as much as possible, so long as it does not "eat" anything including "AB"; and the expression on line 6, which means "eat as much as possible so long as it does not include "AB", is followed by (concatenated by) the term on line 7 which "eats" the target.

```
1    static {
2        Stream is = {{xxBAxBBAAxBAxxABxAAABxxx}};
3        String s;
4
5        tokenize (is) {
6            case &s((*any butnot *any + "AB" + *any)
7                       + "AB"):
8                ;
9            default:
10               system::println("test subj3 failed: target not found");
11       }
12
13       if (equals(s, "xxBAxBBAAxBAxxAB"))
14           system::println("test subj3 ok");
15       else
16           system::println("test subj3 failed");
17   }
```

That the subset construction algorithm created to handle the subjunctive form yields the functionally correct automata for find-first-AB is verified in subj3a.tok, which prints the automata. That the constructed automata for example subj3.tok is the functionally the same as the automata produced by the hand-crafted expression of example subj2.tok is verified by comparing the output of subj2a.tok, which prints the automata.

It can be seen from this example that the subjunctive form greatly enhances the grammar, because it allows the programmer to efficiently and easily craft the required regular expression. In fact the subjunctive form shown in line 6 above works for absolutely any target regular expression (by replacing "AB" with another regular expression whose matching can include more subjunctives). The programmer leaves the "crafting" of the appropriate automata for "find-first" up to the engine (of the grammar), whereas, in the current art (which does not offer the subjunctive) the programmer must essentially perform the convolution/construction of a subjunctive in order to model a successful "match-first".

We will see in section 8.5.4 that the subset construction algorithm for the subjunctive form always yields a single NFA to represent the subjunction. This in turn implies that the programmer could always come up with a regular expression that "finds-first" regardless of the complexity of his/her target (find) pattern. However, it should be clear just from the example with "AB" (lines 4–6 of sub2.tok) that this could become an intractable problem as the complexity of the target pattern increases.

In the next example (subj4.tok), the target pattern is made more complex. The target pattern is itself best expressed as a subjunctive expression in this example, so that the engine is performing nested "subjunctive" subset convolutions/constructions. Note the following:

Line 3 uses a subjunctive expression to create the target Pattern, a pattern which starts with 'A' and continues up to and including the first 'B'.

Line 9 uses a subjunctive expression to "eat" everything up to our first occurrence of the target.

In line 17 we see that the target found is "AXXXB" rather than "AXXAXXXB"; since the primary *any on line 9 is greedy, it "eats" beyond the first 'A' because it can do so without including the target. (This may not be exactly what the programmer intends and can be easily corrected using the right-to-left concatenator as seen in example rtl1.tok of section 8.4.2.5).

The capture-results for both the slack and the target, as seen in lines 9 and 11, are readily separated.

```
1    static {
2        Stream is = {{XXXXAXXAXXXBZZZZAXBZZZ}};
3        Pattern pTarget = 'A' + (*any butnot *any + 'B' + *any) + 'B';
4
5        String slack;
6        String target;
7
8        tokenize (is) {
9            case &slack (*any butnot *any + pTarget + *any)
10                       +
11               &target (pTarget):
12               ;
13           default:
14               system::println("test subj4 failed: target not found");
15       }
16
17       if (equals(slack, "XXXXAXX") && equals(target, "AXXXB"))
18           system::println("test subj4 ok");
19       else
20           system::println("test subj4 failed");
21   }
```

The automata for this style of "find-first" expression does stop when it should. Once it finds the first instance of the target in the stream, all threads terminate—this is ensured by the subjunctive expression. Thus, these searches are very efficient.

The following example using the butnot expression assumes that the programmer has created a set of re-usable utility expressions. (Soon, we will see that this is more compactly done with production rule templates) Assume further that he/she has created the following simple expression to find "foo", "bar", or "foobar".

Pattern foobar=(?"foo"+?"bar") butnot null;

The subjunctive above ensures that the expression will never match null. In other words, the subjunctive is used here to very easily remove the short-circuit from this expression. This technique is also used, but internal to the Automata Composition Engine, to clean-up short-circuits in repeating patterns, as well as to clean-up certain difficult unions as was discussed in the specification sections.

Assume that the above pattern already exists, perhaps in some script file as a global expression. But now the programmer wants to "alter" the behavior a little bit, removing both "foo" and "bar" from the set of acceptable matches (meaning just search for "foobar"). Of course, the programmer could re-design his/her expression. Another option is to reuse the existing expression as in the following example (subj5.tok). This is especially useful when the reusable expression has already implemented necessary side-effects, such as a general template for an HTML tag that returns attributes. For this example script, note the following:

line 5 demonstrates that the precedence of the butnot (and but) operators has been put at the lowest level of any other Pattern operators—eliminating the need for parentheses around the "foo"|"bar";

on line 5, the use of butnot for altering the behavior of an existing pattern; and line 18 demonstrates that the search did indeed skip individual instances of "foo" and "bar" in the input stream.

An example (subj6.tok) of the subjunctive "but" operator in action is shown below. In this case, the search is for the target string "gold". However, it is desired to the find the first instance of "gold" after exactly 3 linefeeds have been seen, and to count the number of "gold" substrings seen. In the following script, note:

line 11 defines eating as much as possible without eating the target substring;

line 12 defines eating the "next" target substring;

line 13 defines eating exactly 1 line, including terminal linefeed;

line 15 defines our "slack"; note that this actually includes a do-pattern which counts the number of target substrings seen;

lines 19–21 create a subjunctive expression which solves the problem and produces exactly the ACCEPT state we are looking for; conceptually, this can be broken into 2 steps:

lines 19 creates a primary expression which will actually produce a set of candidate accept states as follows—there will be one "best" ACCEPT state for every character position in the stream, such that for this character position the "slack" sub-expression finds as many repeats of the "gold" expression as it can, followed by the +any term which for the "best" threads will "eat" nothing more (inserted simply to help verify left-to-right greediness);

the subjunctive expression on line 21 qualifies the set of candidate ACCEPT states above such that exactly 3 full lines are "eaten", before looking for the first "gold";

the concatenation with the variable "gold" on line 21 further qualifies this above set of ACCEPT states to stop at the first "gold" after the 3 full lines are "eaten";

the primary ensures that we count all "gold" substrings seen, including the one of line 1, the one on line 2, and the one on line 5 which terminates the search/match;

```
1   static {
2       Stream is = {{xfooxxxxxbarxxxfoobarxxxxbarfooxzzfooxxfooxxxbarxxxx}};
3
4       Pattern pReusable = ?"foo" + ?"bar" butnot null;
5       Pattern pTarget = pReusable butnot "foo" | "bar";
6
7       String slack, target;
8
9       tokenize (is) {
10          case &slack (*any butnot *any + pTarget + *any)
11                  +
12                  &target (pTarget):
13                  ;
14          default:
15              system::println("test subj5 failed:
                    target not found");
16      }
17
18      if (equals(slack, "xfooxxxxxbarxxx") &&
            equals(target, "foobar"))
19          system::println("test subj5 ok");
20      else
21          system::println("test subj5 failed");
22  }
``` the +any term, which was inserted for verification of left-to-right greediness of "slack" (both on line 19) indeed "eats" nothing, since the boolean "ok" is still true on line 30;

lines 25–28 are used to verify that the "target" was found on the correct line, by capturing the remainder of the line that the first tokenize statement stopped on.

```
1    static {
2        Stream is = {{here is gold on line 1
3                     and again on line 2 (gold)
4                     but not on line 3
5                     or line 4
6                     here gold is again on line 5
7                     and line 6 -- gold
8                     and line 7 -- gold}};
9
10       int min = 3;
11       Pattern nogold = *any butnot *any + "gold" + *any;
12       Pattern gold = nogold + "gold";
13       Pattern line = *'[^\n]' + '\n';
14       int count = 0;
15       Pattern slack = do(; gold; count++) * 0;
16       boolean ok = true;
17
18       tokenize (is) {
19           case slack + ?do(; +any; ok = false)
20                   but
21                   line*min..min + gold:
22               ;
23       }
24
25       String s;
26       tokenize (is) {
27           case &s(*'[^\n]'):
28       }
29
30       if (ok && count = = 3 && equals(s, " is again on line 5"))
31           system::println("test subj6 ok");
32       else
33           system::println("test subj6 failed");
34   }
```

This is all accomplished with a rather short snippet of code, certainly an aspect of a regular expression language. But the use of butnot on line 11 and the use of but on line 20 as a type of sentinel show that a very intricate problem can be solved easily with the use of subjunctives.

8.4.2.4 Production Rule Template Examples

In a grammar such as Lex-Yacc, production rules are used to parse computer languages of any kind. As such, they are clearly meant to allow "recursion". The algorithms and usage of Lex-Yacc are well-known. The production rules of the present invention are not currently meant for the purpose of defining languages that permit "recursive" structures (because this grammar does not support recursion). However, the production rules of the present invention have a very compelling benefit: they can be parameterized.

The syntax which is similar to the production rules of the present invention is exhibited by the XML specification available at the URL mentioned earlier in section 8.3.5.2. That is, the specification defines the XML language via production rules. This is a very natural way to build up a set of rules which define a well-formed document. In the grammar of the present invention, such rules are never defined inside functions. Rather, they are defined in the global namespace (or to be more precise, wherever functions can be defined), and are available both to other production rules, and to functions.

One thing is lacking about production rules of the art. They cannot be parameterized. The following example (tmpl1.tok) of such a rule in the grammar of the present invention presumes that there is a small fixed set of patterns, which have already been expressed as production rules. Perhaps they would define how to recognize a set of HTML tags. Further assume that the programmer wanted to create a type of switch statement, so that rather than using the name of the desired tag-rule, he/she could invoke the proper rule with an integer selector. There are certainly advantages to doing this, as it provides a "loose" binding between modules, where the select integers can be read from other files. In this example, take note of the following:

Lines 1 through 8 show how a parameterless rule is defined.

Lines 11–14 show the standard C conditional expression being applied to Patterns—it comes practically for "free" by adapting the C-style expression syntax to regular expressions that define patterns. Note that, as in C, the associativity of the conditional pattern expression is right-to-left, as shown by the fact that parentheses are not only unnecessary here, but they make the expression less readable.

Note the use of reject on line 14, which is more useful than null if the programmer uses an invalid selector, especially when searching—reject will more accurately ensure that nothing is found when an invalid selector is used.

Note that on lines 20 and 22 how useful null is in providing the programmer a complete regular expression language—it reads and functions as if an empty string were used (StringGrammar.java, lines 9–12, show that the null literal and an empty string are identical in function); on line 20 null initializes the variable "pat" which is then built line-by-line through concatenation; on line 22 null is again used to help build a pattern line-by-line, this time by including a conditional expression in the concatenation. A "rule-of-thumb" is that null is used to help initialize line-by-line concatenations whereas reject is used to initialize line-by-line unions.

On line 25, with the addition of the eof keyword, we are using the tokenize statement to do a simple match (as opposed to search), pointing to the versatility of the tokenize statement.

```
1    production Tag1 < > ->
2        "TAG1";
3    production Tag2 < > ->
4        "TAG2";
5    production Tag3 < > ->
6        "TAG3";
7    production Tag4 < > ->
8        "TAG4";
9
10   production SelectTag <int select> ->
11       select = = 1 ? Tag1 < > :
12       select = = 2 ? Tag2 < > :
13       select = = 3 ? Tag3 < > :
14       select = = 4 ? Tag4 < > : reject;
15
16   static {
17       Stream is = {{TAG1  TAG3   TAG4  TAG4 TAG2  TAG1}};
18       int[ ] selectors = {1,3,4,4,2,1};
19
20       Pattern pat = null;
21       for (int i = 0; i < length(selectors); i++)
22           pat = pat + (i = = 0 ? null : +' ') +
                 SelectTag<selectors[i]>;
23
```

-continued

```
24          tokenize (is) {
25              case pat + eof:
26                  system::println("test tmpl1 ok");
27              default:
28                  system::println("test tmpl1 failed");
29          }
30      }
```

The automata generated for the tokenize statement will not include character arcs relating to any tag-rules not selected in lines 11–15. This is handled in the engine because the regular expression is compiled into Virtual Machine FORTH tokens, which includes the tokens for the conditional expression. The conditional expression is evaluated in the VM, ultimately resulting in only one subrule remaining on the top of the FORTH stack. Only the specific TagN<> rule selected by each iteration of the line 21–22 loop is compiled into the automata.

This example was presented first because it shows the default in parameter in use (line 10). Programmers will use in parameters in templates in the following anticipated use cases:

With a conditional, as shown above, to choose which subrule he/she wishes to fire.
  To directly parameterize the sub-expressions of a production rule, e.g. a String could be passed into the production rule template and this String could be combined with other literal values using any of the compositions of the grammar that use a String.
  In similar fashion, an integer in param or a range in param can be used to parameterize an "iterate" or "repeat" composition (within a rule definition).
  To pass in a "container" structure (such as an array) which can then be used by do-patterns and/or capture sub-expressions of the production rule to capture snippets of the stream.
  Primitive values such as booleans, ints, chars, etc. can be used (as in params) within do-patterns of the rule for initialization ("set") purposes.

Next, an earlier example (subj4.tok becomes tmpl2.tok) is re-cast such that a production rule is created to accomplish the "find-first" design pattern. This production rule example will exhibit the second type of in-param listed above—the parameterization of a production rule's sub-expression. Note the following:

The in-param p (line 1) is used on line 2 directly in the production rule; the result of an instantiated template is an automata that is functionally equivalent to an automata produced by in-lining the expression, allowing reuse of this rule.
  The first instantiation of the EatUntil rule is on line 7—not only does this grammar construct serve to create a reusable template, but the instantiation of the template results in any even more readable expression as seen by line 7.
  The second instantiation of the EatUntil rule is on line 13, again resulting in an automata that is functionally equivalent to the automata of example subj4.tok; again, line 13 is more readable than the equivalent lines of subj4.tok.

```
1   production EatUntil <Pattern p> ->
2       *any butnot *any + p + *any
```

```
3   ;
4
5   static {
6       Stream is = {{XXXXAXXAXXXBZZZZAXBZZZ}};
7       Pattern pTarget = 'A' + EatUntil<'B'> + 'B';
8
9       String slack;
10      String target;
11
12      tokenize (is) {
13          case &slack (EatUntil<pTarget>) + &target (pTarget):
14              ;
15          default:
16              system::println("test subj4 failed: target not found");
17      }
18
19      if (equals(slack, "XXXXAXX") && equals(target, "AXXXB"))
20          system::println("test tmpl2 ok");
21      else
22          system::println("test tmpl2 failed");
23  }
```

A production rule template whose in parameter is an array (into which results are captured) ow presented—do1.tok re-cast as tmpl3.tok. Unlike the previous two examples, this type of in parameter (line 9, default in) alters the side-effect instruction arcs of the automata, rather than "eating" arcs. Note the following:

Lines 1–3 provide a very readable, reusable way to express a space.
  Lines 5–7 provide a very readable, reusable way to express a non-space—note here that the use of the butnot operator gives exactly the same behavior as the negated character class.
  Line 9 shows that a String array has been made a parameter of the production rule, and lines 14 and 16 show that this in parameter is being used in a do-pattern and capture pattern respectively, rather than affecting to the "eating" characteristics of the automata.
  Line 25 shows the improved readability (versus do1.tok) of the resulting code when templated production rules are used.
  Note the nesting of a do-pattern on line 12 within a do-pattern on line 10.
  Note that the iteration variable "pos" is declared as a do-pattern variable on line 10 rather than within the function as it was in the do1.tok. This ability to define a temporary variable scoped as to an embedded side-effect regular expression is not seen in the art.

```
1   production Space < > ->
2       '[ \n\r\t]'
3   ;
4
5   production NonSpace < > ->
6       any butnot Space < >
7   ;
8
9   production Tokenize <String[ ] tokens> ->
10      do (int pos = 0;
11
12          * do (String temp;
13              &temp(+NonSpace< >) + +Space< >;
14              tokens[pos++] = temp) +
15
16          ? (&tokens[pos++] (+NonSpace< >));
17
18      )
```

-continued
```
19      ;
20
21      function String[ ] DoTokenize (Stream is)
22      {
23          String[ ] tokens = new;
24          tokenize (is) {
25              case *Space< > + Tokenize <tokens> +
                    *Space< > + eof:
26                  ;
27          }
28          return tokens;
29      }
30
31      static {
32          Stream is1 = {{ A short sentence. }};
33          Stream is2 = {{A short sentence. }};
34          Stream is3 = {{ A short sentence.}};
35          Stream is4 = {{A short sentence.}};
36
37          String[ ] ar1 = {"A", "short", "sentence."};
38
39          String[ ] temp1 = DoTokenize (is1);
40          String[ ] temp2 = DoTokenize (is2);
41          String[ ] temp3 = DoTokenize (is3);
42          String[ ] temp4 = DoTokenize (is4);
43
44          if (equals(temp1, ar1) && equals(temp2, ar1)
                && equals(temp3, ar1) &&
            equals(temp4, ar1))
45              system::println("test tmpl3 ok");
46          else
47              system::println("test tmpl3 failed");
48      }
```

An example using out parameters in production rules is presented by re-casting example tmpl2.tok as tmpl4.tok. Rather than using EatUntil<>, 2 different versions of Find<> are now created to accomplish the purpose, as if these Find<> rules were part of a utility include-script containing all useful rules relating to find. Note the following:

- The Find rule on lines 1–3 does not do any extraction—it "eats" up to and including the first instance of a given pattern.
- The Find rule on lines 5–9 (with different call signature) can be used not only to find the first instance, but "capture" both the "slack" and the "match".
- There is an instantiation of a template on line 13 to create the target pattern, but this does not yet result in an automata being constructed.
- On line 19, we instantiate the Find rule of line 5, which does all of the work; because this instantiation occurs within a tokenize statement, it results in an auto-mata being constructed by the engine, and then used.

```
1   production Find <Pattern p> ->
2       (*any butnot *any + p + *any) + p
3   ;
4
5   production Find <Pattern p,
6                   out String slack,
7                   out String match> ->
8       &slack(*any butnot *any + p + *any) + &match(p)
9   ;
10
11  static {
12      Stream is = {{XXXXAXXAXXXBZZZZAXBZZZ}};
13      Pattern pTarget = 'A' + Find<'B'>;
14
15      String slack;
16      String target;
17
```

-continued
```
18      tokenize (is) {
19          case Find<pTarget, slack, target>:
20              ;
21          default:
22              system::println("test tmpl4 failed: target not found");
23      }
24
25      if (equals(slack, "XXXXAXX") && equals(target, "AXXXB"))
26          system::println("test tmpl4 ok");
27      else
28          system::println("test tmpl4 failed");
29  }
```

The result as shown on line 25 may not be what the programmer expects, because the match does not include the first "AXX". The reason for this is that the line 13 target definition can match "within itself", and the rule used to find this match does not use right-to-left concatenation (line 8) to ensure that the target is "greedier" than the slack. This will be fixed in example rtl1.tok of section 8.4.2.5.

The next example involving an in out param for a production rule shows the range and versatility of the engine and grammar. Assume a variable length array of Patterns. Assume further that one wishes to create a union of all of these patterns which will find the first occurrence of any one of the patterns in the given array. Assume further that it is desired that the expression return a selector indicating which Pattern in the array was actually used for the match.

The grammar of the present invention supports line-by-line composition of patterns as a starting point. Secondly, the selector index must be set as part of a "do-pattern". The following example (tmpl5.tok) illustrates a first attempt using this approach. Note the following:

- Line-by-line composition of a union pattern starts with initialization to reject (line 11).
- The use of the Find rule template (defined on lines 1–3) which we saw before.
- The index variable in the do-pattern (line 13) is hopefully set to the appropriate selector whenever a union element is matched.

The result that this script produces is {3,3,3} as shown on line 25, not the {1,2,0} selections as expected.

```
1   production Find <Pattern p> ->
2       (*any butnot *any + p + *any) + p
3   ;
4
5   static {
6       Stream is = {{The quick nimble grammar
                     jumped over the prior art.}};
7
8       String[ ] keys = {"prior", "nimble", "over"};
9       int index = -1;
10
11      Pattern unionPat = reject;
12      for (int i = 0; i < length (keys); i++)
13          unionPat = unionPat | do (; keys[i]; index = i);
14
15      int[ ] selectors = new;
16      int pos = 0;
17
18      for (int i = 0; i < 3; i++) {
19          tokenize (is) {
20              case Find <unionPat>:
21                  selectors[pos++] = index;
22              }
23      }
24
```

-continued

```
25          int[ ] temp = {3,3,3};
26          if (equals(selectors, temp))
27              system::println("test tmpl5 ok");
28          else
29              system::println("test tmpl5 failed");
30      }
```

This script produced the unintended result of {3,3,3}, despite line 13 which sets the index to the appropriate selector value (hoped for) on each loop iteration. Note that by the time the automata is constructed and executed (line 19), the value of the variable "i" is 3. Since the engine for the grammar compiles instructions for "do-patterns", as opposed to values, a reference to "i" is being compiled into the regular expression on line 13, rather than the value of "i".

Thus the value of "i" (as it was on line 13) was not put into the automata, but rather an instruction code sequence which de-references "i" to get its current value, which in this case, is 3 at the time the automata is executed. The intent, which is to somehow bind the value of "i" (at the time the expression is created) to the automata is exactly the behavior offered by template in params. In other words, a template in param is "bound" to the template instantiation, and its value at the time of instantiation is carried through to the automata. This example is rewritten as tmpl6.tok, and performs as expected. Notes for this example:

On line 5 an in out parameter is used to reference the variable into which is stored the selection.

On line 6 an in parameter is used to bind the selector value to the instantiated template.

On line 19 the scope of the union is increased, each time we iterate through the array of search-keys.

Note in line 18 that this for-loop works regardless of the length of the array of search-keys, hence the "dynamic" property of the union-switch.

```
1       production Find <Pattern p> ->
2           (*any butnot *any + p + *any) + p
3       ;
4
5       production Selector <in out int index,
6                           int value,
7                           Pattern p> ->
8           do (; p; index = value)
9       ;
10
11      static {
12          Stream is = {{The quick nimble grammar
                         jumped over the prior art.}};
13
14          String[ ] keys = {"prior", "nimble", "over"};
15          int index = -1;
16
17          Pattern unionPat = reject;
18          for (int i = 0; i < length(keys); i++)
19              unionPat = unionPat | Selector <index, i, keys[i]>;
20
21          int[ ] selectors = new;
22          int pos = 0;
23
24          for (int i = 0; i < 3; i++) {
25              tokenize (is) {
26                  case Find <unionPat>:
27                      selectors[pos++] = index;
28              }
29          }
30
31          int[ ] temp = (1,2,0);
```

-continued

```
32          if (equals(selectors, temp))
33              system::println("test tmpl6 ok");
34          else
35              system::println("test tmpl6 failed");
36      }
```

A proper result of {1,2,0} is now obtained which corresponds with finding "nimble" first, then "over", then "prior".

8.4.2.5 Additional Examples

The following examples demonstrate the right-to-left concatenation and inhibit expression. The concept of right-to-left concatenation is lacking in some grammars in the art. It is offered, as an "attribute" of the parse-tree building algorithm, in Lex-Yacc. And it has been discussed in texts such as Ullman's "Dragon Book" on compilers. The grammar of the present invention uses a particular choice of operator to accomplish this, namely the <+ operator. This operator does not exist in the C language, but it exists in the present invention at the same precedence level as the default + operator, which represents "left-to-right" concatenation. The grammar systematically introduces instructional side-effects into the automata. As a consequence of instruction arcs, all execution paths through the automata, recognizing the greatest number of chars, are not equal.

If two consecutive terms in a concatenation expression can overlap and "eat" the same characters from the input stream, and one or both of these terms has associated "side-effects", the engine must choose the "winning" thread according to the "left-to-right" or "right-to-left" semantics chosen by the programmer. A simple example of such overlapping would be a first term ending with *'' and a second term (of the concatenation) beginning with *'', each term "fighting" for the optional white-space.

Without meeting this requirement, the engine and grammar of this invention would lose the type of specificity normally expected of a programming language. An implication of this is that for any language that offers side-effects, concatenation should be offered through a specific operator (s), and this in turn highlights the deficiency of Perl which offers side-effects, but does not allow the programmer to control left-to-right and right-to-left binding of concatenation.

Thus when the programmer uses "left-to-right" concatenation (the default + operator or the >+ operator), the first term is to be as greedy as possible relative to the second term. When the programmer uses the "right-to-left" concatenation <+ operator, the second term is to be as greedy as possible relative to the first term. This notion of relative "greediness" (of consecutive terms in a concatenation) is different than the "greedy" algorithm in the art, which only considers how many characters were "eaten" in totality. Finally, an earlier example (tmpl4.tok) is improved by the following script (rtl1.tok), producing the most accurate result. Notes:

The most accurate version of a general Find rule, as shown on lines 2 and 8, uses the <+ operator; this ensures that the true leading edge of the target pattern p is found, a coding accuracy required when p can contain itself, as seen in the sub-string "AXX-AXXXB".

Line 25 shows verification that this script produces the correct result target of "AXXAXXXB".

```
1   production Find <Pattern p> ->
2       (*any butnot *any + p + *any) <+ p
3   ;
4
5   production Find <Pattern p,
6                   out String slack,
7                   out String match> ->
8       &slack(*any butnot *any + p + *any) <+ &match(p)
9   ;
10
11  static {
12      Stream is = {{XXXXAXXAXXXBZZZZAXBZZZ}};
13      Pattern pTarget = 'A' + Find<'B'>;
14
15      String slack;
16      String target;
17
18      tokenize (is) {
19          case Find<pTarget, slack, target>:
20              ;
21          default:
22              system::println("test rtl1 failed: target not found");
23      }
24
25      if (equals(slack, "XXXX") && equals(target, "AXXAXXXB"))
26          system::println("test rtl1 ok");
27      else
28          system::println("test rtl1 failed");
29  }
```

This example is important, because it shows the preferred design pattern for a programmer wishing to create a re-usable rule to "find-first."

The inhibit pattern is another novel aspect of the grammar. Its purpose is to inhibit side-effects. Assume the existence (in a library source file) of production rules that produce various side-effects, caused by for example by embedded "capture-patterns" or embedded "do-patterns." One may wish to re-use such rules in a way that all of the "capture" side-effects are completely inhibited—this having the effect of stripping the instruction arcs from the automata. The inhibit-pattern of the present invention is illustrated in the first example of the next section.

8.4.3 Advanced Examples

In example adv1.tok, finding the Nth instance of an arbitrary pattern is demonstrated. As well, the example demonstrates that the engine permits an instantiated template with side-effects to be passed to another template as a sub-expression. The "inner" instantiation is built into the automata (at execution), and its corresponding side-effects are executed too, so long as they are accumulated during the "winning" thread's traversal. This example also shows the inhibit keyword in action, because the inner instantiation has a side-effect which is inhibited for the first N−1 finds. Please note the following points:

- The upcount, as an in out param on line 2, gives a true test of the inhibit keyword—essentially, this version of the Find production rule not only does the find-next, returning slack in between, but also increments a one-up-count (line 3) each time the Find succeeds, as a side-effect.
- A subjunctive design pattern (already seen) is used to eat an 'A', then up to the first string of 'B's, and continuing to the end of that string of 'B's.
- The ADOTDOTB rule defined on line 1 is instantiated on line 41 to create the "inner" find expression—this is the one with an "upcount" side-effect that will be successfully inhibited.
- Lines 11–14 illustrate how to write a general FindNth function/rule in the grammar—the importance of the inhibit on line 14 is that if pattern "p" has any side-effects, they must be inhibited for the first N−1 finds.
- On line 40 the oneupcount is set to 0; on line 41 the inner find rule is instantiated (which essentially matches "AXXXBBB", etc.), so that each time it "finds" it will increment the oneupcount.
- Line 8 uses the <+ operator to ensure that the *any butnot *any+p+*any on line 8, which is used to eat slack, will not eat any part of the matching pattern "p" (this was discussed in detail in the previous section).

```
1   production ADOTDOTB <out String slack,
2                       in out int upcount> ->
3       do (; 'A' + &slack(*any butnot *any + +'B' + *any) + +'B'; upcount++)
4   ;
5
6   production Find <Pattern p,
7                   out String match> ->
8       (*any butnot *any + p + *any) <+ &match (p)
9   ;
10
11  production FindNth <Pattern p, int N, out String match> ->
12      (N == 0) ? reject :
13      (N == 1) ? Find<p, match> :
14      inhibit(Find<p, match>)*(N−1)..(N−1) + Find <p, match>
15  ;
16
17  function boolean Test (Pattern p)
18  {
19      Stream is = {{XXXXAXXAXXXBZZZZAXBZZZAAAXXXAXXXBBBZZZZZABBBBZZZZ}};
20      tokenize (is) {
21          case p:
22              return true;
23          default:
24              return false;
25      }
26      system::println("test adv1 failed: tokenize default");
27  }
```

```
28
29   static {
30        int pos = 0;
31        String[ ]      outer1 = new;
32        String[ ]      outer2 = {null, "AXXAXXXB", "AXB", "AAAXXXAXXXBBB", "ABBBB"};
33        String[ ]      inner1 = new;
34        String[ ]      inner2 = (null, "XXAXXX", "X", "AAXXXAXXX", ""};
35        int[ ]         count1 = new;
36        int[ ]         count2 = {0,1,1,1,1,0};
37
38        for (int i = 0; i <= 5; i++) {
39             String inner, outer;
40             int upcount = 0;
41             Pattern target = ADOTDOTB<inner, upcount>;
42
43             if (Test(FindNth< target, i, outer>)) {
44                  inner1[pos] = inner;
45                  outer1[pos] = outer;
46             }
47
48             count1[pos] = upcount;
49             pos++;
50        }
51
52        if (equals(inner1, inner2) && equals(outer1, outer2) && equals(count1,
     count2))
53             system::println("test adv1 ok");
54        else
55             system::println("test adv1 failed");
56   }
```

In the foregoing code, all of the correct test patterns are found, both the slack from the inner instantiation and the match from the outer instantiation, as seen by the fact that the arrays on lines 32 and 34 match properly in line 52. But even more importantly, inhibit works as designed. The array of one-up-counts is {0,1,1,1,1,0}, indicating that the first and last match fail completely (because FindNth(0) is undefined and because FindNth(5) cannot find a 5$^{th}$ match), and that the middle 4 matches succeeded. The oneupcount is 1 for the middle 4 matches precisely because the inhibit (line 14) ensures that the incrementing of the oneupcount on line 3 takes place only for the final match, not the N−1 matches that precede it. To verify this principle, the inhibit from line 14 (on the CD as example adv2.tok) was removed, with the result that the "count1" array (of oneup-counts) changed to {0,1,2,3,4,0}.

For the final advanced example, use of the grammar to read HTML tags is presented. Although this example does not extract tag attributes, templated production rules make the job of coding a parser relatively simple. For the use of the grammar to write parsers, the current implementation and the grammar being patented by this application do not support languages that allow recursive definitions. HTML is no problem, because it does not allow recursive tag definitions.

In lines 1–25, the example shows how to create production rules for HTML, which not only recognize, but extract elements. The SP<> rules on line 1 simply define an HTML space. The BeginTag<String name> rule on line 5 shows how to create a general production rule template to handle specific HTML tag elements. The instantiation of the production rule specifies the tag-name, as done on line 24, from another production rule, which eats the entire tag element. The CharData rule is a simple example of how we might write a rule to read HTML character data. It is not general, in that it does not handle HTML escapes. However, it does use the subjunctive on line 18 to ensure that there are no other tags in the data.

The HTML programmer who wishes to define an HTML table, embeds a series of <TD> tag elements within a <TR> tag. In turn, a series of <TR> tags is nested within the <TABLE> tag. In lines 28–38, we show how easily the production rule for the <TR> tag is defined. In fact, not only does this rule recognize all <TD> elements embedded within a <TR>, but it also returns an array of Strings, which contains the character data of each <TD> tag. In a similar way, the production rule for Table on lines 41 through 51 shows how to use the already defined Row tag, and extract each row into the table. The table data structure that results is simply a 2-dimensional array of the character data within the <TD> elements.

The HTML snippet tested is embedded as a Stream literal in lines 56 through 76. The resulting extracted matrix of data should match the matrix defined in lines 79 through 84. The actual tokenization is accomplished on lines 86 and 87. The test to ensure that all of this happened correctly is on lines 94 through 97.

In less than 80 lines of code (not including the embedded Stream literal) the grammar of the present invention presents the production rules that ingest the cell-data of this HTML table, as well as a static function that uses these rules to do it. Similar to these rules, a generally applicable set of HTML production rules could be written to cover all of the HTML tags. They would not only successively extract character data, but they would extract tag-attributes. There would be very general rules such as BeginTag (line 5) and EndTag (line 9) and CharData (line 14) and Tag (line 21). There might be multiple versions of these rules, some of which extract, and some of which do not extract, to improve performance when extraction is not requested. HTML tags such as <TABLE> which have a particular structure of embedded elements would have their own rules. But, tags such as <BR> which adhere to a very simple form would not need a specific rule—instead the programmer would use a rule that represents the form of that tag, coupled with the tag-name.

The imprecision of the HTML specification allows an HTML tag to be upper case or lower case. An ignorecase( ) expression would work well in the grammar; however, it is well-known in the art. The interpreter simply converts each character in a regular expression to a character-class consisting of the uppercase and lowercase versions of that character, on behalf of the programmer. Since known, it is not claimed in this application, nor implemented in the "reduction to practice" engine of the submitted source code.

Finally, for this example, note the following:
- On line 16, the right-to-left and left-to-right versions of the concatenation operator are effective in specifying relative "greediness" of adjacent terms—here the >+ operator ensures that the *SP<> term eats/trims all of the spaces to the left of the extraction data, and the <+ operator ensures that the *SP<> term eats/trims all of the spaces to the right of the extraction data—note that the arrow is like an adjective (relative to the plus), and the "point" of the arrow points to the "less" greedy term of the expression, with the connotation that the "greedier" term is "greater than"—the >+ operator is used rather than the default + operator just for purposes of emphasis and readability.
- On line 32 the out param for the Row rule, which is an array of Strings, is created within a do-pattern of the rule; this array is then filled element by element on line 35.
- On line 47 the instantiation of the Row rule occurs within the definition of the Table rule—note that before the instantiation, this element/row of the table matrix does not exist—the instantiation makes a reference to the desired element of the table, and the Row rule actually creates that row array (of Strings) on line 32.

```
1    production SP < > ->
2        '[ \t\r\n]'
3    ;
4
5    production BeginTag <String name> ->
6        '<' +  name + *SP< > + '>'
7    ;
8
9    production EndTag <String name> ->
10       "</" + name + *SP< > + '>'
11   ;
12
13   // NOTE: the right-to-left concatenator is necessary here to
     strip spaces
     correctly
14   production CharData <out String body> ->
15
16       *SP< > >+ &body(*any) <+ *SP< >
17           butnot
18               *any + '[< >]' + *any
19   ;
20
21   production Tag <String name,
22                   Pattern body> ->
23
24       BeginTag <name> + body + EndTag <name>
25   ;
26
27   // NOTE: the nested usage here works and is not the same as
     recursion
28   production Row <out String[ ] row> ->
29
```

-continued

```
30   Tag <"TR",
31
32       *SP< > + do (int i = 0, row = new;
33                    * do (String s;
34                         Tag <"TD", CharData <s> > +
                            *SP< >;
35                         row[i++] = s
36                    );
37                 )
38       >
39   ;
40
41   production Table <out String[ ][ ] table> ->
42
43   Tag <"TABLE",
44
45       *SP< > + do (int i = 0, table = new;
46                    * do (;
47                         Row <table[i]> +
                            *SP< >;
48                         i++
49                    );
50                 )
51       >
52   ;
53
54   static {
55       Stream is = {{
56           <TABLE>
57               <TR>
58                   <TD> one</TD>
59                   <TD> two   </TD>
60               </TR>
61
62               <TR>
63                   <TD> three </TD>
64                   <TD>four </TD>
65                   <TD>five</TD>
66               </TR>
67
68               <TR>
69                   <TD> six </TD>
70               </TR>
71
72               <TR >
73               </TR >
74           </TABLE>
75
76       }};
77
78       String[ ][ ] table1;
79       String[ ][ ] table2 = {
80           {"one", "two"},
81           {"three", "four", "five"},
82           {"six"},
83           { },
84       };
85
86       tokenize (is) {
87           case *SP< > + Table <table1>:
88                   ;
89
90           default:
91                   system::println("test adv4 failed: default");
92       }
93
94       if (!equals(table1, table2))
95           system::println("test adv4 failed: wrong values");
96       else
97           system::println("test adv4 ok");
98   }
```

8.5 Automata Details

This section provides details on the design of the Automata Composition/Construction Engine and the Automata Execution Engine, which are the components that implement the regular expression engine of this grammar. In the case of parameterized production rules, the tokenize statement, and the capture-pattern, some details are also given for the Script Translator, in terms of how it produces low-level representations of such grammars. These 3 grammars are all resolved to low-level "do-patterns".

8.5.1 Virtual Machine

The implementation of this engine uses a virtual machine architecture. The primary motivation for this requirement will be explained in section 8.5.1.1 below. The Virtual Machine (VM) selected for the current implementation of this invention uses "FORTH-like" instructions, sharing similarities also with the Java Virtual Machine. Although the term "FORTH" is used to describe the VM of this invention, it does not imply a "standard" FORTH engine and grammar. Rather, the term FORTH here refers to an approach for building virtual machines and their grammars. In this sense many languages in use can be likewise called "FORTH-based", even though their atomic dictionary of FORTH words may differ extensively. PostScript is an example of such a language. FORTH-like languages share some important features, which can be inferred from the following list of FORTH-like aspects of the Virtual Machine of this invention:

The Script Translator generates as its output, a textual stream consisting of space-separated String tokens as the output of a script translation. These String tokens are referred to in this document as "FORTH words". Since every "word token" is separated by white-space, the VM interpreter for this invention, like every FORTH interpreter, is very simple (see Interpreter.java).

These FORTH words resolve to FORTH tokens and literals, including the following categories:

FORTH literals such as Strings, chars, and ints. The syntax of these literals in the FORTH grammar of this invention is identical to the syntax of the same literals in the actual (high-level) grammar of this invention, primarily so that the Script Translator component and the VM Interpreter can share common code for parsing literals. EParser.java tokenizes literals for the FORTH interpreter, ScriptParser.java tokenizes literals for the Script Translator (for actual scripts of the grammar), and both use the common code in Parser.java. The standard FORTH grammar for literals varies substantially for literals.

FORTH comments. The syntax of comments in the FORTH mini-grammar of this invention is the same as that of the high-level grammar, which adopts the C++ syntax for comments. The standard FORTH grammar for comments varies substantially.

FORTH atoms. The atoms of the FORTH mini-grammar of this invention share a commonality with standard "FORTH"—they are designed (with few exceptions) to contain individually their effects on the frame, stack, dictionary, etc. This is in contrast to languages such as the C-like grammar of this invention, where the meaning of tokens is based in context with other tokens. In fact, we will see in the area of "flow-control" that this variant of FORTH is more context-free than the standard FORTH. The main exception is the "FORTH-word" key, used to define new words in the dictionary, which must also parse whatever word-token immediately following as the "definition-key". Nevertheless, very few "atoms" of the FORTH-grammar of this invention are also found in the "standard" variants of FORTH.

FORTH aliases. The mini-grammar of this invention, as a convenience, predefines several aliases, which resolve to a sequence of FORTH atoms. An example is "swap", which is not an "atom" per se in the mini-grammar of this invention, but resolves to the literal "1" followed by the atom "nswap".

FORTH dictionary. This invention does not rely much on the FORTH dictionary. It is used only to store the definitions for the high-level functions (and static block) of the programmer's scripts, implying of course that script functions are translated by the Script Translator into sequences of FORTH words, that are further reduced to FORTH tokens. These tokens are hereafter often referred to as instructions (such as the instructions (arrays) of "instruction arcs").

"global" variables. The way that the C-like global variables (called static in Java) of the language of this invention are modeled is by creating a VM construct in the FORTH engine that is an array for globals, and using a global literal and creating a syntax for global variable literals—$$0, $$1, $$2, etc.

"local" variables. The way that the C-like local variables (called static in Java) of the language of this invention are modeled is by creating a VM construct in the FORTH engine for a stack frame, and using a "local" literal and creating a syntax for local variable literals— $0, $1, $2, etc. This is much like the Java VM, and is in contrast to the standard FORTH variants which have the concept of a "return stack". "Local variable" literals are also used for variables defined within the scope of a high-level "do-pattern".

"flow-control" atoms. The standard FORTH grammar does use some context-based tokens for "if-else" statements and "while-loops" and the like, which require parsing by its interpreter, and therefore do not really correspond to atoms. The mini-grammar of this invention is more like PostScript in the area of "flow-control"—only 2 FORTH words are used in flow-control that are context-based and not correspondent to actual atoms, and are the same two "words" used to define a function. That is, {x . . . . . . x} defines an executable array, and flow-control is supplied by custom FORTH words of this invention such as exec, if, and ifelse that look for an executable array on top of the stack. The atom-words break and continue cause the engine to "pop" and "loopback" within its stack of executable arrays. The atom break is used for returning from functions, and every kind of breaking from loops. The atom continue is used to implement the "continue" grammar of C, but also to force a normal continuation at the end of a loop. There is no "loop" atom, but rather exec which executes the x-array on top of the stack. To create the looping construct, the Script Translator inserts a continue atom at then end of the x-array.

"template frames". Instantiated production rules require a second FORTH frame, not found in the embodiments of other VMs in the art.

"low-level do-patterns". Low-level do-patterns of the mini-grammar of this invention are modeled by a second type of executable array with the following syntax—{xx . . . . . . xx}—which is intentionally different from that of the syntax used for "flow-control" and definable procs given above. This different syntax is required because the instruction arrays of low-level "do-patterns" may themselves contain "break" tokens, which must ignore any of the {xx and xx} x-array boundaries, but instead break relative to {x and x}. This is done to satisfy the requirement that the executable array for the compiled instructions of "do-patterns" must be able to model any kind of high-level grammar statement, including if-else statements and while-loops.

8.5.1.1 Abstract VM

As stated previously, the grammar of this invention is modeled after the C-language, with the addition of support for regular expressions which adopt the C-language's syntax for normal expressions. This would seem to indicate that a language such as C++ could be extended to include the grammar of this invention—that is, by adding a tokenize statement to the extended C++, as well as support for all of the regular expression forms of this grammar, and production rules.

However, there would be obstacles. First, consider the fact that most of the constructs in C++ have analogs in all assembly languages—functions and member functions can be compiled to assembly language procs; statements and expressions can be compiled to sequences of assembly language instructions; variables can be modeled with registers and with references to the stack flame; the stack frame can be modeled with address registers that support pre- and post-increment and decrement. Even structured data member-access can be compiled into assembly language instructions.

In C++, container objects such as Strings are modeled by class or template libraries, so that a String object in C++ is offered not by the base-language, but via classes defined in one or more libraries to be "included". Therefore, the first choice for implementing the regular expressions of this grammar in C++ would be through a class library. Although C++ has no >+ or <+ operators currently defined in its language specification, this problem could be answered quite easily in C++ interpreters. So assuming the existence of a "standard include" library for a Pattern class, we must next answer the question of what does the C++ interpreter do with a tokenize statement. The problem here is that the syntax of member function definitions and operator-overloading are not adequate to model the tokenize-switch statement of the grammar of this invention. It is not a function call, it is more like a switch statement. This statement therefore would have to be treated by special code in the C++ interpreter, which would resolve that statement to calls to "private" member functions of the Pattern class. In this sense, the interpreter would be highly coupled to the Pattern class (the signatures of its private member functions), and so the Pattern class libraries could not be viewed as "pluggable" include libraries. The conclusion is that the Pattern data type would be best modeled as a "primitive" of an extended C++, and all of its operator semantics "hard-wired" by the interpreter to "hidden" function calls—similar to what is done to handle double-longs when the target platform's assembly language does not have built-in arithmetic support for double-longs.

Although a VM "assembly" language which includes primitive instructions for manipulating the Pattern type is seen as having advantages, it is not a requirement based on the above arguments. The next problem to consider is that of "do-pattern" expressions. If the grammar of the present invention were to be incorporated into either C++ or Java, the "do-pattern" pre-list and post-list statements would be compiled to native machine instructions (C++) or VM instructions (Java), similar to what is done in the present invention. These instructions would reference and manipulate frame variables and register variables (native and VM respectively). These instructions could also reference built-in (primitive) container objects, such as Strings and Patterns and Character-Class objects, a requirement that makes a strong argument for a VM architecture such as Java's versus C++. But a very big obstacle for a C++ architecture is that these "do-pattern" instruction arrays are (and must be) treated as data arrays from the point at which they are created, until the snippets "accepted" by the automata's execution are then assembled into one long array of instructions. C++ architectures generally allow only the interpreter to create code segments. It is seen that the internal functions executing the automata would not normally have "privileges" to dynamically create and call a "code-segment" based on the "do-pattern" ACCEPT fragments.

This latter obstacle favors a VM architecture such as that of Java, which could be more easily adapted to the unique requirements of the regular expression grammar of this invention. Nevertheless, it is expected that both Java's VM instruction set, and its current engines on the market would have to be extended to solve the aforementioned problem of allowing arrays of VM instructions to be assembled as data and then executed.

Yet another hurdle for incorporating the regular expression grammar of this invention into either the Java Virtual Machine or into native C++ compilers would be that of modeling instantiated production rules. It will be seen in section 8.5.1.3 below that in the VM of the present invention, instantiated production rules resolve to low-level "do-pattern" expressions. That is not a problem. However, the present embodiment also requires an additional frame construct in the VM, the "template frame", to allow the binding of production rule parameters to the instantiation object (a requirement also explained in section 8.5.1.3), and to allow nested rule instantiations. The concept of a "template-frame" exists in neither the present Java VM, nor current native machine architectures. This aspect of production rule modeling favors a virtual machine architecture, which by the "virtual" aspect of a VM, allows the creation of any new VM construct needed.

8.5.1.2 Forth VM

In this section, we look at how various statements, expressions and objects are mapped to FORTH words in this invention. This is done to prepare the reader for understanding how "do-patterns" and other regular expressions are represented in FORTH "words", which make it easy to model the tree-structure of an expression, because the FORTH regular expression "words" combine their elements as in "Polish notation" arithmetic.

8.5.1.2.1 Standard Grammar

The following example (/algo/basic1.tok) illustrates how statements and variables are mapped to FORTH words.

```
1     static int g_count = 5;
2
3     function String P ( )
4     {
5         return "AB";
6     }
7
8     static {
9         Stream is = {{aabbcc}};
10        String[ ] ar = new;
11        for (int i = 0; i < g_count; i++)
12            ar[i] = P( ) + String(i);
13    }
```

This script code is translated to the following FORTH stream of words.

```
14       $$0 null assign
15       $$1 null assign
16       $$2 null assign
17       $$4 null assign
18
19       // here is definition for function: P
20       // which takes args:
21       key func_P
22       {x
23           $0 "AB" assign 1 break
24       x }defineproc
25
26       {x
27           1 fpush
28           $0 null assign
29           func_P
30           $0 valueof
31           fpop
32       x}
33       key call_P 1 get defineproc
34       $$5 swap assign
35
36       $$4 5 assign
37       key $ static
38       {x
39           $0 {{aabbcc}} assign
40           $1 newarray assign
41           $2 0 assign
42           {x
43               $2 valueof $$4 valueof <
                 not {x 2 break x} if
44               $1 valueof $2 valueof aref
                 call_P $2 valueof int.String s+ swap
         1 get assign
45               drop
46               $2 dup valueof swap 1 get 1+ assign drop
47               0 continue x} exec
48       x} defineproc
49
50       3 fpush $static fpop
```

In the above stream of FORTH words as generated by the Script Translator, notice the following:

The syntax for expressing a global variable reference is $$ followed by the an integer offset into a globals table. The script code can use globals without allocating space. In lines 14–17 we see how to initialize 4 global variables to null. Note that every script currently uses 3 hidden globals for the tokenize statement, and this particular script declares 1 global.

Line 21 pushes the string "func_P" onto the stack not as a String literal, but as a dictionary key to represent the function P in the script. Line 24 closes the executable FORTH array for this function and maps the executable array just defined to the FORTH-key func_P in the FORTH dict.

Lines 22 and 24 show how the sequence of FORTH words on line 23 are turned into an executable array with the {x and x} ATOMS.

Breaking from a loop, continuing back to the beginning of a loop (the continue statement), and returning from a function are all accomplished with the FORTH break and continue word-atoms. On line 23 break is being used with the integer 1, which means break 1 level from this executable array, to accomplish returning (line 5 in the script) from the function.

As mentioned above, the return of script line 5 is resolved as the break of FORTH line 23. But that is not sufficient except for functions returning void. The 3 words of FORTH line 23—$0 "AB" assign—assign the string literal "AB" to the local variable $0 which is always the offset of the return variable in the stack frame.

FORTH lines 21–24 define the "body" of the script lines 3–6 function. However, the body of this function assumes that the function's arguments have already been put into the stack frame, and does have to manipulate the frame before returning. Likewise, movement of parameters between stack and frame is also not accomplished in the caller's code. Another FORTH "proc" is defined along with the FORTH "proc" that represents the "body" of the function. This "proc" represents the "call-stub" for the script function. This "call stub" is shown in FORTH lines 26–34. Line 27 creates the frame, line 28 initializes the return result to null, line 29 actually calls the FORTH "body-proc" of the function, line 30 fetches the function result from the frame (as "local-variable" zero) onto the top of the stack, and line 31 restores (pops) the frame. Lines 33–34 map the x-array of the "call-stub" to the key "call_P" in the FORTH dictionary, but differently from the more natural flow of FORTH lines 21–24, which map the x-array of the "func-body" to the key "func_P" in the dictionary. This shows the power of FORTH in that function body definition breaks down into: (1) pushing an executable array onto the stack, (2) creating a dictionary-key with the key atom, and (3) mapping the key to the x-array in the dictionary. As we can see, each of these steps is stack-based, so that a particular syntax order is not mandated so long as there is no net effect on the stack and the desired definition is inserted into the dictionary. In this case, the motivation for the more complex approach of lines 33–34 is to not only map the x-array to a dictionary key, but also assign the "call-stub" x-array object to a global variable $$5. The purpose of this is to easily handle "forward" style function declarations without requiring that the programmer make any pre-declarations.

FORTH line 36 maps to script line 1, as the declaration and initial assignment of the global int variable to the value 5.

FORTH lines 37–48 define the static body of the script, and then FORTH line 50 immediately calls the static body, since the behavior of a script's static body is to be "called upon loading".

FORTH line 40 maps to script line 9. $0 is a local-frame variable of the static body which has been mapped to the Stream variable "is" of the script.

FORTH line 41 below maps to script line 10. $1 is a local-frame variable of the static body which has been mapped to the array variable "ar" of the script.

FORTH lines 42 through 47 below map to the for-loop of the script (lines 11–12). Note that a loop is nothing more than an executable array (FORTH proc), whose last 2 words are 0 continue which moves control back to the beginning of the loop-proc, rather than exiting the loop-proc. Also, note that to get the loop started, we simple push the executable array onto the stack, and invoke the FORTH word-atom exec, which pops and executes the executable array. The exec word does not know that it is a loop-construct. This same word-atom exec is also used to execute the side-effects of an automata's execution, wherein we see the advantage of both a virtual machine and a FORTH architecture for solving the problems of how to execute instructions assembled as automata side-effects.

Note on FORTH line 43 that the proc {x 2 break x} is a proc which gets executed only if the for-loop "break" condition is found to be true. The 2 levels of the break include 1 for this mini (2-word) break-proc, and 1 for the for-loop's loop-proc. Here is an example of how flow-control does not require any contextual-based syntax. Even the difficult && and || short-circuit booleans can be handled without any flow-control semantics in the FORTH engine.

This FORTH mini-grammar is shown above not because a programmer of the grammar-proper of this invention will have occasion to use it, but because understanding a little of this mini-grammar helps to understand how the FORTH instruction side-effects of "do-patterns", "capture-patterns", and instantiated templates are accomplished.

8.5.1.2.2 Pattern Expressions

Pattern expressions (regular expressions) are modeled by the Grammar object of the invention (Grammar.java). This is an abstract base class, and an object/subclass of this type always defines the following abstract function (Grammar.java, lines 36–38) used to compose an NFA that represents any Pattern expression object.

```
protected abstract Segment NewSegment    (ArcNums arcNums,
                                          UpCount nodeCount,
                                          boolean inhibit)
                                         throws Exception;
```

The above function is implemented by all of its base-classes, each of which knows how to "compose" its own type of expression into an NFA. All of the base classes have names ending with "Grammar.java"—such as DoGrammar.java, TmplGrammar.java, CharClassGrammar.java, ButNotGrammar.java, IterateGrammar.java, etc.—each class's name describing the type of Pattern expression which it models.

The other 2 significant functions within the Grammar base class are "compose" and "subset-construct" NFAs respectively. These functions (Grammar.java lines 40-59) are shown in-line here as:

```
//
// assuming that the segment is a complete grammar, and we want
// to see the graph of the composition, this returns the NFA
// graph for this grammar
//
public Segment NewComposition ( ) throws Exception
{
    return NewSegment (new ArcNums( ), new UpCount( ), false);
}
//
// assuming that the segment is a complete grammar, and we want
// to get the executable (optimized through subset construction) graph
// this returns an NFA that is optimized
//
public Segment NewConstruction ( ) throws Exception
{
    Segment segment = NewComposition ( );
    return segment.NewSubsetConstruction (null, false, new UpCount( ));
}
```

The function NewConstruction is the function which maps to the FORTH word "construct", which first composes the NFA and then converts the NFA to executable form through "subset-construction". The Grammar objects (that is, the sub-classed objects) are all immutable. This means that once constructed, such an object (representing a Pattern expression) will never change. This is a critical technique for implementing the "line-by-line composition" feature discussed previously. This idea is illustrated with the following snippet of code (/algo/lineby.tok):

```
1        static {
2            Pattern p1 = '[AB;]';
3            Pattern p2 = p1;
4            p1 = ?p1 <+ ?p1;
5            Pattern p3 = p1 + p2;
6        }
```

When p2 is assigned to p1 on line 3, and since it is not reassigned subsequently, it will remain unaffected by the re-assignment of p1 on line 4, so that p2 as used on line 5 refers to the original assignment to p1 of '[AB]', not the line 4 concatenation. The FORTH main body this translates to is as follows:

```
7     key $ static
8     {x
9         $0 '[AB;]' CharClass.Pattern assign
10        $1 $0 valueof assign
11        $0 $0 valueof p? $0 valueof p? p<+ swap 1 get assign drop
12        $2 $0 valueof $1 valueof p+ assign
13    x } def ineproc
```

Lines 9 and 10 ensure that the local variables $0 and $1 both reference the same grammar object (as defined by CharClassGrammar.java), namely the char-class '[AB]'. Line 11 updates the variable $0 (which maps to p1) according to line 4 in the script above. This FORTH does not change the Grammar object to which $0 references based on the line 9 assignment. Rather, the operators p? and p<+ both cause new grammar objects (OptionalGrammar.java and ConcatGrammar.java) to be constructed based on their inputs, as seen in the table of actions and FORTH effects of FIG. 7 of section 7.

The table of FIG. 7 shows that indeed the FORTH words ensure that the final assignment to p3 in line 5 above results in the pattern expression—(?'[AB]'<+?'[AB]')+'[AB]'—which would not be the case if the line 4 assignment caused the value of p2 to change, hence the importance of "immutability" of pattern objects.

8.5.1.2.3 Do-pattern Expressions

The following mini-script (/algo/doexpr.tok) illustrates a "do-pattern":

```
1      static {
2          int i = 0;
3          Pattern p = do (i = 1; '[AB;]'; i = 2);
4      }
```

Here is the static function of this 4 line script resolved to FORTH words:

```
5      {x
6          $0 0 assign
7          $1
8          {xx
```

-continued

```
 9            $0 1 swap 1 get assign drop
10         xx}
11            '[AB;]' CharClass.Pattern
12         {xx
13            $0 2 swap 1 get assign drop
14         xx} pdo
15         assign
16      x} defineproc
```

Lines 8–10 show that the pre-list, representing the statement i=1 on line 3 is resolved to a special executable array starting with {xx and ending with xx}. The post-list, representing the statement i=2 (also on line 3 of the script) is resolved in FORTH lines 12–14. Line 11 shows the "recognition expression" of the "low-level" do-pattern, and the FORTH word pdo pops the top 3 elements on the stack—x-array, pattern, x-array—and causes a DoGrammar object to be created and pushed onto the FORTH stack. Line 15 assigns this DoGrammar object to the local variable $1.

8.5.1.2.4 Tokenize Statement

The tokenize statement employs a low-level "do-pattern", which creates a union of all of the cases in the tokenize statement, and then invokes FORTH words to construct the automata (NFA), execute the automata, execute the "side-effects", and then execute the appropriate case-block. The following snippet (/algo/simtok.tok) shows a very simple tokenize statement resolved to FORTH words.

```
1    static {
2       Stream is = {{ABAB}};
3       tokenize (is) {
4          case +"AB":
5             system::println("found AB");
6          case any:
7             system::println("found any");
8       }
9    }
```

This is translated to FORTH words as follows:

```
10      key $ static
11      {x
12         $0 {{ABAB}} assign
13         $$0 $0 valueof assign
14         $1 -1 assign
15         {xx xx}
16            "AB" String. Pattern p*1
17         {xx $1 0 assign xx} pdo
18         {xx xx}
19            any
20         {xx $1 1 assign xx} pdo p|
21         {xx xx}
22            null
23         {xx $1 2 assign xx} pdo p|
24
25         construct rendernode $$2 swap assign
26
27         {a $$0 valueof $$2 valueof tokenize
              $$1 swap assign exec a}
28         alen 0 != {x "tokenize side-
              effects must not affect stack" abort x}
        if
29         $$0 valueof $$1 valueof streamadvance
30
31         {a
32            {x
33               "found AB" println
34            x}
35            {x
36               "found any" println
37            x}
38            {x
39            x}
40         a}
41         $1 valueof aref valueof
42         dup null = = {x "no accept state
              for tokenize statement" abort x} if
43         exec
44
45      x} defineproc
```

Note that there are 3 low-level do-patterns above, though the script had no do-grammar expressions at all. The reason is that each "case" of the tokenize-switch statement, the 2 explicit cases and the hidden "default" case, are translated into low-level do-patterns. These hidden do-patterns consist of an empty pre-list (lines 15, 18, 21), and a post-list (lines 17, 20, 23) which assigns a selector value to the local variable $1, initialized on line 14 to −1. Thus the side-effect of executing the union-switch-pattern which models the tokenize-switch statement is that a selector value will be set into $1 indicating which case statement matched. The default statement is not explicitly given for this tokenize statement in the script, but in the low-level FORTH a default is provided (lines 21–23), which matches the null pattern, so that if neither case explicitly matches, then the "default" will "fire", matching no characters, and its selector set. The default case is always the last sub-expression of the tokenize-union so that if explicit cases also match against null, those will have preference, because the explicit cases might associate side-effects with the "short-circuit".

Note that the line 4 tokenize-switch case resolves to FORTH lines 15–17, the line 6 case resolves to lines 18–20, and the "hidden" default resolves to lines 21–23.

The automata is composed and constructed on line 25. The FORTH word "construct" constructs an NFA through composition followed by subset-construction (triggering Grammar.java line 58), and the "rendernode" FORTH word converts this NFA (Segment.java object) into a special NFA object (FastGraph.java object). Line 27 executes the automata (the FORTH word tokenize) and also executes the side-effects (with the FORTH word exec) which were returned as an executable array on the FORTH stack.

Note that the FORTH corresponding to the system::println statements in each switch-case (lines 5 and 7) do not appear until after the automata is executed. It is assured that the tokenize statement will result in one of the 3 cases to be "fired", since the "default" case is coded with the null pattern. Therefore, the $1 selector variable, though initialized to −1 on line 14, will have a value of 0 or 1 or 2, as a result of the side-effects being executed. That is, exactly one of the post-lists for the low-level do-patterns (that model each case block) will have been accumulated into the side-effects array, meaning that either line 17, line 20, or line 23 will have been accumulated to side-effects and executed. Finally, lines 31–40 build an array of executable procs, each corresponding to the case-blocks of the tokenize statement. For example, lines 32–34 are the compiled code for line 5 in the script above, and lines 35–37 correspond with line 7 in the script. In line 41 of the FORTH code, the appropriate case-block is selected from the array, and pushed onto the FORTH stack as an executable array. It is verified on line 42 that the x-array exists (meaning that indeed a valid selector value was put into $1 as a side-effect of the automata's execution), and then that case-block's x-array is executed on line 43.

8.5.1.2.5 Capture-pattern Expression

It has been stated that capture-patterns resolve into low-level do-patterns. We start with an example (/algo/simcap.tok) to show what is happening:

```
0    static {
1        String cap;
2        Pattern p = &cap("AB");
3    }
```

This script, which captures a match to its sub-expression—"AB"—into the string "cap", is translated to the following FORTH:

```
4     key $static
5     {x
6         $0 null assign
7         $1
8         {xx $0 $$0 valueof capture xx}
9             "AB" String.Pattern
10        {xx capture strearnstring assign xx} pdo
11        assign
12    x } defineproc
```

On FORTH line 8, a reference to the FORTH local variable $1 is pushed onto the FORTH stack. This variable corresponds with pattern p. Then a low-level do-pattern follows on lines 9–11, whose sub-expression is simply the string "AB". FORTH line 12 assigns this low-level do-pattern to local variable $1, whose reference was pushed on line 8. The point of this example is to show that the structure of this expression is exactly the same as if line 3 in the above example had been a do-pattern (with same sub-expression "AB"), except that the compiled instructions in the instruction arrays of lines 9 & 11 would be different!

The engine requires additional support for a capture-pattern, not in terms of the automata composition, but only because of that special FORTH word "capture" seen in both lines 9 & 11. This word is actually an alias for a special 2-token instruction. It is unique in the sense that unlike other instruction arcs, the Automata Execution Engine and the subset construction algorithm must actually check for the presence of this instruction in the instruction array and act upon it. All other instructions embedded in an instruction arc's instruction array are simply integer data to be associated with the arc (during subset construction), and integer data to be accumulated as side-effects (when executed).

The following 2 actions are taken with this special 2-opcode instruction:

When encountered during execution, instructions associated with instruction arcs are normally just accumulated in the current automata thread's thread state, with no other special handling. However, all instructions must be checked for the presence of the special capture instruction. When the NFA execution thread finds a capture instruction, it looks at the current position in the input stream, relative to where the automata began execution, and records this relative position in the $2^{nd}$ opcode of the 2-opcode capture instruction. The $1^{st}$ opcode for this new instruction is also changed, from EAtom.CAPTURE to EAtom.CAPTURED. The $2^{nd}$ opcode for this new instruction is the relative stream position captured. This takes place in Automata.java, lines 334 & 419 and Instrs.java, lines 72–86.

When the automata execution engine has assembled and returned its side-effects, any capture instructions will have been handled as detailed above, and become part of the returned x-array of side-effects as a 2-opcode EAtom.CAPTURED instruction. Now, the FORTH engine will execute the x-array of side-effects, and any EAtom.CAPTURED will simply cause the relative position of the $2^{nd}$ opcode to be pushed onto the stack. The "streamstring" instruction of FORTH line 11 above will then look for the 2 captured positions (to and from) on the FORTH stack, and extract a substring from the input stream.

The "streamstring" instruction requires no special handling at all because all of the elements it needs (input stream and 2 positions) are guaranteed to have been pushed onto the stack by parts of the pre-list and parts of the post-list instructions. Note on line 9 the $$0 global variable, which always holds the reference to the current (and most recent) input stream executed against an automata. The "streamstring" instruction works properly in part because the input stream's cursor is not updated until after the side-effects have been executed.

Another note is that with few exceptions (such as the capture instruction discussed above), the current instruction opcodes of the FORTH engine are same-sized (single int32 values). This is done to facilitate writing the reference engine for this invention. Properly tuned instruction opcode schemas normally have variable length instructions, as is known in the art.

Another important point concerns a future extension to the high-level grammar—the low-level FORTH "capture" instruction seen above can be exposed to the programmer through a special keyword, such as streampos, in the high-level grammar of this invention. This keyword would be available in any high-level do-pattern pre-list or post-list, and would allow the programmer to capture not only substrings matched, but also the capture positions themselves. In this case, another high-level keyword such as stream could also be exposed, for use in a high-level do-pattern pre-list or post-list, that would represent the current stream being tokenized. In this case, the programmer could simulate the effect of a capture with a high-level do-pattern, essentially equivalent to the low-level do-pattern seen above, without using an actual high-level capture-pattern.

8.5.1.3 Production Rules

Production rules, when instantiated, are fully reduced to low-level do-patterns. However, additional work must be done in the high-level interpreter to make this possible, and an additional VM construct must be invented in the FORTH engine to accommodate this. This is explained by starting with a simple example (/algo/simrule.tok) of a script that declares a production rule, and then uses it.

```
1    production Rule <in Pattern p, in out int count> ->
2        do (; p; count++)
3    ;
4
5    static {
6        Stream is = {{ABCABX}};
7        int countAB = 0;
8        int countABC = 0;
9
```

```
10      Pattern AB = Rule<"AB", countAB>;
11      Pattern ABC = Rule<AB + 'C', countABC>;
12
13      tokenize (is) {
14          case * (AB | ABC):
15              ;
16      }
17      system::println("countAB = " + countAB + ", countABC =
        " + countABC);
18  }
```

The above script has only 1 production rule defined, showing both an in parameter and an in out parameter. The instantiation of the rule on line 10 causes the parameterized rule to recognize "AB", and, if/when it does, to increment the variable countAB. The instantiation of the rule on line 11 concatenates the line 10 instantiation with the character 'C', resulting in an expression that eats "ABC", but this time incrementing the variable countABC. Note that any time rule ABC matches, not only is countABC incremented but also countAB. Finally, line 14 represents a repeating sequence of "AB" or "ABC". Based on the input stream of this example on line 6, the rule instantiation ABC will match once (and AB within it), and the rule instantiation AB will match once alone. In the union, ABC has precedence over AB even though it comes second in the union, because it is greedier. As expected, the output shows a value of 2 for countAB, and a value of 1 for countABC.

Here is the complete FORTH that translates this simple script:

```
19      $$0 null assign
20      $$1 null assign
21      $$2 null assign
22
23      key $static
24      {x
25          $0 {{ABCABX}} assign
26          $1 0 assign
27          $2 0 assign
28          $3
29          nop {a
30              "AB" String.Pattern
31              $1
32          a}
33          nop dup 2 tpush
34          {xx $$$ 2 tpush xx}
35          {xx
36          xx}
37              $$$0 valueof
38              {xx
39              $$$1 valueof dup valueof swap 1 get 1+ assign drop
40          xx} pdo
41          {xx tpop xx }
42          ptmpl tpop nop
43          assign
44          $4
45          nop {a
46              $3 valueof 'C' char.Pattern p+
47              $2
48          a}
49          nop dup 2 tpush
50          {xx $$$ 2 tpush xx }
51          {xx
52          xx}
53              $$$0 valueof
54              {xx
55              $$$1 valueof dup valueof swap 1 get 1+ assign drop
56          xx} pdo
57          {xx tpop xx }
58          ptmpl tpop nop
```

```
59          assign
60          $$0 $0 valueof assign
61          $5 −1 assign
62          {xx xx}
63              $3 valueof $4 valueof p| p*0
64          {xx $5 0 assign xx} pdo
65          {xx xx}
66              null
67          {xx $5 1 assign xx} pdo p|
68
69          construct rendernode $$2 swap assign
70
71          {a $$0 valueof $$2 valueof tokenize $$1 swap
            assign exec a}
72          alen 0 != {x "tokenize side-effects must
            not affect stack" abort x}
        if
73          $$0 valueof $$1 valueof streamadvance
74
75          {a
76              {x
77                  nop
78              x}
79              {x
80              x}
81          a}
82          $5 valueof aref valueof
83          dup null == {x "no accept state for tokenize
            statement" abort x} if
84          exec
85
86          "countAB = " $1 valueof int.String s+ ",
            countABC = " s+ $2 valueof
        int.String s+
87          println
88      x} defineproc
89
90      6 fpush $static fpop
```

FORTH lines 28-43 translate the script line 10 pattern AB. FORTH lines 44-59 translate the script line 11 pattern ABC. The expression for the tokenize-switch case of line 14 that "fires" is translated by FORTH line 63. Examination of the FORTH code shows that there is a special low-level expression type, reflected in the FORTH word ptmpl seen on FORTH lines 42 and 58. This new FORTH word is implemented by TmplGrammar.java. If we compare this grammar to DoGrammar.java we see that the composition is almost identical to that of DoGrammar.java, which implements the low-level "do-pattern". This is why it has been indicated that an instantiated production rule resolves to a low-level "do-pattern". The first difference between a pdo and ptmpl object is that the TmplGrammar object always has a pre-list and post-list of instructions, whereas DoGrammar objects sometimes have an empty pre-list or post-list, which need to be represented by a null arc transition rather than an instruction arc. The second difference is that TmplGrammar.java is bound in its constructor with one additional parameter not found in the Do-Grammar object that represents the low-level "do-pattern". This parameter is an array, whose length matches the number of parameters of the production rule (in this case 2 as seen by the 2 elements of the FORTH array of lines 29–32, and 45–48). The array holds the values of in parameters, and the references (i.e. a FORTH reference type) to in out or out parameters. This binding of the "actual" parameters (whether value or reference) to the template's "do-pattern" object is critical to the correct functioning of that "do-pattern". The reason is that the production rule may have high-level "do-patterns, such as in line 2 of the script, and these pre-lists and post-lists may access temp variables scoped to this or other do-patterns of the production rule, or may access any of the 3 types of parameters of the production rule. For these "do-patterns" to function properly, the "tmpl-pattern" must have its own frame. In part this is because when the production rule is declared, it is declared in program scope, outside of any functions. Therefore, temp variables scoped within "do-patterns" of the production rule cannot use the stack frame of the function. This is particularly true because by specification of the language, in parameters must be bound to each instantiation. If parameters of a rule were implemented simply to reference to the variable holding the value, then several rule instantiations would all reference the same in parameter, even if the variable changed from instantiation to instantiation. Also, rule instantiations can pass "constant" values to the in parameters. These constants do not have a reference. For these reasons, the parameters are bound in a parameter array to the TmplGrammar object.

Lets examine line by line the instantiation of the AB pattern of script line 10. FORTH line 28 pushes a reference to local function (static block) variable $3, to which the instantiation is assigned on FORTH line 43. FORTH lines 29–32 create, and push onto the FORTH stack, an array of 2 elements—the first element is the string "AB", a value parameter and the second element is the reference to local variable $1, which corresponds to the int variable countAB of the script.

FORTH line 33 "dups" the reference to this array object on the FORTH stack, and then immediately does a frame-push to the template frame via the "tpush" FORTH word. It was discovered that the regular FORTH frame would not suffice for this purpose, because pushing another normal frame object within a function would invalidate references to function local variables. The number 2 associated with this template frame push corresponds to the 2 parameters of the production rule, and the fact that the only "do-pattern" (script line 2) of the production rule does not have any variable declarations. If any "do-patterns" within a production rule's body contain variable declarations in either pre-list (normal) or post-list (rare), those variables are scoped to the instantiation of the production rule by inclusion in the template frame as additions to the push count that always includes at least the number of parameters of the rule. The tpush of line 33 creates a 2 variable frame, and immediately copies the values of the parameter array into the frame.

Advancing to FORTH lines 35–40, the translation to FORTH of the actual body of the production rule is presented. The body of the production rule is a "do-pattern", and lines 35–40 are a low-level "do-pattern". The sub-expression of this "do-pattern" is simply the pattern p passed into the production rule, and is seen on FORTH line 37. This sub-expression is the de-referenced value of the template-local variable $$$0, which corresponds to the in parameter of the template. Here the template frame is used at instantiation time, which corresponds to FORTH line 10.

However, the template frame is also used during automata side-effect execution time, which occurs after the automata has been executed and its side-effects determined. That is, on FORTH line 71, when those side-effects are finally executed, the template frame will again be used, because it is pushed and popped as side-effects of the TmplGrammar object. This is the explanation for FORTH line 34, which looks just like FORTH line 33, except that the pushing of the template frame is deferred within an {xx . . . xx} x-array, as a side-effect of the automata. On line 33, the reference to the parameter array is via the FORTH word dup, which expects the parameter array to be on top of the stack. On line 34, the reference to the parameter array is via the special $$$ word, which looks into a global array of parameter arrays. This global array of parameter arrays is reset, and then built at FORTH line 69, when the Automata Composition Engine builds the automata through the calls to Grammar.NewSegment for each grammar object. The FORTH word ptml on line 42 will have popped the parameter array from the FORTH stack (pushed in lines 29–32), the pre-list of the "tmpl/do-pattern" (pushed on line 34), the body of the "tmpl-do-pattern" (pushed on lines 35–40), and the post-list of the "tmpl/do-pattern" (pushed on line 41). When a TmplGrammar automata is constructed, the parameter-array for this instantiation is bound into the aforementioned special "global", as seen in TmplGrammar.java, lines 44-54. When this pattern object is finally rendered to an automata (along with all other template instantiations, such as the one from FORTH lines 44–59), the $$$ FORTH word (actually a double-length instruction) of line 34 is changed so that the second instruction, which was just a place holder of zero, is set to the actual array index that parameter array was bound into, for that global array of parameter arrays. This allows the the FORTH pre-list side-effect of line 34 to be able to find the correct parameter array and do the "mirror" template frame push during automata side-effect execution time. Note that if there are several nested template instantiations within the body of a production rule, that all of these frame pushes will occur when the template expression is created. However, during automata side-effect execution time, not all of those nested instantiations will be necessarily matched, even if the rule as a whole matches. Thus, not all of those frame pushes will occur. This, however, will not destroy any $$$n references because (1) the references only refer to the specific frame of an instantiation, and do not directly refer up the stack, and (2) since a TmplGrammar always has a pre-list (to push its frame) and a post-list (to pop its frame), any nested sub-expression of a "tmpl-do-pattern" (main body of production rule) will match if and only if its side-effects match, implying that if nested instantiations "match/fire", then so will their "parents".

In this example, we see $$$0 variables being used outside of the {xx xx} arrays that define side-effects. This means that on line 37, the $$$0 variable is used "immediately" to build the automata, by using the string "AB" made available by the template frame push on line 33. The "mirror" push, which takes place at "side-effect" execution, is on line 34, and this push is used by the other template frame variable (the second rule parameter)—$$$1—within a side-effect array on line 39. This corresponds with the post increment of the one-up-count parameter in the "do-pattern" of the production rules body (line 2).

From the above discussion, we see the third important difference between a TmplGrammar object and DoGrammar object. But as is said throughout this document, both grammar objects result in structurally the same automata. This is demonstrated as follows. First, the translated output from /algo/simrule.tok is used to create the file /algo/simrule.fth, which outputs the structure of the automata (but changing {xx . . . xx} arrays to include only nops for tracing). This results in the following output.

```
EType.GRAPH
node 1
    arc { } instrs {xx nop7 xx} node 2
    arc { } instrs {xx nop1 xx} node 3
    arc { } instrs {xx nop4 nop1 xx} node 14
```

-continued

```
        exit node 2
        node 3
            arc {1,1,1} '[A]' node 4
        node 4
            arc {1,1,1} '[B]' node 5
        node 5
            arc { } instrs {xx nop2 nop3 nop7 xx} node 2
            arc { } instrs {xx nop2 nop3 nop1 xx} node 6
            arc { } instrs {xx nop2 nop3 nop4 nop1 xx} node 7
        node 6
            arc {1,2,1} '[A]' node 4
        node 7
            arc {1,2,2,1} '[A]' node 8
        node 8
            arc {1,1,2,1} '[B]' node 9
        node 9
            arc { } instrs {xx nop2 nop3 xx} node 10
        node 10
            arc {1,1,2,2} '[C]' node 11
        node 11
            arc { } instrs {xx nop5 nop6 nop7 xx} node 2
            arc { } instrs {xx nop5 nop6 nop1 xx} node 12
            arc { } instrs {xx nop5 nop6 nop4 nop1 xx} node 13
        node 12
            arc {1,2,1} '[A]' node 4
        node 13
            arc {1,2,2,1} '[A]' node 8
        node 14
            arc {1,1,2,1} '[A]' node 8
```

Now rewrite the script (/algo/simrule2.tok) without templates (verifying the correct output) as follows:

```
91   static {
92       Stream is = {{ABCABX}};
93       int countAB = 0;
94       int countABC = 0;
95
96       Pattern AB = do (; "AB"; countAB++);
97       Pattern ABC = do (; AB + 'C'; countABC++);
98
99       tokenize (is) {
100          case * (AB | ABC):
101              ;
102      }
103      system::println("countAB = " + countAB + ", countABC = " + countABC);
104  }
```

When this second version is translated (/algo/simrule2.fth) and its FORTH is used to produce the NFA for this expression, the following graph is produced:

```
        EType.GRAPH
        node 1
            arc { } instrs {xx nop3 xx} node 2
            arc { } null node 3
            arc { } null node 14
        exit node 2
        node 3
            arc {1,1,1} '[A]' node 4
        node 4
            arc {1,1,1} '[B]' node 5
        node 5
            arc { } instrs {xx nop1 nop3 xx} node 2
            arc { } instrs {xx nop1 xx} node 6
            arc { } instrs {xx nop1 xx} node 7
        node 6
            arc {1,2,1} '[A]' node 4
        node 7
            arc {1,2,2,1} '[A]' node 8
```

-continued

```
        node 8
            arc {1,1,2,1} '[B]' node 9
        node 9
            arc { } instrs {xx nop1 xx} node 10
        node 10
            arc {1,1,2,2} '[C]' node 11
        node 11
            arc { } instrs {xx nop2 nop3 xx} node 2
            arc { } instrs {xx nop2 xx} node 12
            arc { } instrs {xx nop2 xx} node 13
        node 12
            arc {1,2,1} '[A]' node 4
        node 13
            arc {1,2,2,1} '[A]' node 8
        node 14
            arc {1,1,2,1} '[A]' node 8
```

Except for the tracing nops, the graphs are the same—node-wise, "eating" arc-wise, and arcnum sequence-wise. Only the instructions differ, which corresponds to the extra overhead in the case of templates of pushing and popping the template frames during "side-effect" time. The fact that the "side-effects" are functionally equivalent is verified in the matching output of the two scripts.

8.5.2 Automata Composition

Automata composition has already been illustrated in the specifications section, in terms of how unary and binary grammars translate to composition graphs. The goal of this section is to illustrate how the novel arcnum sequence scheme solves problems of ambiguity, and guarantees to the programmer the correct selection of instruction side-effects associated with an expression.

The following example (algo/comp1.tok) shows several types of ambiguity being resolved and the composition elements used to resolve the ambiguity and represent the side-effects. Without side-effects, this example shows no improvement over the art. However, the introduction of side-effects requires a novel approach to composition and subset construction, to ensure correct results.

```
1    static {
2        Stream is = {{aabbaaabbbbaa}};
3        int acnt = 0;
4        int bcnt = 0;
5        int wcnt = 0;
6
7        Pattern p2 = 'a' * 2..2 | 'b' * 2..2;   // recognize 2-peat
8        Pattern pa = +do(; 'a'; acnt++);       // recognize 'a'-word
9        Pattern pb = +do(; 'b'; bcnt++);       // recognize 'b'-word
10
11       Pattern p = do(; p2 | pa | pb; wcnt++) * 0
12                       <+
13                       +'a';
14
15       tokenize (is) {
16           case p:
17               ;
18       }
19
20       if (acnt == 3 && bcnt == 4 && wcnt == 4)
21           system::println("test comp1 ok");
22       else
23           system::println("test comp1 failed");
24   }
```

This test script was chosen because it exhibits four types of ambiguity resolution in play—greediness of the entire expression, left-to-right preference of elements of a union, right-to-left preference of elements of a right-to-left concatenation, and preference of inner repeats to outer repeats.

The pattern p2 defined on line 7 recognizes either the string "aa" or the string "bb" without any side-effects. The pattern pa on line 8 recognizes any repeating sequence of 1 or more instances of 'a', and meanwhile accumulates the number of 'a' chars seen into a variable. The pattern pb on line 9 recognizes any repeating sequence of 1 or more instances of 'b', and meanwhile accumulates the number of 'b' chars seen into a variable. The expression on line 11 creates a union of these 3 types of words, increments a word count any type the union "matches", and repeats the union 0 or more times. Lines 12–13 "eat" a trailing sequence of 'a' chars.

The first ambiguity to notice is that if there is a substring of "aa" or "bb", not only can it be matched by p2, but it can also be matched by pa or pb. It does matter because pa and pb contain embedded instructions. In this example, the first 4 chars of the stream are broken as "aa" and "bb" and matched by p2, which has left-to-right union preference over pa and pb. The next 3 chars are "aaa", which intuitively match pa. However, it could also match in 2 repeats of the line 11 repeat, first matching "aa" by p2, then matching "a" by pa. The other aspect of union ambiguity resolution is that when left-to-right union dictates one match, and "local" greediness of the union dictates another, the "local" greediness has precedence. That is, since 3 characters can be recognized at this position of the stream by 1 match of the $2^{nd}$ term union, then this is better than matching 2 characters by the $1^{st}$ term of the union and then 1 more character on another iteration.

The second ambiguity to notice is that when the union prefers pa or pb to match a sequence of 'a' chars or 'b' chars greater than 2, there are several ways this could be done. After each character eaten by pa, the pa repeat-pattern could "break" and then recycle back through the outer repeat, which is designed by the programmer to recognize words. The ambiguity resolution happening here is that inner repeats are made to be as greedy as possible, before allowing outer repeats to control. (In actual fact the engine may try both execution paths (threads), but will prefer any thread which makes inner repeats as greedy as possible.)

The third ambiguity being resolved in this example is that the trailing term on lines 12–13 look for a repeating sequence of 'a' chars. Although it requires at least one 'a' to be eaten, only the right-to-left concatenator of line 12 ensures that all 2 trailing 'a' chars are eaten by line 13. With a default concatenator, pa would eat the first 1 of those 2 trailing 'a' chars, and thus the acnt and wcnt would be 1 greater.

In the console.tok file which triggers execution of all of the examples of this document, we have a line which is commented out, but which if un-commented, results in the translation of the comp1.tok example into FORTH words rather than being translated and executed. The translated output is now shown, although only to the point of the composition of the patterns, and rendering to an automata:

```
25        $0 {{aabbaaabbbbaa}} assign
26        $1 0 assign
27        $2 0 assign
28        $3 0 assign
29        $4 'a' 2 2 .. swap char.Pattern swap p** 'b' 2 2 .. swap
             char.Pattern swap p**
30        p| assign
31        $5
32        {xx
33        xx}
34            'a' char.Pattern
35        {xx
36            $1 dup valueof swap 1 get 1+ assign drop
37        xx} pdo
38        p*1 assign
39        $6
40        {xx
41        xx}
42            'b' char.Pattern
43        {xx
44            $2 dup valueof swap 1 get 1+ assign drop
45        xx} pdo
46        p*1 assign
47        $7
48        {xx
49        xx}
50            $4 valueof $5 valueof p| $6 valueof p|
51        {xx
52            $3 dup valueof swap 1 get 1+ assign drop
53        xx } pdo
54        0 p* 'a' char.Pattern p*1 p<+ assign
55        $$0 $0 valueof assign
56        $8 −1 assign
57        {xx xx}
58            $7 valueof
59        {xx $8 0 assign xx} pdo
60        {xx xx}
61            null
62        {xx $8 1 assign xx} pdo p|
63
64        construct rendernode $$2 swap assign
```

Lines 29–30 (in the FORTH) translate pattern p2 of line 7 (in the script). Lines 31–38 translate pattern pa of line 8. Lines 39–46 translate pattern pb of line 9. Lines 47–54 translate pattern p of line 11–13. And the union-switch of the tokenize statement is translated to FORTH in lines 57–62.

The four patterns described in lines 7–13 of the script resolve to composition graphs as shown below. The above FORTH code is copied to the file /algo/comp1.fth and modified so that it replaces the FORTH instructions representing the counting side-effects of the script as nop1, nop2, nop3, etc. to track these instructions in the resulting NFA composition. The following is the output of /algo/comp1.fth, describing the automata composition:

```
EType.GRAPH
node 1
    arc { } null node 2
    arc { } null node 26
node 2
    arc { } instrs {xx nop5 xx} node 3
node 3
    arc { } null node 4
    arc { } null node 8
    arc { } null node 12
    arc { } null node 18
node 4
    arc {2,1,1} '[a]' node 5
node 5
    arc {2,1,1} '[a]' node 7
node 7
    arc { } null node 24
node 24
    arc { } instrs {xx nop6 xx} node 25
node 25
    arc {2,2} null node 2
    arc { } null node 26
node 26
```

-continued

```
         arc { } null node 28
node 28
         arc {1} '[a]' node 29
node 29
         arc { } null node 28
         arc { } null node 30
exit node 30
node 8
         arc {2,1,1} '[b]' node 9
node 9
         arc {2,1,1} '[b]' node 11
node 11
         arc { } null node 24
node 12
         arc { } null node 13
node 13
         arc { } instrs {xx nop1 xx} node 14
node 14
         arc {2,1,2,1} '[a]' node 15
node 15
         arc { } instrs {xx nop2 xx} node 16
node 16
         arc {2,1,2,2} null node 13
         arc { } null node 17
node 17
         arc { } null node 24
node 18
         arc { } null node 19
node 19
         arc { } instrs {xx nop3 xx} node 20
node 20
         arc {2,1,3,1} '[b]' node 21
node 21
         arc { } instrs {xx nop4 xx} node 22
node 22
         arc {2,1,3,2} null node 19
         arc { } null node 23
node 23
         arc { } null node 24
```

In the above graph, nodes 4–11 represent pattern p2 of the script, nodes 12–17 represent pattern pa of the script, and nodes 18–23 represents pattern pb of the script. The union is represented by nodes 2–3 & 24. The outer repeat for the do-pattern is represented by nodes 1 & 25. The trailing term to eat 'a' chars at the end of the stream is represented by nodes 26–30.

It is useful to discuss a diagram of this NFA composition, illustrated in coherent sub-graphs. The arc label (chars-eaten, instrs-traversed) will be shown above the arc. Null arcs will not have a label above the arc. These elements of a graph have already been seen in the specifications section.

Ambiguity resolution is accomplished with arcnum sequences (shown below the arc in bold font), which are arrays of numbers which, as they read from left to right, describe the outer to inner composition structure of the binary expressions. Note that a unary repeat is really implemented as a binary repeat with a count of either 0 or 1. The highest arcnum element in any of these sequences is 3, and it corresponds with the union of 3 sub-expressions.

These arcnum sequences, sorted in ascending order, are as follows:

{1}—represents the "weight" of character 'a' eaten on the line 13 term;

{2,1,1}—represents the "weight" of all eaten characters in the p3 pattern of 2-peats;

{2,1,2,1}—represents the "weight" of the character 'a' in the pa pattern;

{2,1,2,2}—represents the "weight" of the loopback arc for the unary-1 repeat of in pa;

{2,1,3,1}—represents the "weight" of the character 'b' in the pb pattern;

{2,1,3,2}—represents the "weight" of the loopback arc for the unary-1 repeat of in pb; and {2,2}—represents the outer repeat for the broken word elements of the pattern "p".

Referring to the above arrays, the $1^{st}$ element applies to the outermost binary expression, which is the right-to-left concatenation of line 12. The $2^{nd}$ element is only found in the first term of the concatenation, which breaks down next as a unary-1 repeat. Here 1 applies to everything within the repeat, and 2 applies to the loopback arc. The $3^{rd}$ element applies only to the three elements of the union, which is the next break-down of the unary 1-repeat of line 11. The elements are numbered from 1 to 3. However, note that p3 of line 7 in the script is also a union, so technically the union has 4 elements. These first 2 elements for the 2-peat have no associated instructions, thus, this union is treated as a group, numbered as 1 for the $3^{rd}$ element of the arcnum sequences. Finally, the $4^{th}$ element is for the inner repeats of pa and pb, which is the next break-down level for those sub-patterns of the union. This inner repeat has arcnum values of 1 and 2, 1 for the character "eaten", and 2 for the loopback.

The sub-graphs of this automata are as follows:

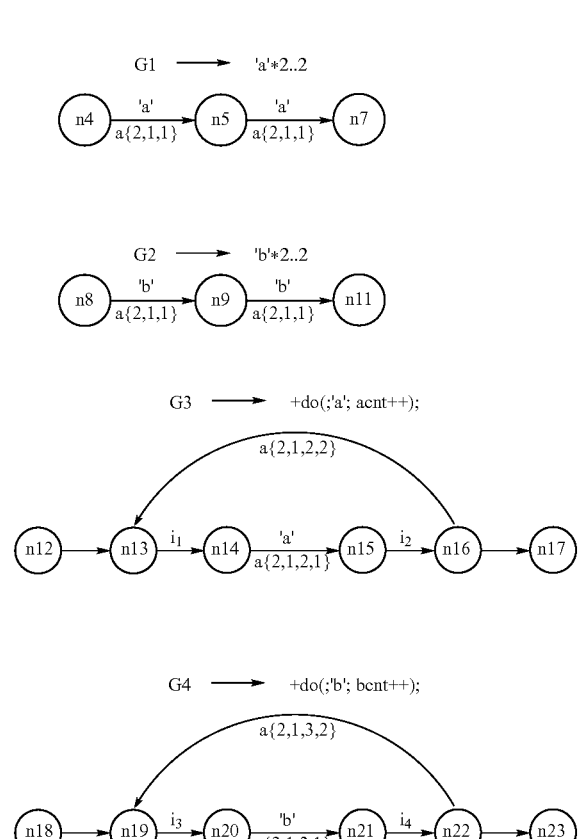

And finally, we show the entire automata, based on the above sub-graphs:

Graph "p"

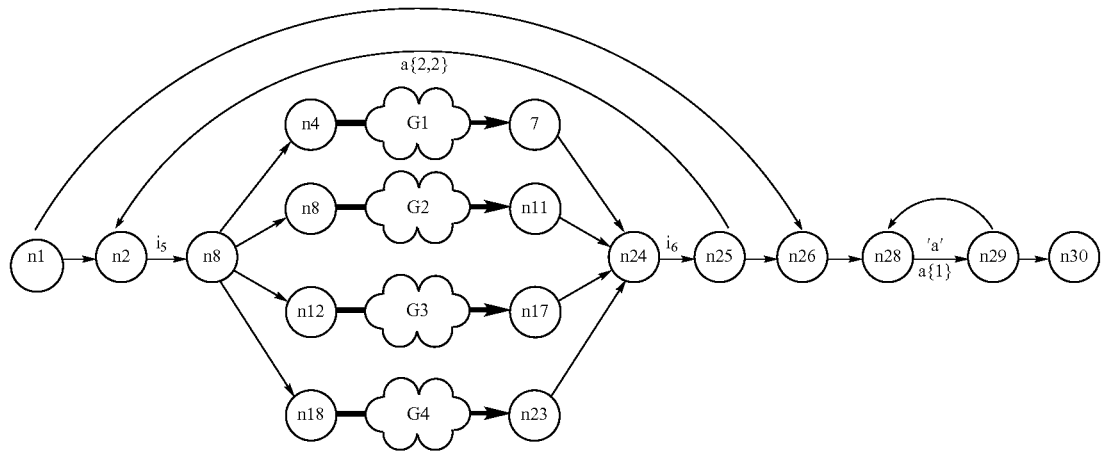

8.5.2.1 Instruction Arcs

Instruction arcs, as in the above graph, do not contribute to character-matching characteristics of any automata thread, and therefore do not affect the accept/reject outcome of any automata. This equivalence is seen in the following simple argument:

Consider an expression E1=Expr(p1, p2, ..., pN) with no do-patterns or instruction arcs.

Consider changing this expression by wrapping p1 through pN with "do-patterns" as follows: E2=Expr(do( ... ; p1; ... ), do( ... ; p2; ... ), ..., do( ... ; pN; ... )).

Compare the graphs for P=do( ... ; p1; ... ) with P=null+p1+null:

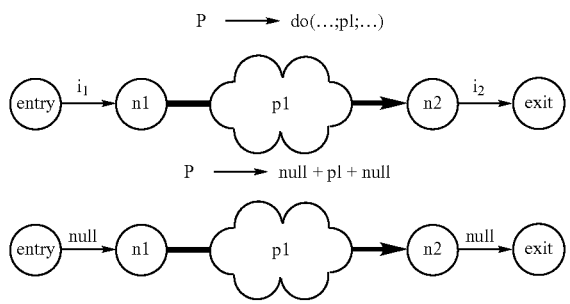

Allow the execution engine to execute E2, but as instruction arcs are traversed, the instructions are not accumulated to the thread states. As seen in Automata.java, lines 326–345, except for this accumulation of instruction opcodes, instruction arcs are treated in the same way as null transitions. Therefore, the $2^{nd}$ graph can replace the $1^{st}$ graph in the composition automata for E2 above, if we are ignoring accumulated instructions, resulting in E2=Expr(null+p1+null, null+p2+null), ..., null+pN+null) which is equivalent to E2=Expr(p1, p2, ... ,pN).

This shows the equivalence of E1 and E2 which implies that instruction-arcs do not change the accept/reject characteristics of an expression, because instruction-arcs are always created through low-level "do-patterns" (whether for actual "do-patterns", capture-patterns, or production rules), and low-level "do-patterns" are modeled by the simple graph above.

The above argument requires one additional point concerning arcnums for ambiguity resolution, which will be discussed in the next section. During automata composition, when sub-expressions are found to contain instructions, the arc sequences assigned to any "eating" arcs are changed relative to what they would be if those instructions stripped. Therefore, E2 will also differ from E1 in terms of thread priority. However, these priorities are only used to select a thread preference between two threads which both reach the accept state and recognize the same number of characters. Therefore, a difference in priorities will not affect the accept/reject outcome of an automata, so the above argument that shows the equivalence of E1 and E2 (when instruction accumulation is ignored) still holds.

The above property of instruction arcs can be referred to as an "invariance" principle. Adding instruction arcs by wrapping sub-expressions in "do-patterns" or capture-patterns does not change the matching characteristics of expressions or sub-expressions. In other words, the programmer knows that regardless of which instruction arcs are added or removed from sub-expressions involved in a tokenize statement, the same number of characters will be read from the input stream.

In the next section, the other "invariance" principle related to instruction arcs and the side-effects selected for the "winning" thread is investigated. This principle ensures that regardless of what additional side-effects are added to sub-expressions, or what side-effects might be removed, the tokenize statement will always select the same "switch-case." This second invariance principle also ensures that adding/removing side-effects does not affect whether or not other side-effects are involved in the "winning" thread.

Another important property of "do-patterns", and their low-level equivalents used to implement "capture-patterns" and instantiated production rules, is the relative accumulation order of instructions. The rules that describe the behavior expected by the programmer for nested "do-patterns" are as follows:

If the "inner" do-pattern is part of the recognition path of any thread that can reach the "accept" state, then the instructions associated with both the "inner" and "outer" do-patterns will be accumulated to that thread.

The relative order of the instructions is: (1) pre-list instructions for the "outer", (2) pre-list instructions for the "inner", (3) post-list instructions for the "inner", (4) post-list instructions for the "outer".

These properties are ensured the way that a do-pattern is modeled with an automata composition. Consider the following graph for a Pattern P=do( . . . ; p1; . . . ):

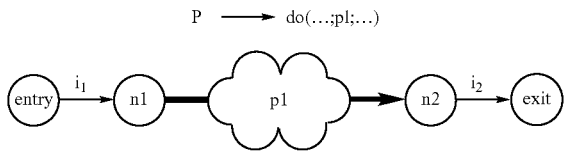

If P is a sub-expression within a larger pattern, and P is matched along an accept path, this can only happen if some automata thread makes a traversal from the node marked entry to the node marked exit in the above graph. This in turn guarantees traversal of arcs $i_1$ and $i_2$ in that order, although other instruction arcs associated with the nested p1 can be traversed between $i_1$ and $i_2$. If p1 contains a nested do-pattern p2, with instructions $i_3$ and $i_4$, we see in this graph that if $i_3$ and $i_4$ are accumulated, this happens during the traversal of p1, which comes after node n1 is reached, and before node n2 is reached, thus guaranteeing the nesting of the instructions associated with "inner" and "outer" pre- and post-lists described above. Although the traversal of $i_1$ and $i_2$ in the "outer" pattern P does not guarantee a traversal of a nested p2, with instructions $i_3$ and $i_4$, nor even does it limit the "inner" traversal to one iteration, the opposite is true. If there is an inner do-pattern p2, with instructions $i_3$ and $i_4$, that are traversed by some thread, and that thread does reach the accept state, then it must also have traversed $i_1$ and $i_2$ in the correct order, because the only way to reach the accept state from an inner pattern p2 of p1 in the graph above is through the node n2 followed by the arc $i_2$.

The following example (/algo/siminstr.tok) shows nested do-patterns:

```
Pattern p = do (,,,;           // pre-list i1 for outer (just some nops)
    'A' +
    'B' +
    do (,,,;                   // pre-list i3 for inner
        'C';
    ,,,);                      // post-list i4 for inner
,,,);                          // post-list i2 for outer
```

This pattern recognizes the string "ABC", and the traversal path enforces the instruction arc ordering of {i1, i3, i4, i2}. To demonstrate this, output the FORTH of this script, extract the snippet pertaining to the above do-pattern, replace the nops generated with nop1 & nop2 for the pre- and post-of the outer, nop3 & nop4 for the pre- and post-of the inner, and then put in the FORTH to print the composition, in the file /algo/siminstr.fth.

```
EType.GRAPH
node 1
    arc { } instrs {xx nop1 xx} node 2
node 2
    arc {1} '[A]' node 3
node 3
    arc {1} '[B]' node 4
node 4
    arc { } instrs {xx nop3 xx} node 6
node 6
    arc {2} '[C]' node 7
node 7
    arc { } instrs {xx nop4 xx} node 8
node 8
    arc { } instrs {xx nop2 xx} node 9
exit node 9
```

It is not necessary to draw this graph, because there are no "loops". Each node is connected to the next by a single arc. The only way to traverse entry to exit will traverse the instruction arcs i1, i3, i4, i2 in that order.

8.5.2.2 Arc Numbering

Relative to the art, proper selection of a "winning" thread is more critical, because of the introduction of instruction arcs. For any given input string that can lead to acceptance by multiple threads traversing and accumulating different instructions, a choice must be made as to the selection of the "winning" thread, because at most one set of side-effects should be executed as the result of automata acceptance. Consider the following script (/algo/amb1.tok):

```
1   static {
2       Stream is = {{        Trim the lead/ trail spaces.       }};
3       String cap;
4
5       tokenize (is) {
6           case *' ' >+ &cap (*any) <+ *' ':
7               ;
8       }
9       if (equals(cap, "Trim the lead/trail spaces."))
10          system::println("test amb1 ok");
11      else
12          system::println("test amb1 failed");
13  }
```

The programmer intent of the line 6 expression is to both capture and match *any against the input stream. The programmer has also put expressions that match white-space before and after *any. We see that although there is one thread which matches by trimming the leading and trailing white-space (which is what the programmer intends by use of left-to-right and right-to-left concatenators), there are various other threads that accept/recognize the entire stream of this example (line 2) but include some or all of the white-space at either end within the match to *any.

There is only one variable to capture into in the expression on line 6, so even if we were to execute all of the side-effects for all unique threads sequentially, only one of the threads would ultimately affect the value of the capture variable. This example shows that from the standpoint of the programmer, only one thread should be selected as the "winner", whose side-effects are executed. We will come back to this example and show how the "winner" selected by the arc numbering scheme of this invention corresponds to the outcome desired by the programmer.

8.5.2.2.1 Ambiguity Sources

In the art, when an expression can match from the current cursor of the input stream to various positions "downstream", the "greedy" algorithm is used, which prefers a thread matching more total characters to a thread matching fewer characters. This choice is also made in the engine of this invention, but does not resolve the types of ambiguities which could result by the introduction of "do-patterns" and their compiled instruction arcs. As seen in the opening example of this section above, the algorithms of this invention must also select a "winning" thread from all threads "eating" the same number of characters. The ambiguity resolution rules involved in selecting from multiple threads that recognize the same number of characters but produce different sets of side-effects is as follows:

When a union of sub-expressions can match the same characters, the sub-expressions are prioritized from left-to-right (or top-to-bottom) in the union, so that the first sub-expression of the union that can match wins.

When a left-to-right concatenation of two sub-expressions can match the same N characters in different ways, the thread which matches the most characters in the $1^{st}$ sub-expression wins.

When a right-to-left concatenation of two sub-expressions can match the same N characters in different ways, the thread which matches the most characters in the $2^{nd}$ sub-expression wins.

When a repeating sequence of 0 or more occurrences of a given sub-expression can match the same total N characters in different ways (varying number of total occurrences and varying number of characters per occurrence), the selection proceeds as follows:

compare all threads across the $1^{st}$ occurrence, and consider only those threads which match the maximum number of characters on the $1^{st}$ occurrence;

from those remaining threads that tied for the max on the $1^{st}$ occurrence, consider only those threads which match the maximum number of characters on the $2^{nd}$ occurrence;

repeat the above step for each occurrence in order until all of the characters of the total match for the repeating sub-expression are covered.

Repeating sequences of N or more occurrences of a sub-expression are treated (from the programmer's standpoint) as a repeating sequence of 0 or more occurrences, except that any (conceptual) threads that recognize fewer than N occurrences are disqualified.

Repeating sequences of N1 to N2 occurrences of a sub-expression are treated (from the programmer's standpoint) as a repeating sequence of 0 or more occurrences, except that any (conceptual) threads that recognize fewer than N1 occurrences and any (conceptual) threads that recognize more than N2 occurrences are are disqualified.

When any of the above selection rules still produce multiple threads matching the same number of characters, but correspond with expressions that are themselves compositions of sub-expressions, then reapply the rules at the next deeper level of composition.

When all of the rules above have been applied as deeply as possible for comparing two threads, then those threads can be assumed to have exactly the same (or no) side-effects.

These rules, when effectively implemented by the engine of this invention, result in the correct execution of all of the examples of this document, and the additional difficult examples of this section, and correspond with the following programmer expectations:

Left-to-right concatenator operators (the default + and the >+ operator) make the $1^{st}$ term "greedier" than the $2^{nd}$ term.

The right-to-left concatenator operator (the <+ operator) makes the $2^{nd}$ term "greedier" than the $1^{st}$ term.

Elements of a union that match the same number of characters are preferred from left-to-right, as if the programmer had used cascading butnot subjunctives to prevent the $2^{nd}$ term from also matching the $1^{st}$ term, to prevent the $3^{rd}$ term from also matching the $1^{st}$ and $2^{nd}$ terms, and so on. The separate cases of a tokenize-switch statement are preferred in the same way from top to bottom, because they are internally based on union of the expressions for each case.

Repeating patterns, such as p*N or p*N1..N2, will match as much as possible in each new occurrence. Implied in this is that an inner (nested) repeat will match as much as possible before allowing an outer repeat to "iterate".

When a term has no embedded instructions at all, then different threads that match this term in different ways, but match all other portions of a composition the same way, are equivalent.

Adding or removing instructions from one term will not affect the presence or absence in the "winning" thread of "side-effect" instructions in any of the other terms.

The next section illustrates how the arc numbering schema of this invention, in conjunction with certain other transformations, produces the behaviors specified above.

8.5.2.2.2 Sequences of Arcnum Sequences

It was discovered during implementation of this invention that assigning simple ordinal integers to the various arcs of an automata is not sufficient to yield the above ambiguity resolution properties expected by the programmer. These properties imply a hierarchy of priorities that corresponds to the expression composition tree, and as a result arc priorities must be sequences of integers (or the equivalent). These hierarchical arcnum sequences are displayed in this document as arrays such as $\{1,3,1\}$ and $\{1,2,1,2\}$, with the property that any two arc sequences have a comparison order similar in nature to the comparison order of Strings. For example, $$\{1\}<\{1,1\}<\{1,2\}<\{1,2,1\}<\{1,2,2,1\}<\{2\}$$

When two threads are compared for selecting the "better" thread, the engine must therefore compare sequences of these sequences. The position of the "mismatch" of two arcnum sequences is also considered in the selection so that:

Thread 1->{1,2} {1,2} {1,2}.

is better than

Thread 2->{1,1} {1,1} {2}.

This is true because even though Thread 2 is "better" after the first 2 terms (corresponding to the first 2 characters), the third sequence/term makes Thread 1 "better" at a higher level of composition. This anomaly is a by-product of the ambiguity resolution requirements, and relates to the fact that simple ordinal priorities cannot produce the ambiguity resolution characteristics required.

If we have the following inequality between sequences of arcnum sequences: if,

Seq(Thread 1, at character N1)<Seq(Thread 2, at character N1), it cannot be concluded that for N2>N1, Seq(Thread 1, at character N2)<Seq(Thread 2, at character N2)

This anomaly complicates the demonstration of the validity of subset construction.

8.5.2.2.3 Literals

The literal grammars of this invention are represented by the CharGrammar.java, CharClassGrammar.java, AnyGrammar.java, and StringGrammar.java composition classes. These compositions assign the "current" arcnum sequence at that composition depth and breadth to the "eating" arcs that they generate. The binary compositions that follow control the "current" arcnum sequence that is in effect during composition, so that these literals can output the correct arcnum sequence to each "eating" arc.

8.5.2.2.4 Concatenation

The following example script (shows how concatenation operators affect arcnum sequences and affect ambiguity resolution.

```
1     static {
2         Stream is = {{abcde}};
3         Pattern p1 = "a"        | "ab";
4         Pattern p2 = "bcd"      | "c";
5         Pattern p3 = "e"        | "de";
6
7         String cap1, cap2, cap3;
8         boolean ok = true;
9
10        tokenize (is) {
11
12            case (&cap1(p1)    <+ &cap2 (p2))
13                               <+ &cap3 (p3):
14
15                if (equals(cap1, "ab") &&
                      equals(cap2, "c") && equals (cap3,
          "de"))
16                    { }
17                else
18                    ok = false;
19        }
20
21        if (ok)
22            system::println("test amb3a ok");
23        else
24            system::println("test amb3a failed");
25    }
```

In the above example, the expression being tokenized is essentially (p1<+p2)<+p3, except that the match to each term is also captured into cap1, cap2, and cap3. There are 2 ways that the input stream can be matched by the 3 terms:

Thread 1->"ab" followed by "c" followed by "de"

Thread 2->"a" followed by "bcd" followed by "e"

This follows from the fact that each of the three terms p1 through p3 is itself a union. Thread 1 will use the $1^{st}$ term of each union to form its concatenation, and thread 2 will use the $2^{nd}$ term of each union. The example correctly creates the arcnum sequences (for each Thread) that ensure that Thread 1 "wins", a result implied by the fact that the right-to-left concatenator on line 13 has the effect of making the line 13 term "greedier" than the line 12 term. Since line 13 can only match "de" or "e", thread 1 must "win".

To see how this happens, the FORTH which this script translates to is shown in part as:

```
26    $0 {{abcde}} assign
27    $1 "a" "ab" String.Pattern swap String.Pattern swap p| assign
28    $2 "bcd" "c" String.Pattern swap String.Pattern swap p| assign
29    $3 "e" "de" String.Pattern swap String.Pattern swap p| assign
30    $4 null assign
31    $5 null assign
32    $6 null assign
33    $7 true assign
34    $$0 $0 valueof assign
35    $8 −1 assign
36    {xx xx}
37        {xx $4 $$0 valueof capture xx>
38            $1 valueof
39        {xx capture streamstring assign xx} pdo
40        {xx $5 $$0 valueof capture xx}
41            $2 valueof
42        {xx capture streamstring assign xx} pdo
43        p<+
44        {xx $6 $$0 valueof capture xx}
45            $3 valueof
46        {xx capture streamstring assign xx} pdo
47        p<+
48        {xx $8 0 assign xx} pdo
49    {xx xx }
50    null
51    {xx $8 1 assign xx} pdo p|
52
53    construct rendernode $$2 swap assign
```

This FORTH is modified by using nop1 and nop2 to trace lines 37 and 39 respectively, corresponding to the expression &cap1(p1) of line 12 of the script. Similarly, nop3 and nop4 are used to trace lines 40 and 42, corresponding to &cap2 (p2) of the script. And, nop5 and nop6 are used to trace lines 44 and 46, corresponding to &cap3(p3) of the script. This modified FORTH (/algo/amb3a.fth) is used to print the automata composition for lines 12–13 of the script, as follows:

```
54    EType.GRAPH
55    node 1
56        arc { } instrs {xx nop1 xx} node 2
57    node 2
```

```
58              arc { } null node 3
59              arc { } null node 5
60          node 3
61              arc {2,2} '[a]' node 4
62          node 4
63              arc { } null node 8
64          node 8
65              arc { } instrs {xx nop2 xx} node 9
66          node 9
67              arc { } instrs {xx nop3 xx} node 11
68          node 11
69              arc { } null node 12
70              arc { } null node 16
```

```
94              arc {1} '[d]' node 25
95          node 25
96              arc {1} '[e]' node 26
97          node 26
98              arc { } null node 27
99          node 16
100             arc {2,1} '[c]' node 17
101         node 17
102             arc { } null node 18
103         node 5
104             arc {2,2} '[a]' node 6
105         node 6
106             arc {2,2} '[b]' node 7
107         node 7
108             arc { } null node 8
```

This graph is illustrated broken into sub-graphs as follows:

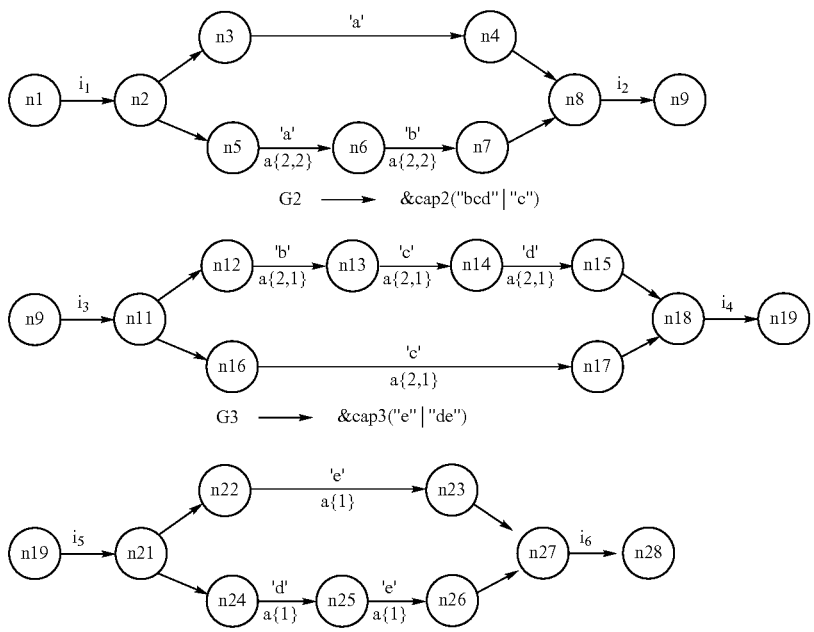

As seen in these graphs, the arcnum sequences of G3, the third term of the concatenation, are all {1}. Since G3 represents the higher priority "right-term" of the concatenation (G1<+G2)<+G3, it is given a first arcnum of 1, and though G3 is further broken into a union, there are no instructions in the union, so there is no further need to differentiate the "eating" arcs of G3.

The arcnum sequences of G2, the $2^{nd}$ term of the concatenation, are all {2,1}. The 2 reflects the fact that arcs in G2 belong to (G1<+G2) which is the lessor priority term of (G1<+G2)<+G3, and the second arcnum of 1 reflects that, with in G1<+G2, G2 is the higher priority term of another right-to-left concatenation. Although within G2 there is a union, none of the elements of this union have instruction arcs, so there is no further need to differentiate the "eating" arcs of G2.

The arcnum sequences of G1, the $1^{st}$ term of the concatenation, are all {2,2}. The first arcnum 2 reflects the fact that arcs in G1 belong to (G1<+G2) which is the lesser priority term of (G1<+G2)<+G3, and the second arcnum of 2 reflects that, within G1<+G2, G1 is the lesser priority term of another right-to-left concatenation. Although within G1

```
-continued
71          node 12
72              arc {2,1} '[b]' node 13
73          node 13
74              arc {2,1} '[c]' node 14
75          node 14
76              arc {2,1} '[d]' node 15
77          node 15
78              arc { } null node 18
79          node 18
80              arc { } instrs {xx nop4 xx} node 19
81          node 19
82              arc { } instrs {xx nop5 xx} node 21
83          node 21
84              arc { } null node 22
85              arc { } null node 24
86          node 22
87              arc {1} '[e]' node 23
88          node 23
89              arc { } null node 27
90          node 27
91              arc { } instrs {xx nop6 xx} node 28
92          exit node 28
93          node 24
``` there is a union, none of the elements of this union have instruction arcs, so there is no further need to differentiate the "eating" arcs of G1.

In terms of the 2 threads which can both accept the input stream in its entirety, we have the following sequences of arcnum sequences (as well as instructions) for each thread:

| Thread 1 -> | i1{2,2}i2 | i3{2,1} | {2,1} | {2,1}i4 | i5{1}i6 |
|---|---|---|---|---|---|
| Thread 2 -> | i1{2,2} | {2,2}i2 | i3{2,1}i4 | i5{1} | {1}i6 |

Although the first thread is winning after character 2, the second thread is winning after character 4. Since the second thread's difference is at a higher composition level, even though its difference comes later, this is the thread which finally "wins". (The general rule is that the first, best difference determines the win.) This thread is also most "greedy" in the last term of (G1<+G2)<+G3, showing that the arcnum scheme does establish one of the concatenation "greedy" principles discussed in section 8.5.2.2.1. Since the first level of composition is sufficient to determine a "winner", we can rewrite this thread breakdown as follows, referring to G1<+G2 as G12:

| Thread 1 -> | G12 | G12 | G12 | G12 | G3 |
|---|---|---|---|---|---|
| Thread 2 -> | G12 | G12 | G12 | G3 | G3 |

This breakdown shows that the second term starts "recognizing" characters against G3 earlier, and since G3 has better priority than G12, the second thread "wins" on the basis of the highest level decomposition of the entire expression, and ignores the early advantage at a deeper composition of the first thread. If simple ordinal priorities were used, the first thread would "win" instead, since G2, which has better priority than G1, would be winning after the second character. The multiple priority levels ensure that the entire sequence of priorities is compared until the end is reached, or until there is a mismatch at decomposition level 1. This corresponds to the semantic meaning expected by the programmer.

To illustrate the importance of having the arcnum priorities breakdown the entire composition level-by-level, we now extend the above example, using both right-to-left and left-to-right priorities, and changing the parenthetical grouping from the first two terms to the last two terms in each case. In the following example (/algo/amb3.tok), line 13 shows that the first two terms are grouped and all the operators are left-to-right. In this case, p1>+p2 is "greedier" than p3, so the thread which selects the first element of each union wins for the line 12 tokenize statement. On line 23, the operators are all right-to-left, but the grouping is for the second two terms. Therefore, because p2<+p3 is "greedier" than p1, the same thread, selecting the first element of each union wins for the line 21 tokenize statement. In both cases, the term "bbccddee" of the p2 union controls the "winning" thread.

In the last two tokenize statements, the thread which selects the second term of the union wins. In the third sub-example, this happens because the concatenators are right-to-left, and the grouping is for the first two terms versus the third term. And the third term has a choice of "ff" and "eeff", so "eeff" is selected. In the final sub-example, the same result occurs, but this time because the concatenators are left-to-right, the grouping separates p1 from (p2>+p3), and "aabb" is greedier than "aa". In all of these cases, the selection of the winning thread occurs through a mismatch at the highest level of decomposition. Since there are only 2 possible threads for this example, the second level of decomposition does not contribute to thread differentiation, which means that within the parenthetical groupings, we could switch the concatenators without effect (from right-to-left to left-to-right and vice versa). However, more complex examples could be constructed where both levels of decomposition (term grouping) were involved in selecting the appropriate "winning" thread.

```
1   static {
2       Stream is;
3       Pattern p1 = "aa" | "aabb";
4       Pattern p2 = "bbccddee" | "ccdd";
5       Pattern p3 = "ff" | "eeff";
6
7       String cap1, cap2, cap3;
8       boolean ok = true;
9
10      // p1 + p2 greedier than p3 -- ltr
11      is = {{aabbccddeeff}};
12      tokenize (is) {
13          case (&cap1(p1) >+ &cap2(p2)) >+ &cap3(p3):
14              if (equals(cap1, "aa") && equals(cap2,
                           "bbccddee") &&
            equals(cap3, "ff"))
15                  { }
16              else
17                  ok = false;
18      }
19
20      // p2 + p3 greedier than p1 -- rtl
21      is = {{aabbccddeeff}};
22      tokenize (is) {
23          case &cap1(p1) <+ (&cap2(p2) <+ &cap3(p3)):
24              if (equals(cap1, "aa") && equals(cap2,
                           "bbccddee") &&
            equals(cap3, "ff"))
25                  { }
26              else
27                  ok = false;
28      }
29
30      // p3 greedier than p1 + p2 -- rtl
31      is = {{aabbccddeeff}};
32      tokenize (is) {
33          case (&cap1(p1) <+ &cap2(p2)) <+ &cap3(p3):
34              if (equals(cap1, "aabb") && equals(cap2,
                           "ccdd") && equals(cap3,
            "eeff"))
35                  { }
36              else
37                  ok = false;
38      }
39
40      //p1 greedier than p2 + p3 -- ltr
41      is = {{aabbccddeeff}};
42      tokenize (is) {
43          case &cap1(p1) >+ (&cap2(p2) >+ &cap3(p3)):
44              if (equals(cap1, "aabb") && equals(cap2,
                           "ccdd") && equals(cap3,
            "eeff"))
45                  { }
46              else
47                  ok = false;
48      }
49
50      if (ok)
51          system::println("test amb3 ok");
52      else
53          system::println("test amb3 failed");
54  }
```

8.5.2.2.5 Union

Unlike concatenation, which requires a separate level for each pair-wise binary operator, unions of more than 2 elements do not require pair-wise decomposition. Therefore, when unions of unions are detected in the constructor of UnionGrammar.java, a single union of all terms is created, making sure to preserve the correct order of individual terms. The following patterns are therefore defined to be equivalent in terms of matching behavior, for any sub-expressions p1, p2, and p3:

```
Pattern u1 = (p1 | p2) | p3;
Pattern u2 =  p1 | (p2 | p3);
```

If there are threads which match the same number of terms with all 3 subexpressions p1, p2, and p3, but are otherwise equivalent for all other characters in the entire match, the portions of the sequences of arcnum sequences corresponding to Thread 1 matching p1, Thread 2 matching p2, and Thread 3 matching p3 must compare as follows:

Sequence (Thread 1)<Sequence (Thread 2)<Sequence (Thread 3)

For union "u1", using an approach which respects the grouping when generating sequences, all of the character matches against p1 would be of form {1,1, . . . }, all of the characters matching p2 would have sequences of form {1,2, . . . } and all of the sequences matching p3 would be of form {2. . . }. This would satisfy the above ordering.

Similarly, for union "u2", using an approach which respects the grouping when generating sequences, all of the character matches against p1 would be of form {1, . . . }, all of the characters matching p2 would have sequences of form {2,1, . . . } and all of the sequences matching p3 would be of form {2,2, . . . }. This would also satisfy the above ordering.

However, this invention simplifies the sequence number generating by flattening the union, so that all of the character matches against p1 would be of form {1, . . . }, all of the characters matching p2 would have sequences of form {2, . . . } and all of the sequences matching p3 would be of form {3, . . . }. This also satisfies the above ordering.

This is possible in a union but not a concatenation because in a union, all of the matches for the union can only come from one of the branches, so that if comparing threads which can match the same number of characters from 2 branches of the union, the arcnum sequences for the "better" branch are better for every single position of the match.

An optimization is employed when generating arcnum sequences of elements of a union, as seen in UnionGrammar.java, lines 50–75. When adjacent elements of a union contain no instructions, then there is no need to differentiate the arcnum sequences of the adjacent elements.

Consider the following union, where p1 contains instructions, p2 and p3 and p4 do not contain instructions, and p5 contains instructions:

Pattern u=p1|p2|p3|p4|p5;

The numbering described above would produce arcnum sequences of form {1, . . . } for "eating" arcs of p1, {2, . . . } for "eating" arcs of p2, {3, . . . } for "eating" arcs of p3, {4, . . . } for "eating" arcs of p4, and {5, . . . } for "eating" arcs of p5, and would produce the desired prioritization between elements of a union. However, since p2, p3, and p4 contain no instructions, there is no need to differentiate the elements within those unions, and a better approach (in that fewer threads are likely to result after subset construction) produces the same result for the programmer:

```
elements of p1 -> {1,...}    // ... reflects further decompostion
                             since p1 contains instrs
elements of p2 -> {2}
elements of p3 -> {2}
elements of p4 -> {2}
elements of p5 -> {3,...}    // ... reflects further decompostion
                             since p1 contains instrs
```

No ellipses are shown for p2 through p4 because no further differentiation is needed since p2 through p4 contain no instructions.

8.5.2.2.6 Repeats

Repeated patterns of the form p * N where p is a pattern containing instructions and N is an integer, also impact the generation of arcnum sequences. It is not sufficient to simply give the "eating" arcs within the terms of pattern p the arcnum sequences generated by the decomposition of p. The requirement has been stated that each iteration of the repeat must be as "greedy" as possible. Consider the following example (/algo/amb5.tok):

```
1     static {
2         Stream is = {{ababab}};
3
4         int cnt1, cnt2, cnt3;
5         cnt1 = cnt2 = cnt3 = 0;
6
7         Pattern p1 = do (; "a"; cnt1++);
8         Pattern p2 = do (; "b"; cnt2++);
9         Pattern p3 = do (; "ab"; cnt3++);
10
11        tokenize (is) {
12            case * (p1 | p2 | p3):
13                ;
14        }
15
16        if (cnt1 == 0 && cnt2 == 0 && cnt3 == 3)
17            system::println("test amb5 ok");
18        else
19            system::println("test amb5 failed");
20    }
```

The repeating pattern in line 12 is seen as having 2 viable threads that can eat all of the characters of the stream. Thread 1 employs both patterns p1 and p2 for the match, and matches as p1, p2, p1, p2, p1, p2 breaking the stream as "a", "b", "a", "b", "a", "b". The side-effects generated by this thread would cause cnt1 and cnt2 to each finish at the value 3, corresponding to the fact that p1 and p2 are each matched 3 times in this thread. Thread 2 employs only pattern p3 for the match, matching as p3, p3, p3, and breaking the stream as "ab", "ab", "ab". This thread has a side-effect of causing cnt3 to finish with the value 3, and is in fact, as the example shows, the thread which is selected. One way of viewing ambiguity resolution here is that the arcnum sequences of p1 are better than those of p2 which are better than those of p3, so that Thread 1 which only uses p1 and p2 for the match would be better than Thread 2. This would be the case if union and concatenation were the only factors involved in arc-numbering. However, the grammar of this invention also specifies that repeating sequences must be as "greedy" as possible in matching on each iteration, if two comparable threads can both match the same subsequence. Because the repeat operator of line 12 is at a higher level of composition than any of the union operators, its effect on the arcnum sequences should be more important than the effect of the unions, and therefore, Thread 2, must be made to "win".

Without consideration of the repeat composition, the arcnum sequences for p1's "eating" characters are all {1}, the arcnum sequences for p2's "eating" characters are all {2}, and the arcnum sequences for p3's "eating" characters are all {3}, based on the previous description of how union's affect arcnum sequences. Therefore, we have sequences for each thread as:

```
Thread 1 -> {1} {2} {1} {2} {1} {2}
Thread 2 -> {3} {3} {3} {3} {3} {3}
```

And this shows an incorrect result, since we want to prefer thread 2, to make each iteration of a repeat as greedy as possible. In fact, what the Automata Composition Engine does is to create a sequence level of 1 for the elements of the repeat, and a sequence level of 2 for the "loop-back" null arc of the repeat. This seems to violate the principle that only "eating" arcs have arcnum sequences. However, the subset construction algorithm remembers any loop-back null arcs that have been assigned an arcnum sequence, and the first character within the repeat that is encountered, is "over-stamped" with the loopback sequence, effectively lowering its priority.

The composition graph corresponding to this script therefore assigns sequences of {1,1} to elements of p1, {1,2} to elements of p2, and {1,3} to elements of p3. The 1 in {1,3} for p3 elements refers to the fact that it is part of a repeating composition at the highest level of decomposition, and the 3 refers to the fact that it is the third element of a union. The composition graph also assigns a "over-stamping" sequence of {2} to the loopback null arc. When this composition graph is subset-constructed, all of the loop-back arcs will be integrated into actual "eating" transitions, so that a transition from the end of p3 to the beginning of another p3 will actually have a sequence {2,3} rather than {1,3}. In terms of the thread sequences now generated, we have:

```
Thread 1 -> {1,1} {2,2} {2,1} {2,2} {2,1} {2,2}
Thread 2 -> {1,3} {1,3} {2,3} {1,3} {2,3} {1,3}
```

In the sequences for both threads, the $2^{nd}$ position values are the same as what we showed before, and correspond to the positions within the union. However, the $1^{st}$ position values are a 1 when that arc can be eaten without "looping" from the end to the beginning of the repeat composition, and 2 when looping-back is required. In Thread 1, only the first character is "eatable" without a loopback. In Thread 2, the $1^{st}$ loopback is at the $3^{rd}$ character, corresponding to the beginning (the character 'a') of the second occurrence of "ab" matched by pattern p3.

In this case, Thread 2 is now the "winner", because there is a difference at level 1 of the arcnum sequences, and that difference prefers Thread 2 at the second character of the stream. This is explained in that Thread 2 does not require a "loopback" until the $3^{rd}$ character of the stream, whereas Thread 1 requires a "loopback" at the $2^{nd}$ character of the stream. Since the repeat composition is at a "higher" level than the union composition, a difference in when "loopback" is detected has more significant priority than the portions of the arcnum sequences generated by the union.

It is useful to look at both the composition graph and the construction graph for this example. The FORTH corresponding to the script is generated, and the side-effect for p1 is traced as nop1, the side-effect for p2 is traced as nop2, and the side-effect for p3 is traced as nop3, and this modified FORTH (/algo/amb5.fth) is used to output each graph. The composition graph is as follows:

```
21      EType.GRAPH
22      node 1
23          arc { } null node 2
24          arc { } null node 17
25      node 2
26          arc { } null node 3
27          arc { } null node 7
28          arc { } null node 11
29      node 3
30          arc { } null node 4
31      node 4
32          arc {1,1} '[a]' node 5
33      node 5
34          arc { } instrs {xx nop1 xx} node 6
35      node 6
36          arc { } null node 16
37      node 1 6
38          arc {2} null node 2
39          arc { } null node 17
40      exit: node 17
41      node 7
42          arc { } null node 8
43      node 8
44          arc {1,2} '[b]' node 9
45      node 9
46          arc { } instrs {xx nop2 xx} node 10
47      node 10
48          arc { } null node 16
49      node 11
50          arc { } null node 12
51      node 12
52          arc {1,3} '[a]' node 13
53      node 13
54          arc {1,3} '[b]' node 14
55      node 14
56          arc { } instrs {xx nop3 xx} node 15
57      node 15
58          arc { } null node 16
```

The composition graph reveals the structure described above. Note on line 38 that the "overstamping" loopback sequence is {2} as claimed, and the sequences for eating characters of p1 is {1,1} as seen on line 32, with the tracing instruction nop1 following on line 34, the sequences for eating characters of p2 are {1,2} as seen on line 44, with the tracing instruction nop2 following on line 46, and the sequences for eating characters of p3 are {1,3} as seen on lines 52 and 54, with the tracing instruction nop3 following on line 56.

The construction graph is as follows:

```
59      EType.GRAPH
60      node 1
61          arc { } null node 2
62          arc {1,2} '[b]' node 3
63          arc { } null node 16
64          arc { } null node 17
65      exit node 2
66      node 3
67          arc { } instrs {xx nop2 xx} node 2
68          arc { } instrs {xx nop2 xx} node 4
```

| | | |
|---|---|---|
| 69 | arc { } instrs {xx nop2 xx} node 5 | |
| 70 | arc { } instrs {xx nop2 xx} node 15 | |
| 71 | node 4 | |
| 72 | arc {2,2} '[b]' node 3 | |
| 73 | node 5 | |
| 74 | arc {2,1} '[a]' node 6 | |
| 75 | node 6 | |
| 76 | arc { } instrs {xx nop1 xx} node 2 | |
| 77 | arc { } instrs {xx nop1 xx} node 7 | |
| 78 | arc { } instrs {xx nop1 xx} node 8 | |
| 79 | arc { } instrs {xx nop1 xx} node 9 | |
| 80 | node 7 | |
| 81 | arc {2,2} '[b]' node 3 | |
| 82 | node 8 | |
| 83 | arc {2,1} '[a]' node 6 | |
| 84 | node 9 | |
| 85 | arc {2,3} '[a]' node 10 | |
| 86 | node 10 | |
| 87 | arc {1,3} '[b]' node 11 | |
| 88 | node 11 | |
| 89 | arc { } instrs (xx nop3 xx} node 2 | |
| 90 | arc { } instrs {xx nop3 xx} node 12 | |
| 91 | arc { } instrs {xx nop3 xx} node 13 | |
| 92 | arc { } instrs {xx nop3 xx} node 14 | |
| 93 | node 12 | |
| 94 | arc {2,2} '[b]' node 3 | |
| 95 | node 13 | |
| 96 | arc {2,1} '[a]' node 6 | |
| 97 | node 14 | |
| 98 | arc {2,3} '[a]' node 10 | |
| 99 | node 15 | |
| 100 | arc {2,3} '[a]' node 10 | |
| 101 | node 16 | |
| 102 | arc {1,1} '[a]' node 6 | |
| 103 | node 17 | |
| 104 | arc {1,3} '[a]' node 10 | |

The construction graph, as expected, is more difficult to follow. However, note that the "loopback" arcnum sequence has been used to over-stamp the "eating" sequences depending on whether or not the transition into p1, p2, or p3 was from a loopback. As a result, we see all types of sequences—{1,1} and {2,1} for p1 "eats", {1,2} and {2,2} for p2 "eats", and {1,3} and {2,3} for p3 "eats". An interesting outcome of this construction is that there are actually additional threads to consider, in that a thread which starts by "eating" the first 2 characters via p3, can then switch back to using p1 and p2 to "eat", and similarly a thread which uses p1 and p2 to "eat" an "ab" can then switch to p3 for future iterations of the repeat. So in fact, all of the unique threads which could be considered (outside of runtime pruning) can be listed as follows in order of priority based on the arcnum sequences (and showing each element in terms of which p1, p2 or p3 was used to "eat" that character).

| | |
|---|---|
| Thread 1 -> p3 p3 p3 p3 p3 p3 | based on {1, 3} {1, 3} {2, 3} {1, 3} {2, 3} {1, 3} |
| Thread 2 -> p3 p3 p3 p3 p1 p2 | based on {1, 3} {1, 3} {2, 3} {1, 3} {2, 1} {2, 2} |
| Thread 3 -> p3 p3 p1 p2 p3 p3 | based on {1, 3} {1, 3} {2, 1} {2, 2} {2, 3} {1, 3} |
| Thread 4 -> p3 p3 p1 p2 p1 p2 | based on {1, 3} {1, 3} {2, 1} {2, 2} {2, 1} {2, 2} |
| Thread 5 -> p1 p2 p3 p3 p3 p3 | based on {1, 1} {2, 2} {2, 3} {1, 3} {2, 3} {1, 3} |
| Thread 6 -> p1 p2 p3 p3 p1 p2 | based on {1, 1} {2, 2} {2, 3} {1, 3} {2, 1} {2, 2} |
| Thread 7 -> p1 p2 p1 p2 p3 p3 | based on {1, 1} {2, 2} {2, 1} {2, 2} {2, 3} {1, 3} |
| Thread 8 -> p1 p2 p1 p2 p1 p2 | based on {1, 1} {2, 2} {2, 1} {2, 2} {2, 1} {2, 2} |

Here threads 2 through 7 are "mixes" of the pure threads (corresponding to thread 1 and thread 8) originally discussed. Notice from the sequences that the union element of position 2 in the sequences is in fact never needed to differentiate between any 2 threads, because the repeat-elements of position 1 is always sufficient to differentiate. This underscores the principle that union elements only are used to differentiate when 2 threads differ only in those union elements, and the union elements have matched the same number of characters.

Notice also the exponential explosion of thread possibilities. For 6 characters in the stream, there are 8 unique threads that result from the "subset-constructed" graph. From this we see that if another "ab" were appended to the stream, there are 16 unique threads that result, and so on. This implies that some expressions and stream combinations could produce exponential, and therefore possibly "non-finishing" tokenize statements. In fact, this example will be used in section 8.5.5.1 on the execution engine to show how this possibility is corrected through runtime pruning, such that this example scales linearly with the size of the input stream.

8.5.2.2.7 Transformations and Short-circuits

Some regular expressions can match the empty string, though they can also match additional characters. In terms of the NFA that represent these expressions, it means that there are one or more paths through the graph, from entry to exit node, which do not "eat" any characters—in other words, all arcs traversed along a short-circuit path are either null arc transitions or instruction arc transitions.

As sub-expressions of other expressions, such short-circuits present difficulties. The first case to consider is the repeat pattern, such as the following:

Pattern $p$=(null|'a')*1;

The graph that naturally represents this simple expression is never created in the grammar. The problem with such a graph is that there are an infinite number of valid paths through the graph which "eat" no characters, depending on how many times we want to "eat" null. For a given input stream, if it is not possible to match this pattern by "eating" an 'a', then this pattern matches as if it were the null pattern. But without transformation, the composition graph does not help the execution engine or the subset construction algorithm to avoid repetitive-cycles through the graph's short-circuit.

But now consider the following pattern, where the . . . represents some side-effect statements to be compiled into instruction arcs:

Pattern p=do( . . . ; null|'a'; . . . )*3;

Assume also that the input stream against which this pattern is being applied (possibly within a larger composition) provides no 'a' characters at the point of match. The specification requires that the short-circuit of pattern p match exactly 3 times, triggering 3 accumulations of the side-effect instruction arcs of the "do-pattern" which wraps the short-circuit. The chosen algorithm for accomplishing this specified behavior is neither part of subset construction nor part of the automata execution engine. The approach of this invention is to employ an already discussed novel (subjunctive) grammar form of this invention to "eliminate" the short circuit, so that no graph ever composed by the Automata Composition Engine will have a null cycle. This is coded in RepeatGrammar.java, lines 27–30, and results in a composition equivalent to the following expression, which is a rewritten version of the above:

| | |
|---|---|
| 1 | Pattern p1 = do(...; null | 'a'; ...); |
| 2 | Pattern p2 = p1 * 3..3; |
| 3 | Pattern p3 = (p1 butnot null) * 0; |
| 4 | Pattern p = p2 + p2; |

When composition takes place, it will compose p, which has no short-circuits, because the short-circuit has been removed via p3. Composition will in fact require a "preliminary" subset construction to form the composition p1 butnot null, but this construction will not be subject to the problems of a null-cycle because p1 itself, although it has a short-circuit, does not have a null cycle.

The concatenation on line 4 is formed using a call to the same code that acts on behalf of the concatenator operator, so that all of the arcnum sequence rules discussed in the sections above are properly invoked.

A similar problem can be seen with the iterate grammar as shown in the following:

Pattern p=do( . . . ; null|'a'; . . . )*2..4;

If the input stream has from 2 to 4 consecutive 'a' characters at the point of match for pattern p, then this pattern matches in the normal way through "eating" and accumulation of comparable arcnum sequences. But if there are no 'a' characters at the point of match, the pattern can also match via the short-circuit. The question of how many times the side-effects are "fired" is answered by the specification, which says that the short-circuit portion of an iterate grammar, if required for a match, will match the minimum number of times. The transformation required to produce this behavior is performed in IterateGrammar.java, lines 35–45, again employing the novel subjunctive grammar forms of this invention, and is as follows:

| | |
|---|---|
| 1 | Pattern p1 = do(...; null | 'a'; ...); |
| 2 | Pattern p2 = (p1 but null) * 2..2; |
| 3 | Pattern p3 = (p1 butnot null) * 2..4; |
| 4 | Pattern p = p1 | p2; |

When composition takes place, the proper arcnum sequences will be built for pattern p, because the union of line 4 uses the same internal code employed by the union operator itself.

Another important transformation occurs with a union expression. Consider the following pattern p, where p1, p2, and p3 all include short-circuits, and these short-circuit paths include side-effect instruction arcs.

Pattern p=p1|p2|p3;

We saw earlier that when elements of a union include side-effects, and when the elements of the union match against the same characters of the input stream, the arcnum sequences are crucial for choosing a winning thread. However, arcnum sequences are of no help in selecting a winning thread (and its side-effects corresponding to p1, p2, or p3) when what is "best" matched by the above union against the entire input stream is nothing at all. The reason is that arcnum sequences are not generated for short-circuit transitions because after subset-construction, only "eating" characters have arcnum sequences. Therefore, in order to resolve the potential for short-circuit ambiguity in unions with multiple short-circuits, the Automata Composition Engine (as seen in UnionGrammar.java, lines 50–75) employs yet another transformation using the novel subjunctive grammar form of this invention. The above union, assuming that p1, p2, and p3 all have short-circuits, is transformed to:

| |
|---|
| Pattern p1a = p1; |
| Pattern p2a = p2 butnot null; |
| Pattern p3a = p3 butnot null; |
| Pattern p = p1a | p2a | p3a; |

The above transformation code checks which elements of the union have short-circuits and, based on that, removes the short-circuits from the $2^{nd}$ to the Nth short-circuitable members of the union. In this case, the short-circuits of the $2^{nd}$ and $3^{rd}$ elements of the union are removed. The resulting union is equivalent in meaning to the one coded by the programmer, but has the advantage of ensuring that if the union matches nothing (based on how it is embedded in a larger composition, and the input stream itself), then the instruction-arcs along the short-circuit of p1 are selected for inclusion in the side-effects. Again, the arcnum sequence ambiguity resolution, for unions whose elements include side-effects, does not help with short-circuits, because arcnum sequences in a subset-constructed graph only apply to "eating" characters.

8.5.2.2.8 Ambiguity Premise

As a result of the above techniques, an important property of the composition graph follows. Consider all possible pairs of consecutive "eating" arcs in the graph that can be traversed in order by some path through the graph. Each pair of "eating" arcs will be associated with some accumulation of instructions (possibly no instructions at all), based on any instruction arcs traversed between the "eating" arcs. (In the discussion of subset construction to follow, this accumulation of instructions is part of a transition from "stop-node" to "stop-node" and is associated with the second "eating" arc of the pair.) Premise: If across all pairs of "eating" arcs in a composition graph (or equivalent), there are 2 pairs with the same arcnum sequences, then the accumulated instructions will also be the same for each pair.

Consider the following expression:

| | |
|---|---|
| Pattern p = | (do (...; p1; ...) | do (...; p2; ...)) |
| | + |
| | (do (...; p3; ...) | do (...; p4; ...)); |

There is no intersection of arcnum sequences between p1, p2, p3, and p4. For example, if p1 through p4 have no nested do-patterns, then each of the arcnum sequences generated for "eating" arcs of p1 will be as follows:

| | |
|---|---|
| p1 arcs–> {1,1} | // 1st term of left-to-right concatenation, 1st term of 1st union |
| p2 arcs–> {1,2} | // 1st term of left-to-right concatenation, 2nd term of 1st union |
| p3 arcs–> {2,1} | // 2nd term of left-to-right concatenation, 1st term of 2nd union |
| p4 arcs–> {2,2} | // 2nd term of left-to-right concatenation, 2nd term of 2nd union |

What is seen here is that all of the arcnum sequences within p1 do not match any of the arcnum sequence of p2 arcs, p3 arcs, or p4 arcs. This is true even if p1 were to contain nested do-patterns. For this example, if the arc pairs being compared involve arcs within p1 (or within p2, p3, or p4), then there are no instructions at all. The premise is satisfied. The only arc pairs which can have associated instruction accumulations are for transitions out of one of the do-patterns and into another do-pattern. Consider transitions from the beginning of an "eating" arc in p1 to the end of an "eating" arc in p3. All such transitions must go through the single exit node of the do-pattern which wraps p1, and through the single entry node of the do-pattern which wraps p3. Based on the composition form for a do-pattern shown in section 8.3.5.4.1, this means that all such 2-arc transitions will accumulate the post-list instruction arc of the do-pattern wrapping p1 and the pre-list instruction arc of the do-pattern wrapping p3. Thus all arcnum pairs {{1,1} {2,1}} will accumulate the same instructions. This argument applies to the following pairs which can accumulate any instructions:

| | |
|---|---|
| {1,1} {2,1} -- | arc from p1, post-list do-p1, pre-list do-p3, arc from p3 |
| {1,1} {2,2} -- | arc from p1, post-list do-p1, pre-list do-p4, arc from p4 |
| {1,2} {2,1} -- | arc from p2, post-list do-p2, pre-list do-p3, arc from p3 |
| {1,2} {2,2} -- | arc from p2, post-list do-p2, pre-list do-p4, arc from p4 |

The above expression and associated graph illustrates that the only way to accumulate instructions between a pair of "eating" arcs is to exit one do-pattern and enter another do-pattern. Because the "eating" arcs belonging to two different do-patterns cannot have the same arcnum sequences, the premise holds.

The expression is changed as follows:

| | |
|---|---|
| Pattern p = | (p1 | p2) |
| | + |
| | (do (...; p3; ...) | do (...; p4; ...)); |

In this case, all of the arcs within p1 and p2 have are associated with the sequence {1}, but the sequences for arcs within p3 and p4 remain {2,1} and {2,2} respectively. What is seen is that the sub-expression p1|p2 is treated as a unit because it has no instruction arcs and, further, that no other arcs within the graph can have the sequence {1} except those belonging to the union p1|p2. The property of this premise is seen to also hold as if the p1|p2 term was wrapped in a do-pattern with its instruction arcs replaced by null arcs.

The importance of this premise is in showing that any 2 automata threads which traverse an identical sequence of arcnum sequences will also recognize the same instructions.

8.5.3 Automata Construction

The subset construction algorithm of the art (as described by Ullman's *Introduction to Automata Theory*, section 2.3.5) could be employed by the present invention only in cases where the regular-expressions to be executed had no side-effects whatsoever. In these cases, we have seen that there is no need for arcnum sequences, and in fact, the engine of the present invention creates empty {} arcnum sequences. However, as seen in section 8.5.1.2.4, the tokenize statement itself includes side-effect instructions, which serve to set the appropriate selector for the union-switch expression that models the tokenize statement. Therefore, all composition graphs (encountered in any script-translated code of the present invention ) include side-effects, and every "eating" arc of the final subset construction will have a non-empty arcnum sequence. An implication of this is that the graphs produced by subset construction in the present algorithm are never DFAs, they are NFAs. There are three reasons why subset construction is still important: (1) graphs produced by the modified subset construction algorithm of this invention are generally more efficient (during execution) than the composition graphs on which they are based; (2) the "loop-back/overstamping" arcnums of repeating compositions require subset construction so that the resulting graph only has arcnum sequences associated with "eating" arcs; and (3) subset construction is a means for performing the graph-convolution required by the novel subjunctive grammar form of this invention.

In a standard subset construction of the art, the starting subset node is a set including the entry node of the graph, plus any nodes that can be reached from that entry node by one or more null transitions. In the engine of this invention, the starting subset node consists only of the entry node—written as {n1}—except in cases of subjunctive convolution discussed in section 8.5.4. (Here we use a notation for subset nodes that looks similar to arcnum sequences.) For every new subset node found, the standard algorithm discovers (based on the "composition graph") what list of stop-nodes can be reached for any given character from any of the nodes in the source subset node. Every unique list of stop-nodes becomes a new subset node in the "constructed" graph, and this new subset node is considered for its transitions relative to the composition graph. In the algorithm of the art, the subset will list all nodes reachable from a given subset. In the algorithm of this invention, however, the list will generally not include nodes reachable from additional null transitions. This distinction will be encapsulated in the definition of a "stop-node", which is a node reachable directly from an "eating" arc, or the exit node.

In the subset construction algorithm of this invention, modifications employed are described in the following simple example (for computing one set of valid transitions for a given subset node):

Consider a subset node such as {n2, n3, n5} which represents nodes n2, n3, and n5 of the composition graph.

Further consider that only these "eating" transitions from any of the nodes n2, n3, and n5 in the original graph are found for a particular character such as 'a':
  from node n2 to node n6, eating 'a', with an arcnum sequence of {1,2}, and recognizing instructions $i_1$;
  from node n3 to node n6, eating 'a', an arcnum sequence of {1,1}, and recognizing instructions $i_2$;
  from node n5 to node n6, eating 'a', an arcnum sequence of {1,1,2}, and recognizing instructions $i_3$;
  from node n3 to node n7, eating 'a', an arcnum sequence of {1,1,2}, and recognizing instructions $i_3$; and
  from node n2 to node n8, eating 'a', an arcnum sequence of {1,1,2}, and recognizing instructions $i_3$.
Whereas the standard subset construction algorithm would produce a single arc from subset node {n2, n3, n5} to subset node {n6,n7,n8}, eating the character 'a', the modified algorithm produces 2 outbound arcs from subset node {n2, n3, n5}:
  an arc from {n2, n3, n5} to subset node {n6}, with an arcnum sequence of {1,1}, and recognizing instructions $i_2$; and
  an arc from {n2, n3, n5} to subset node {n7,n8}, with an arcnum sequence of {1,1,2}, and recognizing instructions $i_3$.

The first principle governing the above production of subset transitions (under the modified algorithm) is that from a given subset node, {n2, n3, n5} above, we need to examine for each possible character, all transitions to a particular node. That means (for the above) that we consider together, all transitions from nodes n2, n3, and n5 (in the composition graph), eating the character 'a', to node n6. Here there are 3 such transitions from {n2, n3, n5} to n6, and we keep only one of the transitions, the transition having the "best" sequence of {1,1}. This is a subset-construction-time pruning that makes the resulting NFA graph more efficient (less thread spawning). For transitions to nodes n7, n8, there is one transition each, giving us 2 more transitions to consider.

The second principle governing the above is that if (after application of the first pruning rule above) there are two (or more) outbound arcs (from a given subset node) with the same arcnum sequence and "eating" the same character, then these arcs are combined into a single arc, labeled with the character and arcnum sequence shared by these arcs, and whose destination node is a subset node consisting of the union of nodes (relative to composition graph) reached—that is, a subset node. This principle gives us a single transition from {n2, n3, n5} to {n7,n8}, labeled with arc sequence {1,1,2} and eating the character 'a'.

One point to note relative to the above example is that the first principle is applied before the second principle, which is why the second transition above is to {n7,n8} rather than {n6,n7,n8}, because the transition from node n5 to n6 with arcnum sequence of {1,1,2} was prunable.

A third principle governing the subset construction technique is the definition of stop-nodes. A stop-node in a composition graph (or an intermediate graph produced by subset construction used for another subset construction) is any interior node which is the destination node of any "eating" arc. (A stop-node also includes by definition the exit node of the composition graph, whether or not that exit-node is directly reachable by an "eating" arc.) In this example, all of the transitions for the character 'a' where directly to stop-nodes. In general, the transitions (to be considered) for a subset-node include all unique paths from any of the stop-nodes listed in a subset-node to nearest stop-nodes.

Thus in the example given above, the same result could be achieved from subset node {n2, n3, n5} as follows:
  from node n2 to any intermediate node in the composition graph via a null transition, then to another intermediate node through instruction arc il, then to stop-node n6 by eating 'a', with an arcnum sequence of {1,2};
  from node n3 to any intermediate node in the composition graph via instruction arc $i_2$, then to stop-node n6 by eating 'a', with an arcnum sequence of { 1,1};
  and so forth.

An interesting and significant property that is discovered through examples, or through an understanding of the "validity proof" of subset construction, is that from any of the stop-nodes listed in a subset node created during construction, all of the possible transitions to the same destination stop-node which have the same arcnum sequence will also traverse the same instructions. This "invariant" property ensures that subset construction preserves the ambiguity-free property of the composition graph.

8.5.3.1 Transition Probing

Subset construction must probe from any stop-node (plus the entry-node) all valid transitions to any other stop-node or the exit-node. This is done with a recursive search, the function FollowTo( ) in Graph.java. The recursive search ends in two ways: (1) the exit-node is reached from a stop-node or entry-node through a path consisting of only null/instr transitions; or (2) another stop-node (or exit node) is reached because of a transition across an "eating" arc, in which case the path consists of 0 or more null or instruction transitions, concluding with the "eating" transition. In both cases the instructions of instructions arcs are accumulated as part of the transition. Type-1 transitions to the exit-node (of the reference/composition graph) effectively cause the resulting subset-node to be "accepting", but are not marked as such. It is left to the execution engine to discover this. From any stop-node there can be at most 1 type-1 transition, because if there were 2 or more, this would be a source of ambiguity. (Ambiguity is always resolved by arcnum sequences, and a type-1 transition has no arcnum sequences because it did not conclude with an "eating" arc.) Since ambiguity has been completely resolved by the composition techniques of section 8.5.2.2, we know therefore that there is at most 1 type-1 transition out of any stop-node (to the exit-node). This is checked and verified in Transition.java, line 192, by throwing a "fatal" exception if incompatible (different instructions) type-1 transitions occur. When type-2 transitions include instructions accumulated along with the "eating" arc, this transition is modeled in the constructed graph by 2 consecutive arcs, first an instruction arc labeled with the accumulated instructions, then an "eating" arc.

Though it is not in fact done during subset construction, a reference-graph equivalent to the composition graph could be built just from the entry-node, the stop-nodes, and the exit-node, by enumerating all type-1 and type-2 transitions, and constructing the appropriate arcs for each transition to connect the stop nodes and entry node to other stop nodes and the exit node. This conceptual graph is postulated because it is used to justify the subset construction algorithm's correctness.

The fact that a constructed "reference-graph" of only stop-nodes (plus entry- and exit-node) is equivalent to the composition graph is seen by considering an execution of the original graph against any given string, to see how many different ways the accept state is reached for all of the threads which reach the accept state. Because the ambiguity is resolved only by the arcnum sequences associated with "eating" arcs, we only need to consider threads which traverse a unique sequence of the "eating" arcs (where uniqueness is defined by the arcnum sequences associated with "eating" arcs). The instructions that are accumulated between stop-nodes (including entry and exit) are therefore implied by each unique sequence. To construct an NFA that recognizes this string for all of the same accept states, we merely put the entry, exit, and all stop-nodes seen in this set of accept threads, and connect with either type-1 or type-2 transitions above, and can be assured that this partial reference-graph will recognize that string in the same way. Now consider a different string. To extend the partial reference-graph to recognize this string with the same arcnum sequences generated by threads of the composition graph, we simply add any stop-nodes seen for that new string, and any new type-1 or type-2 transitions. Such a graph will now recognize both strings (and possibly more). If we try all possible strings recognized by the composition graph, and continue building a graph from just the stop-nodes in this way, we will eventually produce a reference-graph with all of the stop-nodes in the original graph (plus entry and exit) and all of the type1 and type-2 transitions that can be found (by recursive search) in the original graph. We know that this new graph cannot find any more accept paths for the universe of strings than the original, because this new graph's nodes are all in the original graph, and all of its type-1 and type-2 arcs between any 2 stop nodes (plus entry/exit) can be matched by equivalent paths in the composition.

Therefore, the 2 graphs (composition graph, and conceptual reference-graph consisting only of stop nodes) not only accept the same strings, but also both produce the same set of unique arc-sequences for each string which can be matched.

8.5.3.2 Instruction Arcs

During subset construction, instruction arcs (traversed by the recursive transition search algorithm above) are used to accumulate instructions associated with each transition, whether type-1 or type-2. When a subset construction's transitions are used to form a subset-graph, the accumulated instructions are put into a new instruction arc that comes before the eating arc. In other words, the type-2 transitions which include accumulated instructions are composed as a double-arc: the first arc is an instruction arc whose only destination node is an unlabeled intermediate node. That intermediate node contains a single outbound arc recognizing the char(s) of the transition, and whose destination node is the stop-node of the type-2 transition. This is seen in TransitionGroup.java, lines 217–219.

The above construction preserves the equivalence of the construction in that subset-nodes consist only of stop-nodes relative to the composition graph, and these unlabeled "middle-nodes" are never merged with other transitions. This allows the resulting graph of the construction to be used in subsequent constructions for larger compositions (required when composing a subjunctive expression as seen in ButGrammar.java, line 58 and ButNotGrammar.java, line 58).

Another point concerning instruction accumulation during the recursive search for transitions is that instruction arrays must be cloned when passed to the next recursive call, in case a single instruction arc can by traversed by multiple transitions from a source subset node. This is seen in Graph.java, line 124.

8.5.3.3 Arc Numbering

The impact of the subset construction algorithm on the generation of arcnum sequences is that the "loopback/overstamping" sequences for establishing the priorities of repeating patterns requires the subset construction phase to complete the numbering of "eating" arcs. The "loop-back" arcnum sequence is originally assigned to a null arc during composition as a placeholder, for after construction it is transferred to an "eating" transition within the repeated pattern. During subset construction, when a "loopback" arc is encountered, its arcnum sequence is passed along during the recursive calls used to find the transition, and then when the next "eating" arc is encountered, this is used to "worsen" the priority of that "eating" arc according to the description of section 8.5.2.2.6. Because null-cycles have been eliminated (see section 8.5.2.2.7), a loop-back arc is sure to be followed by an "eating" arc within the repeated pattern. This invariant property is checked in Graph.java, line 92.

Arcnum sequences are also used during subset construction for pruning purposes, in the case where multiple nodes of a subset node transition to the same destination node via different arcnum sequences. The fact that this pruning still results in a subset-constructed graph that finds the correct "winning" thread is demonstrated in the next section. Arcnum sequences of "eating" arcs are assigned to type-2 transitions in the subset-constructed graph, so that all possible type-2 transitions in the original graph (except those known immediately to be "inferior") are therefore included in the subset-constructed graph.

8.5.3.4 Subset Construction Rules

The following are definitions relating to subset construction, and the validity argument that follows.

8.5.3.4.1 Definitions

1) In any composition graph or intermediate construction graph (needed for subjunctive convolution compositions), "interior stop-nodes" are defined as all interior nodes which are destination nodes of arcs that "eat" characters. That is, an interior node whose incoming arcs are all either null transitions or instruction transitions is not a "stop-node", because the recursive transition search algorithm never "stops and records a transition" at such a node. The term "interior stop-node" excludes entry- and exit-nodes.
2) A "stop-node" is defined as either an "interior stop node", or the exit node.
3) A "null extender" is an arc used to ensure that the exit node of a graph does not satisfy the normal condition for being a "stop-node". That is, if the exit-node of a given graph has any incoming "eating" arcs, then a "null extender" arc can be used to make the current exit-node into an interior node, and create a new exit-node with only that incoming "null extender". This allows subjunctive constructions to produce "same-time" arrivals at the exit-nodes of both the primary and the subjunctive composition graphs.
4) An "instruction extender" is a technique used to convert a type-2 "eating" transition that also accumulates instructions into 2 arcs. The first arc is an instruction arc labeled with the accumulated instructions. The second arc carries the "eaten" character(s). The node in between is a "middle" node. The "middle" node is not a "stop-node" because the arc into it is an instruction arc (the "extender"). The "middle" node carries no significance to determining the possible accept paths of the execution engine, because it has only one inbound and one outbound arc, and its incoming arc is not "eating".

5) A "reference execution engine" refers to a conceptual NFA execution engine which: (1) spawns threads at every node, (2) has multiple "outbound" arcs, (3) never prunes in any way, and (4) is guaranteed to find every unique path through the automata that can recognize/accept any given string. Its value in showing the correctness of a subset construction algorithm is that it helps identify the possible execution threads that can reach the "accept" state for an input stream, relative to the composition graph. As such, it is used to "reference" the correct behavior of a subset-constructed graph.

6) A "reference construction" refers to a construction (from an original composition) that is not actually performed but (if it were constructed) is equivalent to the original composition in the following sense. If both graphs are executed by a "reference execution engine", the same set of unique paths to acceptance are found for any possible input string. The "reference construction" consists of the entry- and exit-nodes of the composition graph, plus any "interior stop-nodes" of the original graph, plus any necessary "middle nodes". Applying another "reference construction" to a graph already produced by "reference construction" results in no change to the graph structure whatsoever. That the "reference construction" results in a graph producing identical results to the composition graph was discussed in section 8.5.3.1 above.

7) A "type-1" transition is a special "transition path" of 1 or more null or instruction arcs from either the entry-node or any interior stop-node to the exit-node, that "eats" no characters. Such a transition has the effect of making the starting (source) node for that transition behave "like an accept node". Thus this transition may or may not accumulate instructions. It is impossible to find 2 or more such transitions from any node (to the exit node), which accumulate different instructions, because of the ambiguity resolution transformations of section 8.5.2.2.7, such as allowing only one term of a union to include a "short-circuit".

8) A "type-2" transition also starts from either the entry-node or from any interior stop-node. But a "type-2" transition is a "transition path" of 0 or more null or instruction arcs concluding with an "eating" arc to a stop-node. Thus a "type-2" transition also may or may not accumulate instructions.

9) An "arcnum sequence" is the sequence of positive numbers associated with all "eating" arcs (and sometimes generated via loop-back arcs of a composition graph). After any subset construction graph, arcnum sequences are always associated only with "eating" arcs. Any two Automata Execution Engine paths/threads through the automata relative to an input stream, which record the same sequence of arcnum sequences, must also recognize exactly the same instructions, an expected property of the ambiguity resolution techniques of automata composition.

10) The "root subset node" is a set consisting of just the entry node of any composition graph or intermediate graph being constructed.

11) A "subset node" is a set consisting of only "stop nodes" of any composition graph or intermediate graph being constructed.

8.5.3.4.2 Subset Construction Rules of the Invention

The following are the subset construction rules.

1) From any subset-node (which correlates to stop-nodes in the reference or composition graph), find all type-1 and type-2 transitions (based on the reference graph) to other stop-nodes (including the exit-node) of the reference or composition graph, then, 2) For all transitions found in step 1 to the same destination stop-node, regardless of which node of the reference graph they come from, compare arcnum sequences, and keep only that transition having the "best" arcnum sequence (pruning the others), then, 3) From the transitions remaining after application of step 2, for any that have the same arcnum sequence (they must be to different destination nodes based on rule 2 above which keeps only one for any given destination), combine their destination nodes into a subset-node, then, 4) If this subset-node has already been encountered during the subset construction process, find it from a lookup table maintained during construction, and construct either a type-1 or type-2 arc to the destination subset-node based on the above. (A type-2 arc may actually be a double-arc with a "middle" node.) This arc is added to the source subset-node, and "points to" the destination subset-node found in step 3. However, 5) If this subset-node has not been created through a previous transition, then create one, add it to the lookup table of subset nodes, and also add it to a "work-list" of additional subset-nodes whose transitions must be found. Then continue with step 4.

6) When the "work-list" of subset-nodes, which was initialized to the subset-node {n1} (or {n1, −n1} in the case of a subjunctive convolution), is finally empty, then the construction is essentially complete, and at this point, the graph is purged of non-exitable nodes that could result from the subjunctive convolution to be discussed in section 8.5.4.

8.5.3.4.3 Premises

The following are four important premises concerning subset-constructed graphs. The first two premises associate the "reference graph of stop-nodes" to the subset-constructed graph as follows:

Assume one "reference engine" instance executing a composition graph's "reference graph" and another such engine executing its "subset construction" graph—engine1 and engine2 respectively. Assume that both engine1 and engine2 are reading from the same input stream, one character at a time, and feeding each character to all threads current in each engine instance. If a snap-shot is taken just after each character is "eaten", all threads in engine1 will be at a "stop-node" of the "reference-graph", and all threads in engine2 will be at a "subset-node" of the "subset-graph", because only these nodes are destination nodes of "eating" arcs. Premises 1 and 2 will be found to be true at any snapshot for any input stream. As indicated in the definitions above, and the description of the subset construction algorithm, a "subset-node" in the $2^{nd}$ graph is a list of "stop-nodes" that can be found in the $1^{st}$ graph. Since threads terminate if they cannot match the characters of the input stream, it is automatically true that all threads for both engines will have recognized exactly the same characters, although stopped at various nodes ("stop-nodes" for engine1, "subset-nodes" for engine2). For both engines, there may be cases where multiple threads are at the same node, but having traversed different sequences of arcnum sequences to get there.

1) At any snapshot, consider any single thread of engine2. This thread of engine2 will be at some "subset-node" of the "subset-graph", and will have recognized a particular sequence of arcnum sequences. This "subset-node" represents by design/construction a list of "stop-nodes" in the reference graph. Meanwhile, if one looks across all threads in engine1 at this same snapshot, it is true that for every "stop-node" in the list of nodes of the "subset-node" (at which a thread of engine2 is stopped), at least 1 thread in engine 1 will be found at each "stop-node", and having simultaneously traversed the same particular sequence of arcnum sequences as traversed in engine2. This premise essentially counts at least 1 equivalent (arcnum sequence-wise) engine1 thread for any engine2 thread, at a given snapshot. This premise carries the implication (as worded) that if there are no threads remaining at a given snapshot in engine 1, there will be no threads in engine2. This premise is validated inductively, from the defining rules of subset construction given above, and, once validated, is used throughout the inductive proof of the second premise, which essentially establishes the ability of the subset-constructed graph to find the same "winning" thread found by engine1 for the "reference graph".

2) At any snapshot, make a list of all "stop-nodes" at which any current engine1 threads are found. For each unique "stop-node", compare all threads found at that "stop-node", by comparing the sequence of arcnum sequences encountered thus far, and choose the "best/winning" sequence of sequences for each "stop-node". For every thread stopped in engine1 at a "stop-node" via "best sequence of sequences", there will be at least one thread in engine2, stopped at a "subset-node", which lists that "stop-node" (found by engine1) and which has that same best sequence of sequences. This premise carries the implication (as worded) that if there are no threads remaining at a given snapshot in engine 1, there will be no threads in engine2. This premise is critical to guaranteeing that since the engine is only concerned with finding the side-effects of the winning "thread", that engine2 based on the subset-construction finds the same "winners" as engine1 based on the "reference graph" that has already been shown to be equivalent to the composition graph, from which the subset construction was made.

3) From any subset-node during construction, there is at most 1 unique type-1 transition (to the exit node), where uniqueness is defined by what instructions (or lack thereof) are accumulated.

4) From any subset-node during construction, there is at most 1 unique type-2 transition to the same destination node recognizing the same arcnum sequence, where uniqueness is defined by what instructions (or lack thereof) are accumulated.

8.5.3.4.4 Justifications

Justifications for the above stated premises are as follows. The arguments for the first 2 premises are inductive. For purposes of clarity, the arguments use instantiations of any node, any thread, etc. rather than abstract notation. The "stop-nodes" (of engine1, "reference graph") are labeled as—n1, n2, n3, etc.—where the entry node is n1. The "subset-nodes" (of engine2, "subset-graph") are lists of stop nodes, so that a "subset-node" of "stop-nodes" n2, n3, and n5 is shown as {n2, n3, n5}. The "root"/entry subset-node is {n1}. Arcnum sequences, are simply arrays of position ints, such that {1}<{1,1}<{1,2}<{2}<{2,1}<{3,1} etc. When comparing long sequences of arcnum sequences spawned by 2 threads, it is often insufficient to stop at the first difference. For example, {{1,2}, {1,2}} is better than {{1}, {2}} even though it is "worse" after the first comparison. In the engine, comparison proceeds to the very end of the sequence of sequences, or until the first level-1 mismatch found in comparison, that is, where the mismatch involves the first element of the 2 arcnum sequences (representing the topmost composition level of the regular expression being tokenized).

Comparing all the way "to the exit/accept node" is really a special case of the following rule of thumb. The engine is permitted to compare 2 arcnum sequences, at any snapshot, (for purposes of pruning or determining the "best" thread) if and only if the 2 threads being compared are stopped at identically the same node. This is because all possible substrings and associated sequences of sequences that can be recognized from this point forward are the same for both threads. Therefore, if Thread1 and Thread2 are stopped at the same node of the same engine, the eventual "winner" can come from threads spawned by Thread1 if and only if Thread1 is "better" than Thread2 at the common node stopped at, and vice versa.

1) Premise 1 (Induction Argument).

Induction. The premise postulates any thread in engine2 at the $N^{th}$ snapshot relative to the input stream. The inductive argument looks at the "subset-node" that this engine2 thread is at, and the sequence of arcnum sequences that it has traversed, and shows how the premise is also true for any threads spawned by this thread at the $N+1^{th}$ snapshot relative to the same input stream. We therefore consider such a subset-node for engine2, {n2, n3, n4} with sequence of sequences {seq1, . . . , seqN}, and subset-graph transitions for the next character, such as the character 'a', which go to {n5,n6} via arcnum sequence {1,1}, to {n7} via {2}, and to {n8,n9,n10} via {1}. Therefore, engine2 has spawned the following threads at N+1—a thread at {n5,n6} via the sequence of sequences {seq1, . . . ,seqN, {1,1}}, a thread at {n7} via {seq1, . . . ,seqN, {2}}, and a thread at {n8,n9,n10} via {seq1, . . . ,seqN, {1}}. By this premise at snapshot N, engine1 at snap-shot N must have a thread at n2 via {seq1, . . . ,seqN}, at n3 via {seq1, . . . ,seqN}, and at n4 for {seq1, . . . ,seqN}. Further, by the rules of subset construction already given, at least one of n2 or n3 or n4 can transition to n5 via the same {1,1} of the engine2 transition from {n2, n3, n4} to {n5,n6}. Additionally, at least one of n2 or n3 or n4 has a transition to n6 via {1,1}. Since n2, n3, and n4 are all associated (by premise) with {seq1, . . . ,seqN}, we therefore have at least 1 engine1 thread at n5 via {seq1, . . . ,seqN, {1,1}} and at least 1 engine1 thread at n6 via {seq1, . . . , seqN, {1,1}}. By the same argument that combines the premise at snapshot N with the rules of subset construction, 1 engine1 thread must be at n7 via {seq1, . . . ,seqN, {2}}. Similarly, 1 engine 1 thread must be at n8 via {seq1, . . . ,seqN, {1}}, 1 engine1 thread must be n9 for {seq1, . . . ,seqN, {1}}, and 1 engine1 thread must be at n10 via {seq1, . . . ,seqN, {1}}. So the premise has been satisfied at character N+1. If engine2 had no valid transition for the $N+1^{th}$ character, then it has no threads spawned, and so the premise relating to engine1 of "at least 1 for each" is automatically satisfied. This argument has followed rather naturally simply by the defining rules of subset-construction.

Base case. The base case can be justified by prepending both the "reference graph" for engine1 and the "subset graph" for engine2 with a new entry node and a single arc connecting to the old entry nodes. This prepended arc "eats" an imaginary character not currently found in the language. Then prepend the input stream with this imaginary character, and give it an initial sequence of sequences of {{1}}. All future sequences in either engines' threads (by spawning from this single thread) will start as {{1}, ... }. After eating this imaginary character, engine1 will have exactly one thread at n1 (the "real" entry node) having traversed the sequence of sequences {{1}}, and engine2 will have exactly one thread at subset node {n1}, having also traversed the sequence of sequences {{1}}. This satisfies the requirements of premise1 because engine 2 has only 1 subset node after the imaginary character (i.e. the $0^{th}$ character of the real stream)—{n1}—and for the only corresponding node n1 of engine1 there is 1 thread having "eaten" the same imaginary character and recognized the same sequence of sequences. Note that node n1 of the reference-graph and subset node {n1} of the subset-graph have both been made into stop-nodes by the prepending of "eating" arc.

2) Premise 2 (by Induction Argument).

Induction. The premise asks us to consider all "best" (by sequence of arcnum sequences) threads found at any "stop-node" in engine1, after N chars. The argument employed here describes through example a set of such threads found, and demonstrates the inductive approach for the example, rather than using abstract notation. Assume by example, that a total of 5 unique "stop-nodes" across the engine1 threads, n2, n3, n4, n5, n6 and label the "best" arcnum sequences (at the snapshot after N chars) for each as seq2, seq3, seq4, seq5, seq6. We can assume an ordering of these sequences as seq2<=seq3<=seq4<=seq5<=seq6 without loss generality, by an appropriate shuffling and renumbering of stop-nodes, subset-nodes, and sequences of arcnum sequences to make this true. Technically, these sequences are not comparable because they correspond with threads which are stopped at different nodes. However, these sequences will then be coupled with transitions to the same node (or sufficiently similar subset node), at which point comparisons can be made.

By application of premise 2 at N chars, we know that there must be threads stopped in engine2 at at least 5 subset-nodes (not necessarily different by premise), and that these 5 subset-nodes will each list the stop-nodes given above—shown here as {n2, others2}, {n3, others3}, {n4,others4}, {n5,others5}, {n6,others6} where others2 (etc.) are some sublist (possibly empty) of additional stop-nodes—and (by premise 2 again) each subset-node has recognized the same sequences of arcnum sequences—seq2, seq3, seq4, seq5, seq6.

An important point to observe concerning the others2 (etc.) stop-node sublists, is that each stop-node in the sub-list must also be elements of {n2, ... ,n6}, the same stop-nodes found across all engine1 threads. This follows from premise 1 already validated which shows that all stop-nodes in a subset-node stopped at in engine2 have representative (extant) threads in engine1 stopped at these nodes. Again, the list of reference-graph nodes (in which engine1 was found to be stopped at snapshot N) are n2, n3, n4,n5,n6.

We first argue the case where the sequences of arcnum sequences are strictly increasing—seq2<seq3<seq4<seq5<seq6. The general case which permits equality will then be considered. The increasing ordering of sequences is created by shuffling and renumbering node numbers and associated sequences, and does not relate to a property of the graph. The sublist others2 must be empty, others3 can only include n2, others4 can only include n2 or n3, others5 can only include n2 or n3 or n4, and others6 can include n2, n3, n4,n5. If, in contradiction, it is attempted include n3 in others2, (by premise 1 already validated) engine1 has a thread stopped in n3 with the same sequence of arcnum sequences—seq2—as the subset-node {n2, n3, ... }. But under the "strictly increasing" case where seq2<seq3, the basis of permise2 that the best sequence found for node n3 in engine1 was seq3 is then contradicted. (Note that in this contradiction argument seq2 and seq3 can be compared because both threads are at n3, that is, Thread1 is the "best" thread based on this premise2, and Thread2 is another thread whose existence is known by premise1 already validated.) This same argument shows that others3 cannot include n4..n6, others4 cannot include n5..n6, and others5 cannot include n6.

A node-by-node analysis of the possible transitions for the $N+1^{st}$ character in engine1 furthers the induction. For example, of the nodes n2 through n6 stopped at in engine1 after snapshot N, there are best transitions to node n7, via only n2, n4, and n6, whose arcnum sequences we label t2, t4, and t6 respectively. Therefore, engine1 will have at least 3 threads in the node n7 at snap-shot N+1, whose sequences are seq2+t2, seq4+t4, and seq6+t6, and the best sequence will be the best of these 3. (Note that these sequences of sequences can be compared because they all provide a transition to node n7.) To demonstrate the induction for the case under consideration, we show that engine2 will have at least 1 thread in a subset-node {n7,others7} whose sequence is also the best of seq2+t2, seq4+t4, and seq6+t6. The arguments that demonstrate this apply to any transition found from n2, n3, n4, n5, n6 to any other node as well. Specific node numbers are used to improve the readability of the induction.

In the above notation, seq2+t2 is a sequence of arcnum sequences formed by concatenating the sequence of sequences seq2 with the transition arcnum sequence t2. Although seq2 has been made to "compare better" than seq4 by renumbering assumption, it does not necessarily follow (because of the multi-level priority scheme) that seq2+t2 is "better than" seq4+t4. The arguments below will carefully consider that possibility.

Consider the subset node {n2, others2=empty} of premise2 at snapshot N. By the rules of subset-construction, there will be a transition to some {n7,others7} by only t2, since t2 will have been the best transition to n7 from n2 found during construction. Therefore, there must be an engine2 thread at the N+1 character position in {n7,others7} via sequences seq2+t2. Now consider at snapshot N the engine2 thread at {n3, others3}. The set of nodes others3 can be empty or alternatively can include just n2, by the arguments and restriction given above. So there may be no thread at all in some {n7, others7} if others3 is empty (because n3 was found to have no transition to n7), or if others3 includes n2, there may be an engine2 thread in some {n7, others7}, via the sequence seq3+t2. The concatenated sequence of sequences seq3+t2 does not match any of the best candidates for engine1, so it would be better if this possibility did not exist at all. However, it may exist so long as seq3+t2 is not better than all other candidates of engine2 at N+1. Clearly it cannot be better than seq2+t2, since seq2<=seq3 (by shuffling and renumbering), and since seq2+t2 is a guaranteed candidate for engine2, therefore no problem. Note that here we did not require the extra restriction of seq2<seq3. Also note that it is acceptable to compare seq2+t2 with seq3+t2 because of the engine1 threads under consideration arriving at the same node n7 from n2. At this point, the "best" sequence to arrive at some {n7, others7} in engine2 (at snap-shot N+1) still includes only the candidate seq2+t2.

Now consider at snapshot N the subset node {n4,others4} found in engine2. Unlike {n3, others3}, this subset node is guaranteed to offer a transition to some {n7, others7}. The reason is that t4 provides a transition from n4 to n7 in engine1, as found in engine1, and subset construction therefore guarantees either a transition t4 or better because one of the available transitions during construction from {n4,others4} to a new subset-node including n7 is of course the transition for n4. If t4 is the best available, we have in our "best" candidates (for some {n7, others7} in engine2 at snapshot N+1) the sequences seq2+t2 and seq4+t4, which exactly match 2 of the candidates from engine1. However, if t4 is not the best available, the best transition can only be from another node in others4, which is (by temporary restriction) either n2 or n3. Since n3 was found to have no transition to n7, it would have to be t2. But if t4 was not the best, this would imply that t2<t4, and since we already stated that seq2<=seq4, then seq2+t2<seq4+t2, and therefore, for this possibility, seq4+t2 would not be the "best" of engine2, since seq2+t2 is a candidate. Either way, the first candidate for engine2 (at some {7, others7}) is seq2+t2, and a second candidate which is at least as good as seq4+t4, but if better, in a way that guarantees that it is not better than seq2+t2.

Moving to {n5, others5} in engine2 at snapshot N, there may be no transition at all to some {n7, others7} because n5 has no transition to n7 in the example. This is acceptable since the engine1 candidates do not include any concatenated sequences starting with seq5. However, if others5 does contain n2 and/or n4, then engine2 would have either seq5+t2 and/or seq5+t4 as a candidate. The solution set already includes seq2+t2 which is at least as good as seq5+t2 (because seq2<=seq5). The solution set also includes seq4+t4 or better, and seq5+t4 therefore adds nothing to the solution set of engine2 (because seq4<=seq5).

Finally, looking at {n6,others6} of engine2 at snapshot N, there must be a subset-construction transition to some {n7, others7} because {n6,others6} includes n6, and there is a transition from n6. The subset graph transition could, in fact, be via t6. Alternatively, the subset-graph transition from {n6,others6} to some {n7,others7} could be t2 and/or t4, if others6 includes n2 and/or n4, and if t2 and/or t4 are better than t6. If t6 is the best transition from {n6,others6} found during subset construction, then seq6+t6 belongs to the engine2 candidate best sequences, and since this was one of the best candidates from engine1, the match against the best candidates seq6+t4 is being added to the list of engine2 candidates, which already includes a candidate at least as good as seq4+t4 (see above), and seq4+t4 is better than seq6+t4 since seq4<=seq6. Likewise, if others6 does include n2 and t2 is better than t6, then seq6+t2 is being added to the candidates, which already include seq2+t2, and seq2+t2 is better than seq6+t2 because seq2<=seq6.

This premise considers all of the unique nodes across all threads in engine1 at N, and the argument has renumbered nodes as necessary so that their corresponding sequences of arcnum sequences are increasing by increasing node number. The argument then considered which nodes can be reached from this set of nodes for the N+1th character. The argument proceeded by example, finding nodes n2 through n6 across all threads stopped in engine1 at character N, and from these nodes considered valid transitions (on the N+1th character) to n7, found reachable from n2, n4, n6. The best transitions in engine1 from n2, n4, n6 (to n7) were labeled as t2, t4, t6 respectively. By application of this premise at N, the best sequences for n2, n4, and n6 were seq2, seq4, seq6; so, therefore, the best arcnum sequence reaching n7 in engine1 (at snapshot N+1) is the best of seq2+t2, seq4+t4, seq6+t6. It was then argued that in engine2 at snapshot N+1, some {n7, others} is reached by this same best sequence of sequences: (1) a candidates of seq2+t2 was found; (2) a candidate2 at least as good as seq4+t4 was found, but such that if candidate2 were better than seq4+t4 it would be worse than seq2+t2; and (3) a candidate3 at least as good as seq6+t6 was found, but if better than seq6+t6, it would not improve upon candidates or candidate2. Since the same style of arguments could be used for any nodes and transitions found, we have almost demonstrated the validity of the premise at N+1 by assuming its validity at snapshot N.

Normally it is acceptable to compare entire sequences of arcnum sequences only when at the same node. In the above arguments, sequences associated with some {n7, others71} and some {n7, others72} in engine2 are compared, representing potentially different nodes at the same engine2 snapshot. But premise1 already validated shows that if comparing two subset nodes in engine2 containing n7, there must be 2 corresponding (by sequences) engine1 threads at n7, so the sequences can be compared through the correspondent threads in engine1 at n7.

The restriction of strictly-increasing sequences in the above argument is now relaxed. That is, a restriction that seq2<seq3<seq4<seq5<seq6 was imposed, when in fact reshuffling only ensures that seq2<=seq3<=seq4<=seq5<=seq6. The comparisons themselves did not take advantage of this, but it was assumed that {n4, others4} could only include n2 and n3 in others4, etc. Relaxing this restriction to the general case means that others4 can include n5 if seq4=seq5. We can see that if n5 is added to others4, this nothing changes because there was no transition to n7 from n5. If n6 is added to others4, implying that seq4=seq5=seq6, then there would also be the solution seq4+t6 to consider, but in this case seq4+t6=seq6+t6, and we already know that a candidate at least as good as seq6+t6 was considered for arrival at some {n7,others7} in engine2. Thus it is seen that relaxing the strictly-increasing assumption does not change the best candidate of engine2 at some {n7, others7}.

Base case. To demonstrate the validity of the premise at the base-case, we prepend both the "reference graph" for engine1 and the "subset graph" for engine2, each with a new entry node and a single arc connecting to the old entry nodes, these 2 new arcs (for the 2 graphs) "eating" an imaginary character not currently in the language, and assign an arcnum sequence for each arc of {1}. Then prepend the input stream with this same imaginary character. All future sequences (by spawning from the single thread that each engine starts in) will start with {1} in both engines. After eating this imaginary character, engine1 will have exactly one thread at n1 (the "real" entry of the reference graph) having traversed the sequence of sequences {{1}}, and engine2 will have exactly one thread at subset node {n1}, having also traversed the sequence of sequences {{1}}. This satisfies the requirements of premise2.

3) Premise 3. During construction for a given subset node, all transitions for each stop-node listed in the subset are considered by the recursive search function of Graph.java. It is known that for any stop-node listed in the reference-graph, there is at most one unique (relative to instructions accumulated, or lack thereof) type-1 transition to the exit-node of the "reference graph". This is guaranteed because ambiguities that could result from incompatible type-1 transitions were eliminated during composition by the transformations discussed in section 8.5.2.2.7. But a contradiction to this premise3 would be provided by a subset-node in the subset-graph with 2 different stop-nodes, having incompatible (instruction-wise) type-1 transitions to the exit node. However, in this case, by application of premise1 already validated, engine1 would then have 2 different "accept" threads, one for each stop-node, recognizing the same characters and the same sequence of arcnum sequences, but different side-effects. This would be in contradiction to the ambiguity-free property of the "reference graph", which was shown to be equivalent to the composition graph in section 8.5.3.1. The composition graph was shown to be ambiguity free in section 8.5.2.2. The validity of premise3 is also checked in the source code in Transition.java, line 192.

4) Premise 4. This premise states that from any list of stop-nodes in a subset-node that has been constructed, all possible type-2 transitions to the same destination stop-node with the same arcnum sequence will be compatible in terms of instruction accumulation. This premise is based on the ambiguity premise of composition graphs of section 8.5.2.2.8. The ambiguity premise actually guarantees that both the composition graph and the reference-graph are ambiguity-free. For based on this premise, any 2 automata threads which have all of the same sequences of arcnum sequences, will have recognized the same instructions between every pair of arcnum sequences. To see how this premise of section 8.5.2.2.8 also ensures the same property for the subset-graph, consider a subset node such as {n2, n3, n5}. During construction, consider a transition from n2 to n7, with sequence t27, traversing instructions i27, and a transition from n3 to n7, with sequence t37, traversing instructions i37. Consider in contradiction to Premise4 that t27=t37, but i27<>i37. In this case, by Premise1 already validated, the existence of this subset node {n2, n3, n5} implies that there could be an input stream such that there is a thread in engine1 with the same sequences culminating in node n2 as another thread in engine1 culminating in node n3. Let the last sequence of these matching threads (sequence-wise) be called t235. In this case t235+t27 and t235+t37 would be pair-wise the same, but wrap different instructions, in contradiction to the ambiguity-free premise of section 8.5.2.2.8. The validity of this premise is also checked in Transition.java, line 241.

These justified properties are now employed to show that both the "reference graph" and the "subset graph" will find the same "best" paths for any substring that can lead to acceptance. It is known that any "accept" path of engine1 is ambiguity-free (as defined by "side-effects") relative to its sequence of arcnum sequences. Premise3 and premise4 show that any "accept" path of engine2 is also ambiguity-free, because they show that no "subset-graph" transition encountered by engine2 will ever produce ambiguity. Premise2 shows us that any "best" sequence found by engine1 will also be found by engine2. The reason is that for engine1 to have a "winning" sequence, it will have either stopped at the exit node after some eating arc, or stopped at a stop-node, for which there is a type-1 exit. In the first case, premise2 shows us that there is a "subset-node" including this "reference graph" exit node, with the same "best" arcnum sequence. In the second case, we know from the subset construction technique that the same type1 transition that takes the "stop-node" to the exit node of the "reference-graph", also will take the corresponding "best" subset-node to the subset exit node of the "subset-graph." And premise3 shows that there is only 1 such transition. Finally, premise1 shows us that any accept path found by engine2 also will be found by engine1. Though engine2 may find fewer accept paths than engine1, it will never find more accept paths, and it always will find the same "best" path (based on the ambiguity-free grammar that chooses the "correct" side-effects) for any input stream as found by engine1. This shows that our subset graph is suitable for use in execution against the input stream.

8.5.4 Subjunctive Convolution

Subjunctive convolution is a way of modifying the subset construction algorithm above to successfully produce the proper semantics of the subjunctive grammar form of this invention.

8.5.4.1 Overview

The semantics of the proper execution of a subjunctive expression require that a hypothetical engine1 execute the primary expression and a hypothetical engine2 execute the subjunctive expression at the same time. All of the ACCEPT states reached by the automata for the primary expression are considered, including side-effects, and with normal priority according to sequences of arcnum sequences generated by the primary's engine1. The subjunctive expression is stripped of its side-effects, so that essentially all of its arcnum sequences are empty {}. All of the ACCEPT states reached by engine2 for the subjunctive expression are used to verify the primary's ACCEPT states. In the case of the but grammar, any candidate ACCEPT states reached for the primary are rejected if engine2 has not reached at least one ACCEPT state at the same time. In the case of the butnot grammar, any candidate ACCEPT states reached for the primary are rejected if engine2 as reached any ACCEPT state at the same time. This semantic is intuitively reflected by the names of the grammars. Although the butnot grammar behaves similar to the set difference operator, the butnot keyword operator better conveys the sense of the secondary aspect of the subjunctive expression (i.e. inhibiting side-effects of the subjunctive) than would a minus operator. Similarly the but keyword operator better conveys the sense of the secondary aspect of the subjunctive expression than would an and keyword operator.

In the following discussions, engine1 will refer to an engine executing the "reference graph" of the primary expression, engine2 will refer to an engine executing the "reference graph" of the secondary expression, and engine3 will refer to an engine executing the "subset convolution" graph.

8.5.4.2 Union-Like

The subjunctive grammar form is like a union of the two expressions, in that some convolution of two expressions finds all ACCEPT states reached only by the subjunctive, all ACCEPT states reached by only the primary, and all ACCEPT states reached by both the primary and subjunctive at the same time. However, a normal union has only one accept node, the exit node. For this type of union, two exit nodes must be considered, one for the composition of the primary and one for the composition of the subjunctive. This is achieved in Segment.java, lines 246–248. Also, it is important to know during the construction which nodes are from the subjunctive graph, and which nodes are from the primary graph. And since they are effectively brought into a special type of "union", separate numbering for the nodes of each subgraph must be used. This is accomplished by using positive numbers for the primary and negative numbers for the subjunctive. This is done in ButGrammar.java, line 48, and ButNotGrammar.java, line 48.

The entry node for the subjunctive construction is {n1, −n1}, meaning that it includes the entry nodes for both the primary and subjunctive graphs.

8.5.4.3 Transitions

Although the subjunctive convolution is like a union in that it finds all ACCEPT states for either subgraph, the primary transitions must be handled differently than the secondary transitions. First of all, the primary transitions must be handled by the same algorithm of subset construction already discussed above. Further, a primary transition must never be pruned by the rules discussed in section 8.5.3 and 8.5.2.4.2 because of a secondary transition. Rather, a secondary transition for the same character associated with a primary always matches. In other words, consider engine3 stopped in subset node {n2, n3, −n4} at some snapshot, which indicates that engine1 will have thread(s) in node n2 and in node n3, and engine2 will have thread(s) in node −n4. Transitions (for a particular character) might be found from n2 to n5 via arcnum sequence {1,2} and from n3 to n6 via arcnum sequence {1,3}. Further, a transition from −n4 (subjunctive graph) might be found to −n7. The subset construction algorithm already discussed shows that we will have a transition from {n2, n3, −n4} to {n5} by sequence {1,2} and to {n6} by sequence {1,3}. If a normal union was taking place, the subjunctive arcnum sequence would certainly be incompatible and we would also have a transition from {n2, n3, −n4} to {−n7}. However, subjunctive transitions are always compatible with primary transitions of any arcnum sequence. Therefore, rather than getting 3 transitions for this character from {n2, n3, −n4}, we get only 2 transitions, one to {n5,−n7} by the arcnum sequence {1,2} produced by the normal algorithm with respect to the primary and one to {n6,−n7} by sequence {1,3}.

8.5.4.4 Pruning

During subset construction, two types of pruning take place. The first case is a result of the way the subjunctive transitions are merged. The transitions for all primary stop-nodes of a subset-node are first computed as discussed previously in section 8.5.3. Then the transitions for the subjunctive stop-nodes are computed, and for these transitions, there will not be any instructions, and the arcnum sequences will effectively be empty. These subjunctive transitions are then merged as discussed above into the primary transitions. This process effectively discards all subjunctive transitions which do not match (character-wise) any of the primary transitions. This means that the subset-graph will not "track" any engine2 threads that could lead to the subjunctive ACCEPT state unless engine1 could also still reach the primary ACCEPT state at the same time. The second pruning varies with the but grammar and the butnot grammar. When there is a transition to a subset node which includes both the exit node of the primary and the exit node of the subjunctive, and the grammar is butnot, then both exit nodes are removed from the subset- node being transitioned to. This is seen in TransitionGroup.java, lines 64–73. When there is a transition to a subset node which includes the exit node of the primary but does not also include the exit node of the subjunctive, and the grammar is but, then the primary exit node is removed from the subset-node being transitioned to.

8.5.4.5 Exitability

Consider the reference-graph for the primary composition graph as Graph1, and the reference-graph for the subjunctive composition graph as Graph2. In a normal union of both grammars, the exit nodes of either graph reach the exit node of the composition via a null extender, and this union-exit node is the accept node for the graph. This means that any stop–node in either sub-graph, Graph1 or Graph2, can reach the exit/accept node of the union. However, in this respect, the subjunctive convolution is not a union. The exit nodes of both sub-graphs remain as terminal points during the construction, and in fact, neither of these exit nodes is known to be accepting. Rather, the subset constructed graph marks subset nodes as "accepting" according to whether those nodes satisfy the following condition: (1) if the grammar is a butnot grammar, then only a subset node which includes the exit nodes of each subgraph (Graph1 and Graph2) is "accepting"; (2) if the grammar is a but grammar, then only a subset node which includes the exit node of the primary (Graph1) without including the exit node of the subjunctive (Graph2) is "accepting".

Assume that the exit node of Graph1 is n9 and the exit node of Graph2 is −n7. Then for the butnot grammar, a subset node such as {n9, −n7} is not an "accepting" node, and a subset node such as {n9} is an "accepting" node. With the but grammar, it is reversed. This aspect of the subset construction means that whole portions of the graph may not have any path at all to an accepting node. This is normal for a subjunctive convolution and is shown in the following simple script (/algo/subj1.tok):

```
1       static {
2           Pattern p1 = *any + do (,; 'a'; „) + *any;
3           Pattern p2 = 'a';
4           system::construction(p1 | p2);
5           system::construction(p1 but p2);
6       }
```

The subset construction for p1|p2 is rather complex and shows that quite a few subset-nodes exist for a union, but the construction for p1 but p2 is quite simple, showing that many of these nodes were purged, because they could not reach the "accepting" node(s) for the convolution:

```
7       EType.GRAPH
8       node 1
9           arc { } instrs {xx nop xx} node 2
10      node 2
11          arc {1,2} '[a]' node 3
12      node 3
13          arc { } instrs {xx nop nop xx} node 4
14      exit node 4
```

The construction essentially has purged all of the subset-nodes related to both *any sub-expressions, because if those sub-expressions "eat" any characters, the subjunctive graph negative nodes will no longer appear in the construction. This is illustrated in action below. The alternative to purging the portions of the subset-graph which cannot reach an "accepting" node according to the but and butnot grammars, would be to leave all of the subset nodes in the graph. In this case, an engine3 executing the subset graph would reflect what threads are extant in engine1 and engine2. In this particular example, if the first character in the stream is not an 'a', or for any snapshot after the $1^{st}$ character, engine2 for the subjunctive sub-graph would no longer have any extant threads. Meanwhile engine1 would continue to have extant threads all the way to the end of the stream. This would be reflected in the fact that engine3 would find itself in subset nodes that have no negative/subjunctive node numbers. The importance of purging portions of the graph that cannot reach the "accept" node is so that engine3 can stop processing the stream as soon as it is known that the subjunctive condition (comparing same time arrival at the exit nodes of engine1 and engine2) can no longer be satisfied.

8.5.4.6 Arrival-Time

An early version of the engine had the following problem. If either the primary or secondary had only null segments into its exit node, and the other subgraph had an "eating" arc into its exit, then arrivability at the exit nodes at the same time could not be properly determined in the subset-graph. This is easily corrected by adding "null-extenders" to both graphs, as done in ButGrammar.java, lines 42 & 51, and ButNotGrammar.java, lines 42 & 51. This has the effect that no "stop-node" reached by an "eating" arc will ever be one of the exit nodes of the subgraphs. Therefore, same-time arrival is assured only when a subset node includes a node from each sub-graph (positive and negative) reachable by only a type1 transition. In other words, type1 transitions (which do not eat) are not compatible with same time arrival at an exit node with type2 transitions (which eat). Since we cannot guarantee that all subgraphs will have no type1 transitions, we must guarantee instead that all subgraphs can never reach the exit node by a type2 transition, by adding the null extender. Again, same-time arrival at the 2 exit nodes, is reflected when a subset node has both exit nodes of each subgraph in its list of nodes. We must ensure that any case where engine1 and engine2 could reach their respective exits at the same time, is always reflected by a subset node containing both exit nodes. As seen above, we then purge according to the butnot and but grammars.

8.5.4.7 Reachability

Subset construction results in the following property: if at any snapshot the "reference engines" for each subgraph of the subjunctive expression (engine1 and engine2) both have "extant" threads, then engine3 executing the subset-constructed convolution graph will find all of its "extant" threads to be at subset nodes that have both positive and negative numbers in the subset—that is, referring to at least 1 stop node in the primary "reference graph" and at least 1 stop node in the secondary "reference graph". That is, if at snapshot N engine 1 has threads in nodes n3, n4, and n5, and engine 2 has threads in nodes −n2 and −n3, then all subset nodes found in engine3 are of the type {n3, n4,−n3} or {n5,−n2} but not {n3, n4}. The converse of this property is that if engine3 at snapshot N has extant threads in subset nodes with only positive node numbers, then engine1 has extant threads, but engine2 for the subjunctive does not have any extant threads. This would be possible for the butnot grammar, but not the but grammar.

If on the other hand, engine1 has no extant threads, and engine 2 has threads in nodes −n2 and −n3, then engine3 of the construction actually has no threads at all. The reason that it does not have threads in nodes such as {−n2, −n3} is that all subset nodes with only negative node numbers have been purged, because they will never reach an accept state. An accept state can never be reached from subset nodes with only negative numbers, because these nodes imply no extant engine1 (primary) threads. That is, for any subjunctive expression, whether but or butnot, if the primary engine can no longer reach the accept condition, then neither can the subjunctive convolution. This explains why it is permissible to use the subjunctive transitions only for merging purposes into the primary, and never create any nodes in the subjunctive convolution graph that include only the negative/subjunctive node numbers.

8.5.4.8 Re-composition

Because subset construction is the only way to convert/model a subjunctive expression as an NFA graph, and because subjunctive expression are often nested or embedded in other expressions, the present invention uses nested constructions as a composition form for the subjunctive. That is, all other grammar forms have compositions as described in the specifications sections. But the subjunctive form requires a construction in order to model its graph. This is seen in ButGrammar.java, line 58, and ButNotGrammar.java, line 58.

8.5.4.9 Example

In order to understand what is happening, we look at the following simple example, shown earlier, and recast as /algo/subj2.tok.

```
1       static {
2           Pattern p1 = *any + do (,; 'a'; ,,) + *any;
3           Pattern p2 = 'a';
4           system::composition(p1);
5           system::composition(p2);
6           system::construction(p1 but p2);
7       }
```

The p1 composition graph is output as:

```
8       EType.GRAPH
9       node 1
10          arc { } null node 2
11          arc { } null node 4
12      node 2
13          arc {1,1} any node 3
14      node 3
15          arc { } null node 2
16          arc { } null node 4
17      node 4
18          arc { } instrs {xx nop xx} node 6
19      node 6
20          arc {1,2} '[a]' node 7
21      node 7
22          arc { } instrs {xx nop nop xx} node 8
23      node 8
24          arc { } null node 10
25          arc { } null node 12
26      node 10
27          arc {2} any node 11
28      node 11
29          arc { } null node 10
30          arc { } null node 12
31      exit node 12
```

The p2 composition graph is output as follows:

```
32      EType.GRAPH
33      node 1
34          arc { } '[a]' node 2
35      exit node 2
```

The primary graph is illustrated as follows. Note the addition of the null extender.

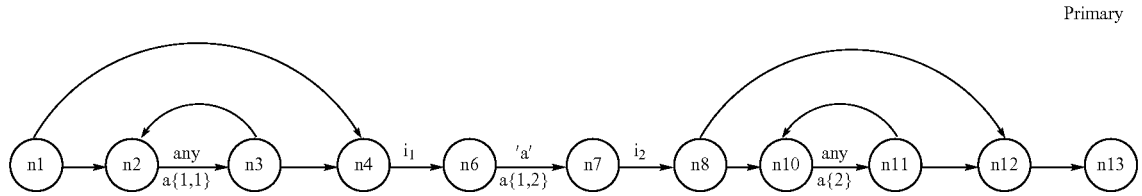

Primary

The secondary/subjunctive graph is illustrated as follows. Note the addition of the null extender to the graph to allow for same-time arrival with the primary.

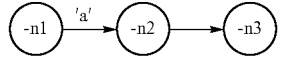

Secondary

The convolution graph is created as illustrated below. The initial subset and its transitions are:

| 1  | (n1,−n1) | i1 | 'a'    | {1,2} | {n7,−n2}  |                              |
|----|----------|----|--------|-------|-----------|------------------------------|
| 2  | {n1,−n1} |    | 'a'    | {1,1} | {n3,−n2}  |                              |
| 3  | {n1,−n1} |    | '[^a]' | {1,1} | {n3}      |                              |
| 4  | {n7,−n2} | i2 |        |       | {n13,−n3} | // accepting dual exit       |
| 5  | {n7,−n2} | i2 | any    | {2}   | {nil}     |                              |
| 6  | {n3,−n2} | i1 | 'a'    | {1,2} | {n7}      |                              |
| 7  | {n3,−n2} |    | any    | {1,1} | {n3}      |                              |
| 8  | {n3}     | i1 | 'a'    | {1,2} | {n7}      |                              |
| 9  | {n3}     |    | any    | {1,1} | {n3}      |                              |
| 10 | {n11}    |    | null   |       | {n13}     | // non accepting single-exit |
| 11 | {n11}    |    | any    | {2}   | {n11}     |                              |
| 12 | {n7}     | i2 |        |       | {n13}     |                              |
| 13 | {n7}     | i2 | any    | {2}   | {n1}      |                              |

The exitability criteria of section 8.5.4.5 immediately indicates that for a but grammar, arcs on lines 3 and lines 5–13 will disappear. The reasoning is as follows: (1) this is a but grammar, so the only accepting nodes will include both primary and secondary exit, which can only be {n13,−n3} because of the null extenders; (2) only "mixed" (positive and negative nodes) can "reach to" other "mixed" nodes by the exitability criteria of section 8.5.4.5; (3) the single accepting node {n13,−n3} is "mixed"; therefore, (4) all arcs leading to "non-mixed" subset-nodes (i.e. "positive-only") must disappear. This leaves us with lines 1, 2, & 4, but we find that line 2 must disappear as well because node {n3, −n2} has no path to {n13,−n3}. Although we can quickly determine visually that lines 3 & 5–13 disappear based on the above reasoning, the program makes the determination be a recursive walk from the entry node {n1, −n1} to find all arcs and nodes that can reach the "accepting" node, which is {n13,−n3}. This recursive walk produces a result that matches our reasoning above, in all cases, even the butnot grammar. Note that the simple quick-pruning steps (1) to (4) above do not apply to the butnot grammar because with the butnot grammar: (1) all "positive-only" nodes are automata "exitable", and (2) at least one "mixed-node" {n1, −n1} is "exitable", as well as many others quite often, unless (3) there are no "positive-only" nodes, and {n1, −n1} is not "exitable", i.e.

the reject result. Note that in the case of the recursive-walk for the butnot grammar, the "accepting" nodes are those nodes which include the primary exit, but not the secondary exit, which, because of the null extenders, will be the subset consisting of only the primary-exit node.

Note in this example that if we remove the null extenders (that is, if n12 and −n2 are made the exit nodes), we do not get a correct result. Node {n7,−n2} would not be considered "accepting", but all subsequent arcs would be to "positive-only" nodes. Node {n12} would be reached via the type-1 transition from {n7,−n2}, but node {n12,−n2} would never be reached.

The arc-lines that remain after the recursive walk purge are as follows:

| 14 | {n1,−n1} | i1 'a' | {1,2} | {n7,−n2}  |                        |
|----|----------|--------|-------|-----------|------------------------|
| 15 | {n7,−n2} | i2     |       | {n13,−n3} | // accepting dual exit |

This compares favorably with the output of line 6 the script, which prints the construction graph for the subjunctive but convolution as follows:

| 16 | EType.GRAPH                          |
| 17 | node 1                               |
| 18 |   arc { } instrs {xx nop xx} node 2  |
| 19 | node 2                               |
| 20 |   arc {1,2} '[a]' node 3             |
| 21 | node 3                               |
| 22 |   arc { } instrs {xx nop nop xx} node 4 |
| 23 | exit node 4                          |

8.5.5 Automata Execution

The automata execution algorithm is described as follows:
1. Each automata thread tracks the current node in the graph, the number of characters "eaten", the instructions accumulated, and the sequences of arcnum sequences traversed, as well as holding pointers to any parent thread which spawned it.
2. The initial thread starts at the entry-node of the subset constructed graph, has "eaten" 0 characters, no instructions accumulated, no sequences of arcnum sequences traversed, and has a null pointer to its parent thread, meaning that this is the root thread. This is the only thread in existence when the "run" function is invoked.
3. The "run" function loops as long as there are both threads and characters in the stream. This main loop processes one character at a time from the stream. This includes a "synthetic eof" character when the stream cursor is at "eof" at the beginning of a loop. After the synthetic eof condition, the loop can be broken from even when there are threads. Lines 5–9 describe the iteration steps of the main character-processing loop.

4. Note that when instruction arrays are accumulated, they are also "resolved". This means that any capture positions relative to the input stream are resolved with the current position of the stream.
5. At the beginning of the loop iteration, the program checks to see if there are any "null" or "instruction-only" transitions from the current node of each current thread. If so threads must be spawned at this point. Threads are spawned from any threads having null/instr transitions as follows: (1) the target is "frozen", allowing no further updates to it, and it becomes the parent to not only all of the children nodes corresponding to null transitions, but also to a "self-child", which is "live" surrogate for itself; (2) the "self-child" references the "frozen" target as parent, and starts in the same node as the "frozen-target" is currently in, starts with an empty instruction array and an empty sequences array; (3) for each null transition a child-thread is created referencing the "frozen-target" as parent, starting in the destination node of the null transition, with empty instructions array, and empty sequences array; (4) for each instr-transition a child-thread is created referencing the "frozen-target" as parent, starting in the destination node of the instr-transition, with initial instructions array holding the "resolved" instructions of the instr-transition, and empty sequences array.
6. Next in the iteration, all threads are checked to see if in the "accepting" state. At this point, any previous "queued" accept-threads are removed, because the "greedy" algorithm says that all threads after the most recent character "eaten" are better. All current threads which are in the "accept" state are now go into the "cleared" queue. The program removes each of these "accepting" threads from the list of "current" threads. However, if the "accepting" thread is not an "exit" node, and can still receive characters, then a new "self-child" is created and added back to the list of "current" threads, and the queued accept-thread is "frozen".
7. The next character is obtained from the stream. If the stream cursor is at "eof", then a synthetic "eof" character is generated. If the stream cursor is 1 or more beyond the "eof", then the main loop is terminated.
8. This next character from the stream is used to determine at most 1 valid transition for each thread. If there is no valid transition, then the thread is simple inactivated/removed from "current". If there is 1 valid transition, this transition is used to update the arcnum sequences traversed by this thread, the resolved-instructions accumulated by this thread (if there are instructions associated), and the current node number for this thread as the destination node of the transition.
9. At this point, the list of "current" threads is scanned to see if any 2 threads are in the same node. Pruning takes place until there is at most 1 "current" thread in any given node of the automata. Comparison to determine the "better" thread to keep "current", is done by comparing arcnum sequences. The comparison starts with the most recent thread which serves as a common origin-point, "spawning-wise". In the worst case, the arcnum sequences are compared all the way back to the root thread. Comparison is valid from origin-point to this-point because the origin nodes are the same and so is this one. This is the "pruning" approach of this invention, that ensures that no automata created by any of the regular expressions of the grammar of this invention will ever produce exponential behavior, in terms of growth of execution time versus growth of input stream. The reason that this is true is that this is a "finite" automata, and there are a "finite" (fixed) number of nodes, and that this pruning ensures that we can put a fixed upper bound on the number of "extant" threads after every character "eaten" from the stream. Since the maximum number of threads is the same at each iteration, the growth of running time cannot be exponential. In fact, so long as the pruning-comparison of two threads at the same node does not compare arcnum sequences all the way back to the "root" thread, then the running time growth could be linear. To be more precise, the worst-case running time could be polynomial in N (N is length of input stream), but could also be linear in N.
10. When the iteration loop has ended, all of the most recent accept threads are then compared as in step 9 to determine which is "best". The instructions for this thread are then accumulated and returned to the caller.

8.5.5.1 Example

Consider the following script (/algo/slow1.tok), which recasts the example of section 8.5.2.2.6 to make it easy to display the total running time, and to multiple the size of the input stream by powers of 2. This example was shown to exhibit exponential explosion of threads in that section, short of the pruning algorithm discussed in step 9 above.

```
1    function Stream Explode (String s, int power, in out int cnt)
2    {
3        if (power <= 0)
4            return Stream (" ");
5
6        while (power > 1) {
7            s = s + s;
8            cnt = cnt + cnt;
9            power--;
10       }
11       return Stream(s);
12   }
13
14   static {
15       int cnt = 3;
16       Stream is = Explode ("ababab", 4, cnt);
17
18       int cnt1, cnt2, cnt3;
19       cnt1 = cnt2 = cnt3 = 0;
20
21       Pattern p1 = do (; "a"; cnt1++);
22       Pattern p2 = do (; "b"; cnt2++);
23       Pattern p3 = do (; "ab"; cnt3++);
24
25       int m = system::millis( );
26       tokenize (is) {
27           case * (p1 | p2 | p3):
28               ;
29       }
30       m -= system::millis( );
31
32       if (cnt1 = = 0 && cnt2 = = 0 && cnt3 = = cnt)
33           system::println("test slow1 ok: " + -m);
34       else
35           system::println("test slow1 failed");
36   }
```

This script has been tested to powers of 2 up to 18, and scales linearly, with each step of 2, once the threshold of overhead time (for script translation and automata construction) has been passed. However, if the input stream is multiplied in size by a small power of 2 (resulting in 16×), as seen in line 16 above, and the pruning code is disabled on Automata.java, line 455 by forcing entry to line 456 of the if condition each time, then the automata execution algorithm consumes the heap available to it and throws an exception. We already know based on section 8.5.2.2.6 that for 48 characters (16×) there will be $2^{24}$ (about 16 million) threads required to reach the end of the stream. The virtual machine cannot support this many threads for a normal application heap size. The fact that the script /algo/slow1.tok finishes (quickly) demonstrates that the necessary pruning takes place, and that the correct result is produced by the script.

8.6 Language Evolution

Some of the specifics of the evolution of this grammar are summarized in the table of FIG. 8 of section 7. Additional explanation for some of the rows of this table is as follows:

The anyother literal of row 2 of FIG. 8 was initially contemplated as an alternative to the any literal, meant to solve the problem of "greediness" when the any literal is part of a "repeat" pattern. The idea was that anyother would be a signal to the interpreter to look at any expressions alongside the anyother (through union) or any expressions that come after the anyother in consideration of what characters to exclude—i.e. the interpreter would take over the chore of converting the wildcard to a negated character class.

The problem with this approach is that it does not fully and precisely define the semantics of the anyother literal to the programmer—inherent in attempting to offer a grammar form whose meaning is driven contextually. The XML specification, however, makes use of the minus—operator to accomplish the same purpose. A "set-difference" semantic was therefore added to the grammar of this invention, but the keyword butnot was chosen rather than the minus—operator. The first reason for opting to select the keyword butnot is that "set difference" is not truly the converse of the + operator, which conveys "concatenation". Further, in the XML specification, the use of the minus—operator is most appropriate (from the standpoint of the programmer) when both the $1^{st}$ and $2^{nd}$ terms of the set difference are single characters. But if either the $1^{st}$ and/or $2^{nd}$ terms of the difference could recognize more than one character (possibly different lengths), then the concept of "set difference", as implied by the minus—operator, was not going to be accurate. On the other hand, butnot did express this concept accurately.

How to semantically define a terminated "find-expression" using the butnot operator was then evaluated. Although it turned out to be rather natural to model "finds" via butnot expressions, such expressions could nevertheless not be modeled by an NFA, nor easily constructed. Therefore, it was originally determined to modify the engine to execute both NFAs of the subjunction simultaneously. Later it was discovered that the effect of simulaneous execution of primary and secondary expressions (of the subjunctive) could be done in subset construction.

The evolution of the <+ (right-to-left) operator (row 4 of FIG. 8), the unary operators (row 7 of FIG. 8), and the "iterate" operator (row 5 of FIG. 8) have already been discussed in sections 8.3.5.2 and 8.3.5.3. As shown in row 6 of FIG. 8, the accept keyword was conceived at the same time as the reject keyword, to provide the converse. But when it came to implementing the accept literal, it was discovered that the accept literal, like the anyother literal, was context dependent, nor was there an NFA which models accept. For example, if accept was to appear in a production rule definition, the accept must create a kind of short-circuit to the end of the production rule. This is why it cannot be modeled as a single NFA (like all of the other literals including even reject)—the graph of the rule which contains it must be fully constructed and then the accept point is connected to the exit. However, a question of programming semantics arises. If this production rule is instantiated within the definition of another production rule, does the accept inside the inner rule cause a short-circuit to the exit of the outer rule? Finally, these questions, along with the absence of any use-case examples that showed how this grammar could be used to solve problems that other grammars could not, led to the rejection of the accept literal.

The concat<> (row 10 of FIG. 8) and ignorecase<> (row 11 of FIG. 8) macros are grammar forms handled by the interpreter, as a quasi-macro-expansion. The concat<> macro was used to modify the meaning of concatenation, such that additional characters (such as whitespace) would be recognized between terms of concatenation. This grammar form provides a shorthand convenience for the programmer and was therefore not included since it is known in the art. The ignorecase<> macro would also be handled by the interpreter, converting single characters into a choice of characters, on behalf of the programmer. This is a useful convenience form, but not novel to the art, so it was not included in this invention.

The choice<> grammar (row 9 of FIG. 8) was an attempt to solve the problem shown in section 8.4.2.4, allowing the programmer to build a type of "dynamic-switch" from an array of patterns. During development of the interpreter, specifically during work on the production rules, another approach to solving the "dynamic-switch" problem was found. This solution involves an aspect of the production rule template, which binds in parameters to the instantiation, along with line-by-line composition of the dynamic switch (see example tmpl6.tok of section 8.4.2.4).

The otherwise grammar (row 8 of FIG. 8) in its originally conceived form is an operator similar to the union | operator, but with slightly different meaning. This grammar form does not serve well as a union | operator replacement, but will later be offered to the programmer in a different form.

Implementing recursive production rules (row 13 of FIG. 8) requires an engine which is functionally equivalent to a PDA (Pushdown Automata). Without the novel subjunctive grammar form of this invention, techniques known in the art for providing the functionality of a PDA could be used to support recursive production rules. However, the subjunctive grammar form presents several difficulties described as follows.

Assume that the primary and/or secondary of the subjunctive contain recursive rules, as modeled by an arc that labels that rule. Since it is known in the art that recursive rules are modeled by PDAs, and cannot be modeled by NFAs, subset construction cannot be used to compose the subjunctive grammar form, because subset construction results in an NFA, as known in the art. However, the subjunctive grammar form of this engine is converted to an equivalent NFA through subset-construction, during composition of larger expressions. This means that the engine never needs to execute a subjunctive directly, which would involve spawning thread groups at nodes marking the beginning of a subjunctive, and integrating and pruning threads from those thread groups at the terminal node of the subjunctive sub-expression, according to the "sense" of but or butnot. Therefore, the first step in supporting the subjunctive along with recursive production rules is to build execution-time support into the Automata Execution Engine for the subjunctive grammar.

The second problem is found in situations where the primary can continue to match characters in the stream, but in which the subjunctive thread groups are guaranteed to reject all of those matches. This would be seen in the design pattern (seen in the examples sections of this document) for find as follows:

```
Pattern p = RecursiveRule< >;
Pattern find_p = (*any butnot *any + p + *any) <+ p;
```

In order to be useful to the programmer, the automata and the automata engine must determine together for the above expression exactly when the first match has occurred to the recursive rule, and not continue to process characters from the stream beyond this point of match. In the engine of the current invention, this is accomplished during subset-construction by purging all portions of the subset-graph which are not "exitable", as was seen in section 8.5.4.5. However, we have stated that for recursive rules, the subset construction approaches given in this document cannot model a subjunctive-expression, because the result of a subset-construction in this engine is an NFA, and recursive rules are modeled by PDA.

I claim:

1. A computer-implemented method of integrating side-effects into regular expressions, the method comprising the steps of:
   defining a built-in datatype, to represent any regular expressions, or regex composition, in such a way that a regular expression referenced by a variable of such datatype is immutable, and wherein the datatype facilitates composition using variables, and allows enforcement of strong type compatibility for regular expressions, such as when and where regular expressions can be used in the overall grammar of a programming language;
   defining a grammar for standard regular expression compositions, such as character-classes, string and character literals, a wildcard, repeats, iterates, concatenations, and unions;
   defining a grammar for general regular expression compositions that contribute side- effects;
   defining a grammar for expressing the particular side-effect of "capture";
   defining a grammar for regex compositions in which side-effects are inhibited;
   defining a grammar for creating named, re-usable encapsulations for regular expressions, wherein the encapsulations also allow parameterization and the integration of side-effects; and
   defining a grammar for a binary composition, called the "subjunctive", including a primary and secondary term, in which the secondary term is used to narrow the specificity of the primary (by qualifying its matches), while allowing the side-effects of the primary to trigger in the expected way;
   wherein side-effects are encoded as general statements within the same language or grammar in which the regular expressions are composed;
   wherein the side-effects are executed by the same machine or virtual machine that executes all of the translated instructions of the language hosting the regular expression;
   wherein the side-effects are executed as a step of the matching of a regular expression to data, the step occurring just after the "winning" match has been determined, and just before the next statement in code outside of the regular expression is executed;
   wherein the side-effects do not alter the matching characteristics of a regular expression composition or sub-composition;
   wherein the side-effects are triggered if and only if the regex composition or sub-composition associated with its side-effects is ultimately matched to data; and
   wherein the method allows solutions to data matching problems to encode a greater portion of the solution within regular expressions and a lesser portion of the solution within surrounding code.

2. The method of claim 1, wherein a regex composition grammar form (termed the "capture-pattern") allows the match to a regex sub-composition not only to be captured, but to be captured into any named variable (of type String) available in the scope in which its matchable Pattern sub-composition is defined.

3. The method of claim 2, wherein the "capture-pattern" syntax further allows the capture reference to be any valid reference of type String, in which the reference expression's elements are available in the scope in which the capture-pattern's matchable Pattern sub-composition is defined.

4. The method of claim 1, wherein a regex composition grammar form (termed the "do-pattern") allows side-effect producing statements to be wrapped around a matchable Pattern sub-composition, wherein the "do-pattern" syntax consists of a suitable keyword signaling its start, such as do, followed by a pre-list of statements, followed by a Pattern sub-composition which determines what the "do-pattern" matches, followed by a post-list of statements, the pre-list and post-list statements comprising statements within the same programming language in which regular expressions are composed.

5. The method of claim 4, wherein the pre-list and post-list statements of the "do-pattern" comprise any of the statement grammar forms of the programming language of the invention, except for the return statement and the tokenize statement.

6. The method of claim 4, wherein the "do-pattern" establishes its own scope, such that temporary variable(s) are normally defined in the pre-list, and are usable (once defined) in the pre-list, and/or the matchable Pattern sub-composition, and/or the post-list.

7. The method of either claims 2 or 4, wherein "do-patterns" and "capture-patterns" involved in a match and/or sub-match associate side-effect instructions to the matching process, wherein the instructions are automatically executed if and only if the "do-patterns" and "capture-patterns" are involved in the "winning" match; wherein the instructions are a direct translation of pre-list and post-list statements in a "do-pattern"; and wherein the instructions are generated for a "capture-pattern" by modeling the "capture-pattern" as a low-level "do-pattern".

8. The method of either claims 2 or 4, wherein "do-pattern" and/or "capture pattern" side-effects selected for execution along with the "winning" match are determined unambiguously based on a set of ambiguity resolution rules appropriate (in the presence of side-effects) to unions, concatenations, repeats, and iterates.

9. The method of claim 1, wherein a binary regex composition, called the "subjunctive", has two forms, but and butnot, both of which consist of a primary term and a secondary term, wherein the primary term contributes not only a primary matching characteristic, but also side-effects, wherein the secondary term contributes no side-effects (because they are automatically inhibited), and wherein the secondary term is used to restrict the possible matches of the primary term.

10. The method of claim 9, wherein a suitably named subjunctive keyword, such as but, signals that the secondary term restricts the matches of the primary to the extent that the secondary is able to match the same data matched by the primary at the same time, and wherein the secondary term in no way changes the side-effects implied by the primary's match (assuming the primary is allowed by the secondary to match).

11. The method of claim 9, wherein a suitably named subjunctive keyword, such as butnot, signals that the secondary term restricts the matches of the primary to the extent that the secondary is not able (in any way) to match the same data matched by the primary at the same time, and wherein the secondary term in no way changes the side-effects implied by the primary's match (assuming the primary is allowed by the secondary to match).

12. The method of claim 1, wherein regular expressions can be encapsulated as named, re-usable production rules, the rules having the characteristic of parameterizability, the rules comprising bodies which can incorporate side-effect producing regex compositions, such as "do-patterns" and "capture-patterns".

13. The method of claim 12, wherein the production rule grammar permits the parameterizability of side-effects and/or matching characteristics.

14. The method of claim 13, wherein "in", "out" and "in out" parameters of a production rule can be used to parameterize the side-effects of the rule, wherein such parameters are usable to formulate the capture-reference of a "capture-pattern" (if such a "capture-pattern" is found within the rule's body), and wherein such parameters are usable in the formulation of the pre-list and/or post-list statements of a "do-pattern" (if such a "do-pattern" is found within the rule's body).

15. The method of claim 13, wherein parameters of the "in" variety can be used to parameterize the matching characteristics of the rule.

16. The method of claim 15, wherein a parameter of the "in" variety can be declared of type Pattern, and used not only to allow its rule to build upon the matching characteristics of the actual Pattern object being passed/bound, but also to allow its rule to inherit the side-effect characteristics of the actual Pattern parameter being passed/bound; wherein the parameter is deemed a target of the rule, consistent with the "find-first" and "find-nth" design patterns.

17. The method of claim 12, wherein the association of actual parameter values (or references to variables) to a signature compatible production rule results in an "instantiation" object that is type-compatible with the Pattern datatype, and can therefore be used anywhere a Pattern object can be used.

18. The method of claim 1, whereby a single (suitably composed) production rule encapsulates the entire problem of directed capture of multi-dimensional data, leveraging "do-patterns" and "capture-patterns", and leverages the ability of production rule parameters to be used in the "do-patterns" and "capture-patterns".

19. The method of claim 1, wherein production rules that have a base-case which must not match any data are defined based on the use of a conditional operator and the reject literal, wherein the reject literal serves as a base case.

20. The method of claim 1, wherein an inhibit keyword transforms any Pattern object to a new Pattern object that inherits all of the original's matching characteristics and none of the original's side-effect characteristics.

21. A computer system for interpreting or compiling and then executing a programming language with support for regular expressions, including a plurality of support for integrating side-effects into regular expressions, the system comprising:
  a computer processor;
  the programming language and regex grammar of claim 1;
  a computer program which executes computer program modules/scripts written in the programming language and, while the computer program is being hosted by the computer processor, the computer program is also the host for the computer program modules/scripts which are its target executables;
  a data input device providing a user-defined program module/script (written by user according to the grammatical rules of the programming language) to the host computer program;
  a data input device providing a source of data to be processed by the regular expressions of a program module/script;
  a set of virtual instructions, into which instructions the program modules/scripts are translated, and which instructions are executed by a subcomponent of the host computer program called the "virtual machine"; and
  a subset of virtual instructions, which map accessibility functions of input/output devices in the system to instructions, so that program modules/scripts can access input/output devices and thereby provide the programmer with output consistent with the user defined program module/script.

22. The system of claim 21, further comprising support (in the "host computer program") for regular expressions and support for integrating side-effects into regular expressions by:
  extending the virtual machine, including its instruction set, into which not only the normal statements and function calls of the programming language can be defined, but also its regular expression compositions, including also instructions that execute regular expressions against data;
  defining a set of regular expression composition instructions that allow every regular expression of the programming language to be modeled in the virtual machine as an immutable object;
  implementing a group of subset construction techniques that permit the transformation of every regular expression object in the virtual machine into a form suitable for execution against data;
  implementing a runtime automata execution technique that allows the execution of all of the regular expressions of the invention, once transformed into automata, against data, in such a way that each character from the stream is examined at most once;
  implementing the runtime automata execution technique in such a way that side-effects of the automata are accumulated as instructions to a "winning" thread, and executed if and only if the regular expressions to which they correspond are involved in a "winning" match against the data;
  implementing the compositions and subset constructions of regular expressions and their automata with inclusion of both instruction-arcs to model side-effects as well as arcnum-sequences to serve as a criteria for unambiguously selecting a "winning" match to data, in the presence of side-effects; and
  implementing the runtime automata execution technique in such a way that a set of "automata-threads" is maintained, that represent the set of all ways in which data not only can be matched, but also all ways in which side-effects can be accumulated by the ultimate "winning" thread.

23. The system of claim 22, wherein side-effects are modeled as instruction-arcs, which are placed into composition graphs (automata) to fully model both "do-patterns" and "capture-patterns," wherein the instruction-arcs imply the existence of arcnum-sequences that must be attached to "eating" arcs of the automata in order to allow the runtime automata execution technique to make decisions on automata-thread preference.

24. The system of claim 22, further comprising a subset construction technique that allows a modeling automata/graph to be converted into a form suitable for execution, including the presence of both instruction-arcs and arcnum-sequences.

25. The system of claim 22, further comprising a subset construction technique that allows a subjunctive convolution to be performed to represent a subjunctive expression, resulting in yet another composition graph that models semantics of the subjunctive expression by accurately representing both possible matches and possible side-effects of the subjunctive expression.

26. The system of claim 22, wherein the runtime automata execution technique includes a pruning step to limit proliferation of the automata threads to be tracked, thus preventing an exponential explosion of automata threads in the presence of nested, repeating side-effect compositions.

* * * * *